US012582095B2

(12) United States Patent
Trottier et al.

(10) Patent No.: US 12,582,095 B2
(45) Date of Patent: Mar. 24, 2026

(54) SYSTEMS, METHODS AND DEVICES FOR COMMUNICATION

(71) Applicant: CleverPet, Inc., San Diego, CA (US)

(72) Inventors: Leo Trottier, San Diego, CA (US); Jelmer Tiete, Alameda, CA (US); Gary Stephen Shuster, Vancouver (CA)

(73) Assignee: CleverPet, Inc., San Diego, CA (US)

( * ) Notice: Subject to any disclaimer, the term of this patent is extended or adjusted under 35 U.S.C. 154(b) by 30 days.

(21) Appl. No.: 18/280,455

(22) PCT Filed: Mar. 4, 2022

(86) PCT No.: PCT/US2022/019023
§ 371 (c)(1),
(2) Date: Sep. 5, 2023

(87) PCT Pub. No.: WO2022/187707
PCT Pub. Date: Sep. 9, 2022

(65) Prior Publication Data
US 2024/0206431 A1 Jun. 27, 2024

Related U.S. Application Data

(63) Continuation of application No. 17/667,461, filed on Feb. 8, 2022, now Pat. No. 11,445,704.

(60) Provisional application No. 63/228,578, filed on Aug. 2, 2021, provisional application No. 63/189,828, filed
(Continued)

(51) Int. Cl.
*A01K 15/02* (2006.01)

(52) U.S. Cl.
CPC ................................. *A01K 15/021* (2013.01)

(58) Field of Classification Search
CPC ...................................................... A01K 15/021
See application file for complete search history.

(56) References Cited

U.S. PATENT DOCUMENTS 9,662,557 B2 * 5/2017 Hautop Lund .... A63B 69/0053
10,334,823 B2 * 7/2019 Foster .................. A01K 15/021
(Continued)

*Primary Examiner* — Curtis A Kuntz
*Assistant Examiner* — James E Munion
(74) *Attorney, Agent, or Firm* — Sherrie M. Flynn; Aisha O. Otori; Coleman & Horowitt, LLP

(57) ABSTRACT

Devices, systems, and methods for training both non-humans and humans to communicate more effectively than previously possible. In one aspect a system for communicating with an animal comprises a plurality of tiles operably connected to one another, each tile comprising one or more buttons, an infrared transmitter and receiver assembly, a microprocessor, a speaker controlled by the microprocessor, and an audio amplifier connected to the speaker, where the infrared transmitter and receiver assembly transfers information to and from at least one other of the plurality of tiles, and where when one of the one or more buttons are pushed by the animal, the speaker emits a sound that can be heard through the speaker by the animal. The sound button may comprise a shell, a switch operably connected to a printed circuit board ("PCB"), a button cap assembly operably coupled to the shell, the button cap assembly comprising a button cap having at least one recess, the at least one recess having a hole; and a speaker facing toward the button cap.

8 Claims, 48 Drawing Sheets

Related U.S. Application Data on May 18, 2021, provisional application No. 63/156,926, filed on Mar. 4, 2021.

(56) References Cited

U.S. PATENT DOCUMENTS

2017/0290290 A1 *  10/2017  Trottier ................... A01K 5/02
2021/0251191 A1 *   8/2021  Lee ........................ A01K 15/02

* cited by examiner

BROAD BAND UPLINK

WIFI LINK

BLE LINK

BIDIRECTIONAL IR LINK

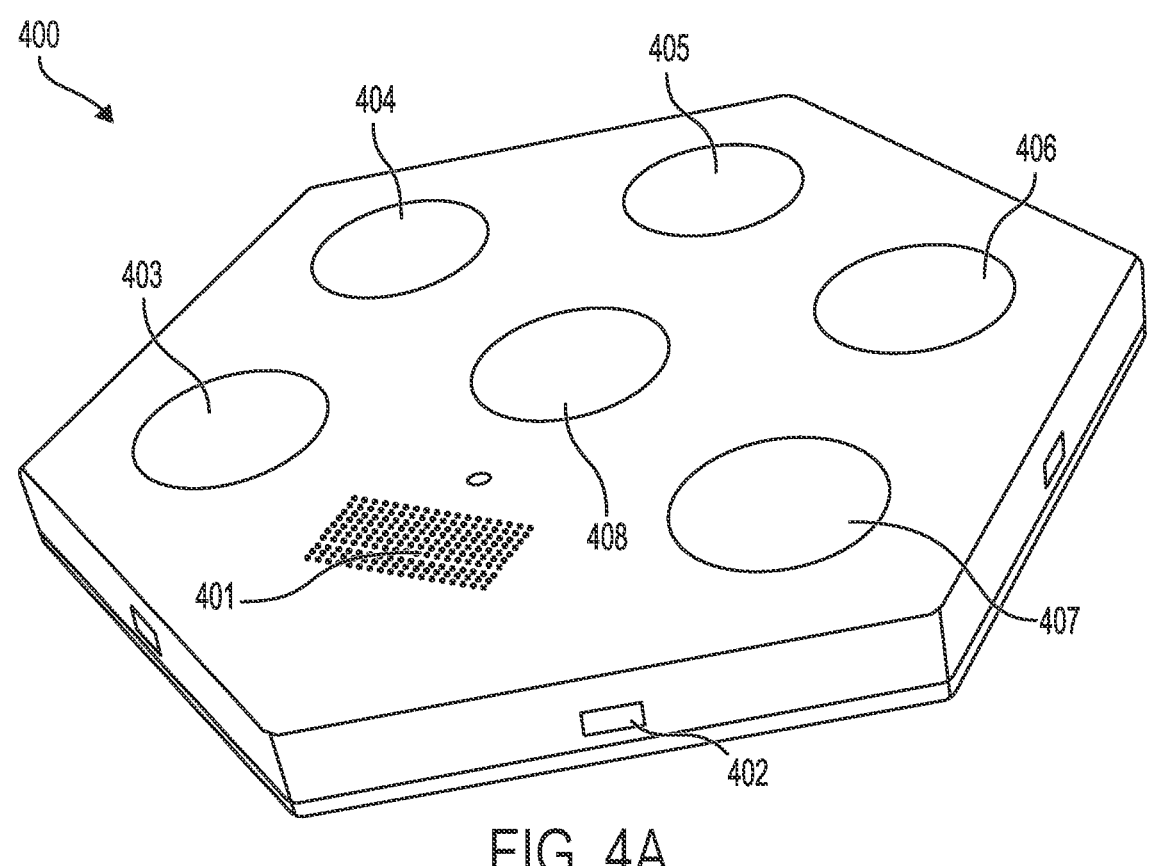
FIG. 4A
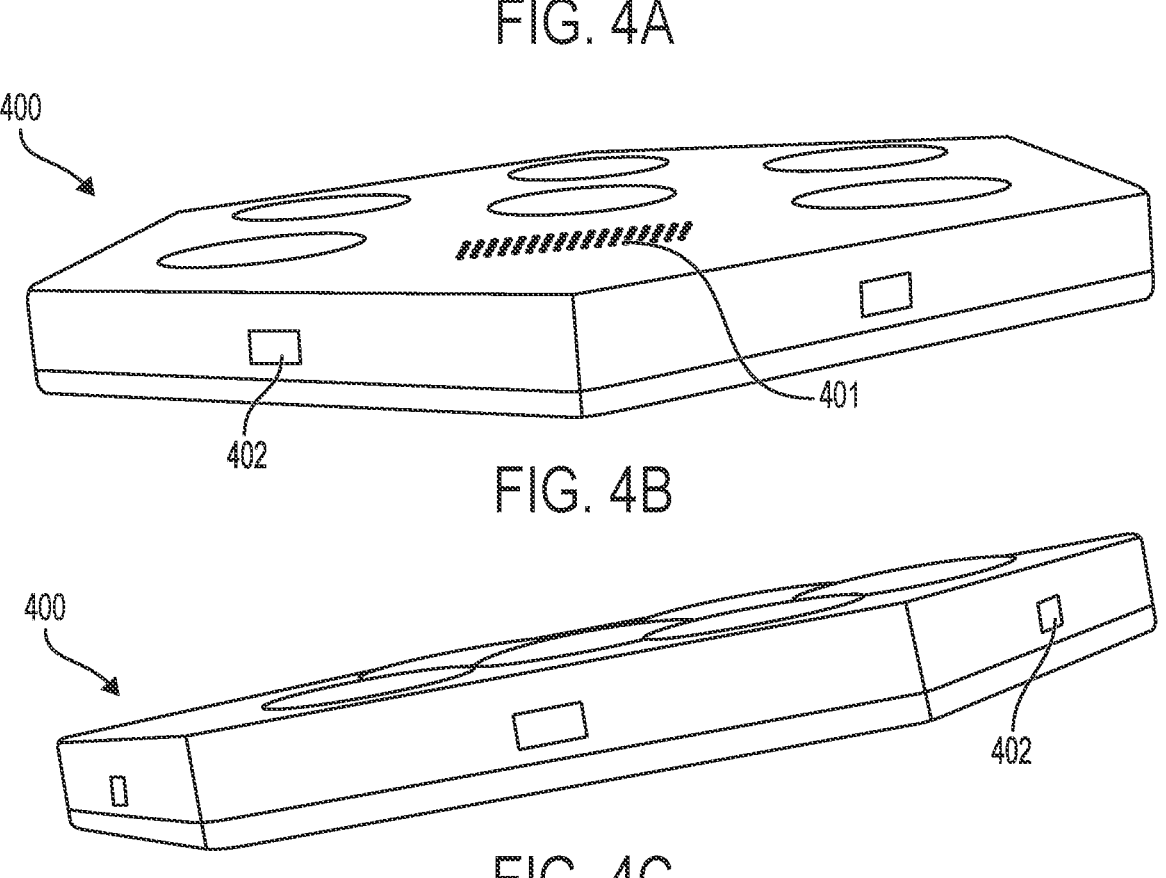
FIG. 4B
FIG. 4C

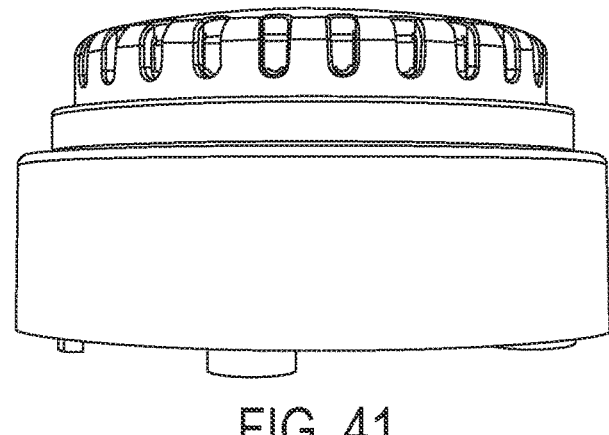
FIG. 41
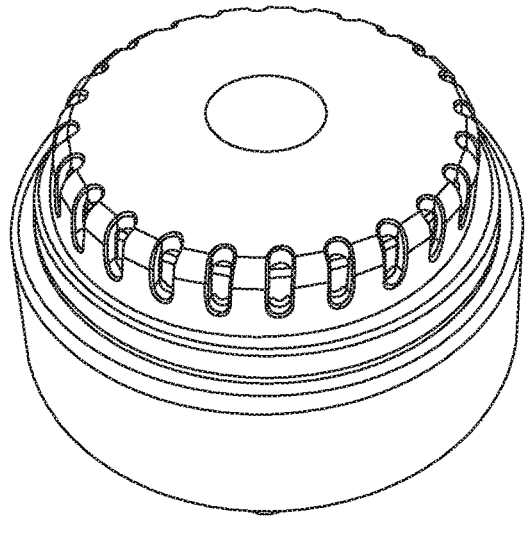
FIG. 43
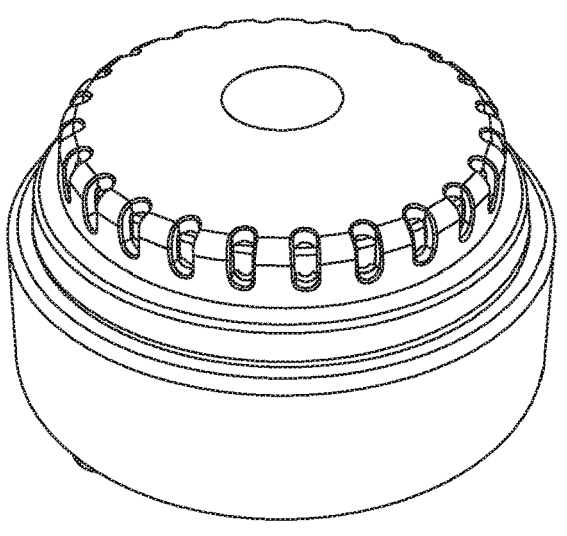
FIG. 42
FIG. 44

(Sect. A-A)

(Sect. B-B)

(Sect. C-C)

(Enlarged View D)

E

4907

4901 4902 4903 4904 4905 4906

(Enlarged View E)

F

5001

5007

5002

5003

5005

5004

5006

(Enlarged View F)

(Enlarged View G)

SYSTEMS, METHODS AND DEVICES FOR COMMUNICATION

CROSS REFERENCE TO RELATED APPLICATION

This application claims priority to PCT Application Serial No. PCT/US2022/019023, filed Mar. 4, 2022, which claims priority to (1) U.S. Non-Provisional application Ser. No. 17/667,461, filed Feb. 8, 2022 (now U.S. Pat. No. 11,445, 704), and pursuant to 35 U.S.C. § 119(e), to (2) U.S. Provisional Application No. 63/156,926, filed Mar. 4, 2021, (3) U.S. Provisional Application No. 63/189,828, filed May 18, 2021, and (3) U.S. Provisional Application No. 63/228, 578, filed Aug. 2, 2021, which are hereby incorporated herein by reference in their entireties.

FIELD OF THE INVENTION

The present disclosure relates to design of devices, systems, and methods to facilitate the development of communication, including animal communication. The present disclosure also relates to sound generating devices, systems and methods, including sound generating devices for animal communication and for use in wet and/or rough environments.

INTRODUCTION

Devices having a circuit that when actuated drives a speaker to make a sound frequently see a trade-off between ruggedness and functionality. For purposes of this application, the term "Sound Button" references this category of devices (although they need not be shaped like a button or bear a physical actuation switch).

The introduction of animal training Sound Buttons underscores the importance of eliminating this trade-off. Animals can be messy, can drop, drool or bite things, can drag muddy or wet substances to buttons, and generally present an environment that is hostile to exposed electronics. At the same time, the importance of transmitting a clear sound is heightened in the case of training devices.

For example, and as described in U.S. provisional patent application 63/228,578 (the contents of which are hereby incorporated by reference as if fully set forth), sound can be used to synchronize or otherwise communicate between a plurality of Sound Buttons, making any degradation in sound a potential point of failure. Similarly, the fidelity of sounds is important. Dogs are more easily trained if (a) each button generates a similar sound quality, (b) the buttons produce a loud, high quality sound that the dog recognizes as the voice of the owner, (c) the buttons do not change sound quality significantly and/or rapidly, (d) the buttons do not develop any sound artifacts that might render the sounds more difficult to understand and/or painful or uncomfortable to hear, and (e) the buttons produce a loud, high quality sound such that the dog recognizes the word, phrase, or other sound it produces. We use "dogs" as an example case here, but unless the context clearly indicates otherwise, the inventions also apply to use by other animals (e.g., cats, rabbits, ferrets, pigs, etc.).

Dogs and other animals naturally attempt to communicate, including communication across species. For example, a dog that needs to empty its bladder may scratch on the front door and a cat that is hungry may vocalize near the food bowl. Indeed, there have been some examples—such as Nim Chimpsky and Koko the gorilla—where animals learned to use a broad range of concepts in communication with humans. In many cases, a gating factor to improved human-animal communication (and indeed in human-human communication) is lack of a shared language. For animals without the capacity to speak, a primary gating factor is the lack of a communications modality that the other species (usually humans) understand and can use. We note that while we use the term "dog" herein, unless the context clearly requires otherwise, that term should be understood to include other trainable animals (e.g., cats, rabbits, ferrets, pigs, etc.). In many cases, very young children and humans with communication disorders or limitations may also be included in the term.

Existing methods for animal/human communication tends to rely on humans teaching the dog human communications modalities. Dogs are trained to hear and understand simple words, such as "sit". Dogs are trained to respond to stimuli in a manner that humans prescribe—such as when a drug sniffing dog "alerts" to a smell by acting out the behavior that it was taught to engage in when it smells drugs. Dogs do attempt to fill in the gaps by devising their own communications modalities, such as barking to get attention, scratching on a door, etc. However, more often than not these efforts are discouraged because humans do not appreciate the importance of the dog's effort to communicate (and because in some cases the dog's efforts can annoy humans or damage property).

In "Use of Semantic Boards and Semantic Buttons for Training and Assisting the Expression and Understanding of Language", PCT/US2020/064122 (filed December 2020) (referred to as "122"), the full text of which is incorporated herein as if set forth in full, we explore, inter a/la, modalities for communication using buttons that have been programmed by humans.

In the '122, we noted that it has been shown that dogs can use buttons that produce the sound of words to express themselves, including to humans. At present, spatial arrangement of these buttons for use by dogs is almost entirely arbitrary as perceived by humans, and likely arbitrary as perceived by dogs, as is demonstrated by videos showing dozens of individuals using button grids with different, and often haphazard, layouts. Moreover, the buttons themselves are hard for language learners to identify the meaning of, as they are not distinct from each other in a manner perceptible and/or appreciated by a dog.

The '122 further notes that the combination of neuroscientific and cognitive scientific design principles with physical hardware design principles in a set of extensible devices represents a substantial and novel departure from any techniques previously known. From a learning perspective, the polygonal grid design simultaneously provides local cues to learners regarding word meaning while also implying semantic vectors that suggest methods by which word meanings can be elaborated, all in the context of a low-cost, easy to configure and use, and durable design.

The inventions disclosed herein address a variety of novel, non-obvious breakthroughs. In one aspect, the inventions facilitate the creation of a common communications modality—common in the sense that both the human and the dog can play a role in the development of the modality.

Thus, a strong need exists for a sound button capable of operating in adverse conditions without sacrificing the sound quality, speaker and/or other components.

As a preliminary matter, we teach the inventions herein in a manner easily accessible to those skilled in the art. To make the teachings herein more accessible, we do not sharply distinguish between a discussion of the background of the field and discussing the instant inventions. Accordingly, while we discuss background material outside of the summary and detailed description of invention sections, we may also discuss novel, non-obvious and useful inventions outside of those sections, such as in the introduction or the background section. Inclusion of matter within a given section is not an acknowledgement that the matter is prior art, and should not be so construed. Put another way, much of the material throughout the document is intended to provide a general overview of material that might help to teach those skilled in the art how to implement the inventions. No admission or acknowledgement regarding whether any of the material discussed in these sections is prior art is intended, nor should one be inferred.

BACKGROUND

Prior art solutions have fully enclosed the sound generating apparatus, including the speaker, the integrated circuit and/or printed circuit board ("PCB") to avoid damage from liquids or other contaminants. Another prior art iteration is to simply expose the speaker to avoid sound degradation by an enclosure, accepting the risk of sound degradation by damage and/or liquid.

Buttons that may be actuated by dogs are known in the art, such as that found in FIG. 18d of Anderson et al., U.S. Pat. No. 8,944,006. The Anderson button is dome-shaped with a flat bottom and appears to be fully enclosed.

In Chih-Hsien Wu, U.S. Pat. No. 7,786,875, a dog-worn device is presented, capable of actuating a speaker. The Chih-Hsien Wu art apparently is a liquid-vulnerable device capable of being covered by a waterproof seal. Such a seal would obviously interfere with any sound emitted from behind the seal.

Mckinney, U.S. Publication No. 20120097113A1 describes a pet toy where a speaker is actuated by squeezing and/or manipulating the toy. It appears that Mckinney does not address the issues of sound quality or vulnerability to adverse conditions.

Dogs are thought to have developed their relationship with humans approximately 14,000 to 30,000 years ago. It is not yet certain how they came to develop their symbiotic relationship, but a current popular hypothesis is that dogs "self-domesticated" by spending time eating scraps, garbage, and carcasses discarded by humans. Humans would have quickly killed aggressive dogs, while the nicer and most useful (or those with traits such as large eyes that are associated with human caring) would have managed to successfully win over human hearts, perhaps first acting as a kind of warning system. Since then, of course, dogs' roles in human life have significantly expanded to the point where many now regard dogs as "part of the family."

Just several hundreds of years ago, it was common for women to have children while teenagers. In the past several centuries, nearly all women who bore children would have had children not later than their early or mid-20's. However, today, as people postpone marriage and child-rearing, the urge many individuals and couples experience to have something to care for is not being met. Instead of babies, many are turning to pets, and in particular dogs. Furthermore, as human life expectancy has grown, the desire for a baby substitute is appealing to "empty nesters". The "cuteness" babies exhibit, and humans perceive, is an evolutionary adaptation that compels human care-giving, and it is very likely this same trait that dogs (especially puppies and kittens) exploit.

As proto-babies, then, dogs elicit from their care-givers many of the same caring behaviors. In particular, one care-giver impulse is the normally-frustrated desire for higher bandwidth communication. The need for better understanding and to "get inside their head." This is evidenced in part by the frequent use of high-pitched "baby talk" in speaking with dogs. "Baby talk", also known as infant-directed speech, and formerly called "motherese," is a form of speech production that has been found to speed language learning through the use of phonetic and intonational exaggeration. However, it is worth noting that language development in humans can, and often does, include adult adoption of terms created by a child. For example, a child may have trouble pronouncing "grandma" and simply say "meme" instead. Because the adult knows—or quickly figures out—that meme is the child's term for "grandma", it is common for the adult to allow the child to use that term and even for the adult to use that term around the child.

The utility of dogs in improving the mental health of those in isolation, such as prisoners or hospital patients, has long been a subject of research. However, the COVID-19 pandemic and associated restrictions has underscored the critical role that dogs play in assisting those in isolation—or even those simply living alone. In recognition of the importance of pets to human happiness and mental health, some jurisdictions, such as Vancouver, Canada, have adopted motions supporting a public policy prohibiting "no pets" clauses in leases. As pets come to play a more central and crucial role in human wellbeing and mental health, it is critical that interspecies communication modalities be developed exceeding what is made possible by existing technology.

Dogs, for their part, are famously social animals who hunt, travel, and live in packs. A successful pack requires some amount of communication among its members, and since packs are social constructs, and/or to the extent they are hierarchical, an understanding of social situations is highly evolutionarily adaptive to the pack's members. This understanding of the organization of groups of individuals is likely what led to dogs becoming useful as aids to human shepherds. After humans and dogs began to co-evolve, dogs gradually became bred for their ability to herd and protect, as well as how to learn and follow commands. The extent of differences in dog morphology (size and shape) is a testament to the speed and productivity of selective breeding for physical attributes—it stands to reason that similar magnitude effects would have found themselves manifested in the evolution of the dog's cognitive and behavioral attributes.

Most dogs today exist as pets and act as human companions. Indeed, most households regard dogs as "members of the family". As family members, and as "proto-babies" partaking in many family activities, many households have a keen interest in having better communication with their dog. Currently, this need is only partially met through the hiring of dog trainers and through learning of dog training techniques. Such training techniques are widely considered varieties of learning/training by classical and operant conditioning. In the case of classical conditioning, learning is a kind of prediction: a bell's ring is associated with food for a dog, and food is associated with mucus production in that dog, and thus a bell's ringing can "cause" mucus production in the same dog. In the case of operant conditioning, a dog performs a behavior and receives either positive or negative feedback for having done so, causing a corresponding increase or decrease in the future performance of the behavior.

To date, dog conditioning has been done from the perspective of the human. That is, communication tends to be on human terms and about the things that humans find important. Police dogs, drug dogs, cancer-detecting dogs, rescue dogs and other dog "jobs" serve humans. However, there is a need for dog-centered communication. For example, a dog may feel ill but be unable to tell the human that it is sick, much less what part of their body feels sick. As a result, a dog with a stomach bug may defecate in the house and be punished, all for want of a way to tell its human "my stomach hurts, help". Even communications that appear dog-centered, such as a dog scratching on a door to ask to go on a walk, serves a dual purpose in alerting humans to the need for the dog to void. Most humans have inherent caring characteristics yet are unable to learn from the dog how the dog needs to be cared for.

Of course, most dog behaviors are not a direct result of deliberate classical or operant conditioning. Stories abound of dogs learning words and social conventions within the home entirely incidentally, absent any intentional training. Like all animals, dogs are sensitive to the rich environmental context of their behaviors and the environmental consequences of their behaviors. As such, they can learn novel and clever behaviors in the absence of a punishment or a food reward, be it repeatedly tossing a ball down a set of stairs, lifting a latch to escape from a cage, or coming to the aid of a person in distress.

Were humans exclusively trained through direct operant conditioning, it is unlikely that a human would be able to write this sentence. There are relatively few "human obedience schools" because the existence of language has enabled the kind of rich communication that both obviates and provides alternatives to the kinds of acting out that infants might perform. Both unhappy dogs and infants will act out to get attention, the unwanted behavior often persisting until attention is gotten, or the problem has resolved.

Thus, providing dogs with the ability to understand and express words is likely to have benefits not just of novelty, but also to the wellbeing of dogs and people alike. The trust that higher bandwidth communication engenders is a universal factor in preventing unwanted behavior. Individuals in richer communication with each other are better able to predict each other's reaction, which serves to both prevent unwanted behaviors and help select more prosocial ones. For instance, dogs able to express that they need to urinate are much less likely to do so in a location where they're not allowed to, like indoors. One particular need is disambiguation of meaning. Without a common language, such as that proposed by embodiments of the inventions herein, a dog may develop a signaling system that presents as ambiguous for humans. In a simple example, a dog may sit at the feet of a human and stare when the dog is hungry and when the dog needs to be walked.

Taking another example, dogs bark for a variety of reasons. Excitement, a call for attention, food-seeking, boredom, fear, anxiety, territoriality, pain, surprise, reaction to unexpected stimuli, dementia, warning, and other reasons can cause a dog to bark. Although the dog's body language and the characteristics of the bark sound may provide a clue as to the reason for the bark, it is frustrating for humans—and likely for dogs—that humans normally do not understand which of these reasons has triggered the barking. Indeed, it is likely that communications between dogs are supplemented by signals that humans do not perceive. For example, a dog's superior senses of hearing and smell may provide the context for other dogs to determine whether another dog's bark is in response to a distant, quiet barking sound or in response to the nearby presence of an unknown human as indicated in part by the presence of the scent of that human.

By allowing dogs to be more precise and/or specific in their communication, the bark may be characterized by the dog. For example, a bark accompanied by a button press for "play" may indicate boredom; accompanied by "danger" may mean warning; accompanied by "treat" may mean hunger, etc. In one aspect, a bark may be detected by an audio detection device operably coupled to a network that is also operatively coupled to at least one button. Certain combinations—such as a bark combined with "warning"—may trigger a signal to a device capable of communicating to a human, such as a portable phone. In some cases it may be that the availability of the button may mean a loud and disruptive bark may no longer be required.

Because of these benefits, the market for a device, system, and method for rich communication with dogs is likely of value in nearly every household (or business, community or similar construct) that has a dog. If puppies can be taught to understand and express their needs, wants, feelings, and thoughts, and this leads to richer interactions with other species, the impact will be hard to overstate. Advanced communication with dogs will improve and enable better participation of working dogs in the economy, enabling them to be trained more quickly and perform their tasks more precisely. For example, dogs already make excellent aids in a security context, in helping with patrols. With rudimentary language abilities, dogs could potentially even replace humans in this role or at least operate with a higher ratio of dogs to human handlers. They will also be in a better position to entertain themselves when left by themselves at home, enabling them to be more independent and less anxious in this context. Just as a dog might play with a ball even though there is nobody present to throw it, so too might the dog play with language as expressed via the inventions. They will also be able to provide richer and more meaningful companionship to billions of people entering old-age, potentially helping alleviate the current crisis of loneliness, and perhaps even to transform old-age facilities as they're currently understood.

Protection and service dogs cost tens of thousands of dollars to train: word-based communication, however, would potentially mean a significant reduction in training time and thus, potentially, costs. Since we know dogs can detect such things as the early signs of cancer, Parkinson's, Alzheimer's, and seizures, word-based communication could result in major medical advances. Similarly, dogs and many other animals can detect an impending natural event in advance of the event taking place. Using earthquakes as an example, it is thought that animals can detect primary waves, or "P-waves", earthquake waves that precede the dangerous later waves.

It is important to note that the range of canine to human communication methods normally available is very limited. For example, and as discussed above, a dog might bark out of excitement, boredom, in response to auditory stimuli, in response to an intruder, to simply alert humans to something happening, or for other reasons. Without the ability to further clarify, however, the human is left wondering what the dog is feeling or trying to convey. This is like a dog scratching at the door to the outside. The dog might need to urinate or defecate; the dog may be bored; the dog may want to go outdoors; or the dog might want to visit somebody. Again, with such a blunt communications tool, the human is left wondering what the dog wants. By allowing the dog to further refine the expression, such as a bark accompanied by pressing the button for "scared", the dog can refine the communication. Furthermore, by allowing such refinement, the dog's press of a button may be used to trigger real world responses. For example, pressing the "scared" button might send a signal to the owner's mobile device together with video of the room, the front porch, etc. Pressing the "light" button might turn on a light.

Indeed, service dogs could even be trained to press a button that summons help if the owner appears incapacitated. In one implementation, an alert would be triggered (such as an alarm, a light, a signal to a mobile device, or otherwise) and the owner given a set amount of time (such as 60 seconds) to cancel the alert before emergency responders are summoned. In another implementation, the reverse of the normal warning/cancellation sequence may be utilized. In this implementation, a device may alarm to indicate a problem with or for the human, such as a burglar alarm or a cardiac event detected by a watch with an EKG or pulse monitor or a loss of consciousness causing a fall detected by sensors. The dog would have a button for "help", confirming the signal, and a button for "ok", canceling the signal or redirecting it to a lower priority recipient, such as a redirection from ambulance to a neighbor.

In another aspect, "drug dogs" and other animals trained to sniff out things such as contraband may be able to differentiate between different drugs (or other materials). Taking Fang, an airport drug dog, as an example, Fang may have been trained to identify heroin, cocaine, and Adderall. Fang may alert in response to a carry-on bag only to have the owner say that they have a prescription for Adderall and there must have been remnants of a pill in the bag. Rather than search the bag and detain the person, it may be possible to have Fang press the button for "Adderall" (if it is Adderall) and the officers could then tell the person that they should have their partner text them a photograph of their prescription bottle. Without such disambiguation, the officers would likely have to respond as if the dog had detected the worst-case scenario. This may be similar to a bomb sniffing dog alerting to nitrogen fertilizer. Because the officers do not know whether the dog is alerting to a very energy-dense material such as C-4 explosive that could be hidden on a person, the officers would be forced to search the person. If the dog could press a button saying "nitrogen fertilizer", the officers would know they were searching for a far less energy-dense potential explosive—allowing them to avoid searching extremely small spaces for example. Another embodiment is where the dog may augment the alert by indicating the relative strength of the scent with buttons. A dog can be trained to detect and differentiate different substances, but it is much harder for them to indicate their certainty level. Current technology allows for an essentially binary "yes" or "no" indicator, while buttons may be assigned to indicate "a little bit", "probably", "very certain", etc. Indeed, even a single button may be configured so that the rapidity, firmness, cadence, and repetitiveness of button presses are processed and utilized to enhance the communication.

It is unknown whether canine language abilities will lead to a substantial improvement in canine intelligence. Language acquisition plays a critical role in the development of much of humanity's most advanced cognitive abilities. Feral children—individuals who have reached adolescence without exposure to language—almost all display significantly diminished cognitive capacity. This is in part because complex cognition is thought to be scaffolded on words and how we use them. For instance, the word "if" is believed to have originated from a word having to do with things being "doubtful". Now that we have "if", however, we're able to have a new kind of conversation that goes beyond the concept of mere doubt. For example, "if you hit the glass it will break", or perhaps even more powerfully, the use of "if" in the context of computer programming. While we may not see a canine Albert Einstein anytime soon, we might see canine word use enabling new abilities not previously available.

Of interest is that enabling linguistic capabilities in dogs may result in improved inter-canine communication. For example, one dog may press the "play" button, and the other dog may then press "play" and "outside". The dogs could then run out of the dog door.

It would also be unsurprising for the canine to suffer less mental distress if the canine can communicate its needs. A dog that is less distressed is less likely to engage in destructive behaviors.

The market for a product like this is likely to be massive. Perhaps even category-creating. Currently over 50 million US households have dogs, and the pets market exceeds $90 billion in the United States alone. Customer spending will likely double or triple if and when many dogs can deploy simple language abilities.

Various devices have been invented to attempt to train non-human animals to use language. Kanzi, a chimp, was taught to point at icons on a board to communicate.

Other approaches to language training in dogs have only been successful in the area of word comprehension, and not really made an attempt at word production or meaning expression, and even then, such efforts were only accessible to experts using home-customized hardware. Anna Jane Grossman, a trainer at "School for the Dogs" in New York City, trained a limited number of dogs to touch the visual images of "yes" or "no" on an iPad.

The late Dr. John Pilley, a retired professor of psychology, trained his dog Chaser the names of over a thousand objects. Doing so took many years of deliberate effort, and still, the result was only that Chaser could recognize words, not produce them. Chaser had neither any understanding, ability, or need to generate those words herself.

In addition, the CLEVERPET® Hub device, which entered the market in 2016, was designed by cognitive scientists and neuroscientists to use software to facilitate learning of complex tasks. In 2019, CLEVERPET® released the source code that enables CLEVERPET®-based training, enabling community members to create games that, e.g., train dogs to learn the names of different colors. Doing so required the use of a secondary computer. Patents and applications related to the Hub device, use or improvements thereon, at least in part, include without limitation U.S. Pat. No. 10,506,794 ("Animal interaction device, system and method"), U.S. Pat. No. 10,349,625 ("Animal interaction device, system and method"), U.S. D775769S1 ("Animal interaction device"), applications PCT/US2015/047431, Ser. No. 16/896,042, and Ser. No. 16/839,003, together with certain non-US counterparts.

Most recently Christina Hunger, a Speech Language Pathologist, used buttons that play recorded words to teach her dog Stella to "say" over 29 words (as of the time of writing). She was able to do so in a time period comparable to that of human language learning—less than 12 months. Remarkably, Stella appears to be able to express new concepts through word combinations, e.g. "water outside" when the button for "beach" wasn't working. Stella also seems to be able to construct proto-sentences (e.g. "want eat play"). The buttons Christina used for this purpose are readily available for sale, and in the hands of a speech language pathologist, can be used for teaching. She distributed the buttons on a cartesian grid "word board."

SUMMARY OF INVENTION

The present disclosure presents devices, systems, and methods for training both non-humans and humans to communicate more effectively than previously possible. The present disclosure also presents devices, systems, and methods for sound buttons capable of emitting sound using less power, greater sound transmissibility, and/or greater resistance to damage and that allow for training both non-humans and humans to communicate more effectively than previously possible. While domestic dogs are used in this disclosure as an exemplary animal, unless the context clearly requires otherwise, from this point forward, terms that refer to dogs are meant, without loss of generality, to refer to any animal lacking the ability to make their needs and thoughts understood at the level of a typical human adult. Unless the context clearly requires otherwise, the term includes humans who are preverbal or with communication impairments.

Training of dogs is highly sensitive to factors that may not play a role—or that play a less significant role—in human training. Several factors are desirable:

Predictability: Dog training is best accomplished by having a high degree of predictability between the dog's action and the result. If, for example, a dog were to press a button on a hexagon tile ("hextile") that is in the spot where "walk me" normally is, having the button respond with "feed me" would rapidly undermine what the dog had earlier learned.

Safety: Any device used in training should not cause any risk to the dog. In particular, a single episode of negative reinforcement early in training may interfere with adoption of the system.

Simplicity: Any device should not be too complex for the dog to understand.

In typical embodiments, a sound button comprises; (i) a shell; (ii) a switch operable connected to a printed circuit board ("PCB"); (iii) a button cap assembly operably coupled to the shell, the button cap assembly comprising a button cap having at least one recess, the at least one recess having a hole and a speaker facing an air space in the button cap; where, when a force is applied to the button cap, the button cap and the speaker move together to actuate the switch, thereby causing the speaker to emit a sound.

In one aspect, the button cap assembly comprises an enclosure having holes through which the sound can be transmitted, but which, in one aspect, are displaced from the location of the speaker. In another aspect, each of the holes is equipped with a valve or shutter with a default "shut" position. In one aspect, the valve may be mechanically opened when the switch is actuated. In another aspect, a pressure generation device, such as a fan, may blow through the hole, opening the valve. In another aspect, the valve may be opened by pressure and/or the air displacement that occurs because of speaker movement.

In one aspect, the sound button has a button cap that is dome shaped. The sound button may have substantially flat bottom (which may or may not have protrusions, such as grips, legs, or switches). A speaker may be located in the dome (preferably in the center) and one or more holes may be located around the perimeter of the dome. In one implementation, a switch to actuate the speaker may be placed at or near the center of the dome, allowing a dog to actuate the speaker without muffling the sound with its paw. In another aspect, the holes themselves are rounded (preferably on the bottom) to minimize the risk of liquid becoming trapped or running into the interior of the button.

In one aspect, the speaker is attached to and/or located within the button cap. When attached to the cap, the speaker may move together with the cap such that pressing or applying a force to the cap causes the button to move to actuate the switch. In some aspects, the speaker is placed in an upward position (facing the button cap and preferably into an air space in the button cap. The placement of the speaker in an upward position allows the sound button to be located in an enclosure, such as a HEXTILE® enclosure, without impairing sound transmission.

In another aspect, a speaker may be in a place or an orientation that does not directly connect to an unobstructed pathway to the outside of the button. In such a case, one or more hollow components (such as a tube) may be used to transmit sound from the speaker to the output holes.

In another aspect, the speaker may be used as a structural component, connecting a switch to the button cap (also referred to as a "top cap"). The rigid frame of a speaker may be utilized to transfer load from the button cap to a switch operably connected to a PCB.

In another aspect, the speaker may be equipped with a KAPTON® and/or other hard plastic membrane that provides a level of waterproofing and/or protection from other hazards. Gravity may be utilized to remove liquid and/or contaminants by turning the button over. Additionally, playing a sound may cause the liquid and/or contaminants to move from a position on the speaker.

In one aspect, a PCB provides some or all logic control for the sound button. In one implementation, the PCB connects to the speaker via wiring while the remainder of the connections, such as from a power source, microphone, and/or a momentary switch, are connected directly to the PCB. These connections may be made through components having holes, or fixed leads that go through holes in the PCB. Another connectivity approach is surface mount technology ("SMT"). Among the advantages of such an approach are obviating the need for soldering wires to connect components, easier testing of the PCB assembly ("PCBA"), and making PCBA testing prior to mounting in the sound button easier and more accurate.

In one aspect, there is a slide switch (a mechanical switch that slides between two positions (single pole) or more than two positions (double pole or multiple pole)). In the sound button, one desirable feature is a slide switch to control recording of sounds via a microphone (although a momentary switch or other switch may be utilized) in a first position, and to enable playback of the recorded sounds in a second position. In one aspect, the slide switch is located at, near or on the bottom of the sound button to prevent accidental switching when the button is interacted with, inserted into a mount, tile or HEXTILE® or rotated. The slide switch may be recessed (independently of or in combination with placement on the bottom of the sound button).

One issue for sound buttons is actual and perceived responsiveness and rigidity of the button. In one aspect, the PCB may rest on a battery cavity to improve rigidity of the PCB. All forces applied to the button cap downwards by the user may be transferred via the speaker (which in most cases is a rigid structure), switch and PCB to the bottom shell of the sound button. Because the forces are perpendicular to the PCB, flexion of the PCB, a potential cause of defects or failures, is minimized.

In one aspect, the battery compartment is at or near the bottom of the device. By making the batteries easily accessible, they are easier to change. Furthermore, it is not uncommon for batteries to swell, particularly after a long period in a device and/or in conjunction with a deep discharge. Indeed, swelling may relate to (a) overcharge conditions that may accelerate parasitic reactions between the electrodes and electrolyte with a corresponding release of heat and gases; (b) poor cell quality and design with low anode to cathode stoichiometric ratios; (c) particulate contamination; (d) mechanical damage to electrodes induced either during cell assembly or from the product application; and/or (e) excessive temperatures. By placing the batteries away from sensitive components, such as the PCB, battery swelling-induced damage is less likely.

Furthermore, it may be desirable to fix the battery compartment cover in a manner that minimizes vibration of the cover when playing audio through the speaker, which, may, among other things, cause resonance and/or reduced audio quality. The battery compartment cover may be fixed with a screw and/or a rubber, soft and/or flexible gasket.

Turning to the top of the sound button, a tab at or near the top portion of the shell and a corresponding indentation in the button cap may be utilized to prevent the button cap from rotating and vibrating while in use. In addition to possible damage to or disconnecting of the speaker wires, rotation of the button cap would cause changes to the orientation of any markings on the button cap, particularly markings on the exterior of the button cap, identifiable by a human and/or an animal.

A critical issue regarding sound buttons, particularly when they are in use in an environment that may be wet or dirty (e.g., when used by pets), is the ability of the speaker to retain a minimally obstructed pathway to transmit the sound while simultaneously minimizing the risk of water or liquid intrusion, particulate intrusion, or other intrusion which may cause damage, particularly to the electronic components. As disclosed herein, the button cap may be affixed to, or proximate to, the speaker. The button cap may have at least one recess and/or cut-out (preferably on or around the perimeter and/or the side of the sound button), and a hole part of and/or adjacent to the at least one recess/cut-out to permit the sound to escape. In some aspects, the hole may be a substantially vertical slot and may also be configured with contoured surfaces capable of directing contaminants away from the recesses/cut-outs.

BRIEF DESCRIPTION OF THE DRAWINGS

FIG. 4A is a perspective (primarily top) view of a hextile.

FIG. 4B is a perspective (primarily side) view of a hextile.

FIG. 4C is a perspective (primarily side) view of a hextile.

FIGS. 41-44 are top perspective views of a sound button.

FIG. 48B is an enlarged perspective view of a portion of the button cap of

FIG. 48A.

DETAILED DESCRIPTION OF THE INVENTION

Figure 1:
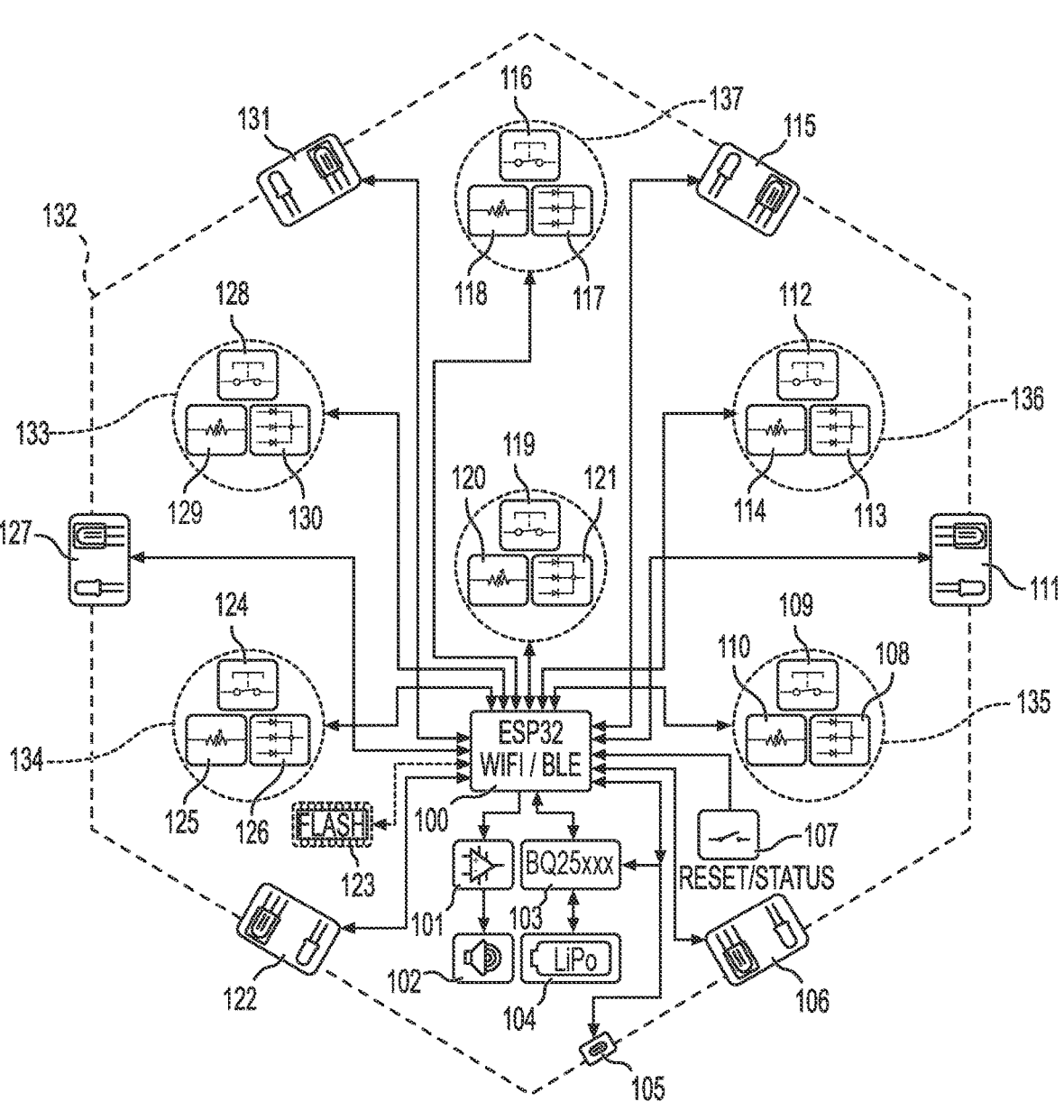
FIG. 1 is a diagram showing a hexagonal tile ('hextile") equipped with various electronic components.

Reference will now be made in detail to embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications, and equivalents that may be included within the spirit and scope of the invention. Furthermore, in the following detailed description of the present invention, numerous specific details are set forth in order to provide a thorough understanding of the present invention. However, it will be readily apparent to one skilled in the art that the present invention may be practiced without these specific details. In other instances, well-known methods, procedures and components have not been described in detail so as not to unnecessarily obscure aspects of the present invention. These conventions are intended to make this document more easily understood by those practicing or improving on the inventions, and it should be appreciated that the level of detail provided should not be interpreted as an indication as to whether such instances, methods, procedures or components are known in the art, novel, or obvious.

Abbreviations and Definitions

To facilitate understanding of the invention, a number of terms and abbreviations as used herein are defined below as follows:

Semantic button: As used herein, the term "semantic button" refers to a physical or digital (e.g. touchscreen-based) object that can be actuated (e.g. pressed) by a learner, in the process causing the expression of the concept to which the semantic button refers (e.g. via emission of the sound of the word referred to by the concept).

Semantic board or tile: As used herein, the term "semantic board" or "semantic tile" refers to a physical or digital object on which semantic buttons can be arranged. In one embodiment, the board is preferably a hexagon but could also be another shape. In a different embodiment, interlocking or otherwise proximate tiles may be located in a manner that creates a large board comprised of the tiles.

Elaboration: As used herein, the term "elaboration" (or "elaborate") is broadly defined to mean the set of concepts or words that are more abstract, complex, elaborate, obscure, specific, or esoteric than the ones under consideration or otherwise closer to the center of the semantic axes. It includes concepts that are combinations of the ones under consideration with others. For example, an elaboration of "dog" could be "Daschund" (a dog breed).

Semantic vector: As used herein, the term "semantic vector" refers to a direction, travel along which leads to elaboration of concepts or words located along this vector.

Semantic axes: the three semantic vectors representing sentence subjects, sentence verbs, and sentence objects, with all three originating from the same point, and with sentence subjects and sentence objects proceeding in away from each other in opposite directions and sentence verbs elaborating at a right angle to the axis defined by sentence subjects and sentence objects.

Trainer: As used herein, the term "trainer" is broadly defined to include any agent (human or non-human animal, or digital/electronic entity) that has the intention of communicating with a learner or training (or teaching) a learner to communicate.

Learner: As used herein, the term "learner" is broadly defined to include any agent (human or non-human animal, or digital/electronic entity) that is learning to use semantic buttons or semantic boards.

Hextile: A hexagonal tile.

Note that for purposes of this disclosure, a hextile may, unless the context indicates otherwise or the functionality described is specific to hextiles, refer to triangles or squares. In some cases, a four sided polygon other than a square may be utilized in conjunction with other four sided polygons to create a substantially seamless connection between the edges of the polygons.

Where we utilize the term "CleverPet® Hub" herein, it should be understood to include some of the technology described in U.S. patent application Ser. No. 14/771,995 as well as other devices with similar functionality, to the extent that such devices exist or will exist. We also use the term "button" herein to mean any touch or other interface that can be activated by a dog.

Brief List of Figure Components

To facilitate understanding of the figures, information about the components is briefly described:

FIG. 1: Fluentpet Tile Internal Hardware Block Diagram

100: Low-Power SoC (System-on-Chip) with MCU, and RF Transceiver (WiFi, BLE, Thread, Zigbee, . . . )

101: audio amplifier

102: Speaker module (speaker+housing)

103: Charger controller IC and battery manager system

104: Battery (rechargeable or primary)

105: USB or other power connector

106, 111, 115, 131, 127, 122: IR transceiver

107: reset/select/pair switch

108: RGB LED
109: micro switch
110: (resistive) force sensor
112, 116, 121, 130, 126: RGBLED
113, 117, 119, 128, 124: micro switch
114, 118, 120, 129, 125: (resistive) force sensor
135, 136, 137, 133, 134: button assembly
123: flash memory chip
FIG. 2: Fluentpet System Overview
  200: Fluentpet tile
  201: Fluentpet tile
  202: Fluentpet tile
  203: Fluentpet tile
  204: Fluentpet tile
  205: IR communication link
  206: IR communication link
  207: IR communication link
  208: IR communication link
  209: IR communication link
  210: Home WiFi access point
  211: FluentPet cloud server(s)
  212: Smartphone with Fluentpet application
  213: IR communication link
  214: IR communication link
  215: Fluentpet tile
  216: Fluentpet tile
  Present but unnumbered: WiFi communication links and
    bluetooth low energy communication links
FIG. 3: Fluentpet Tile Render
  300: Fluentpet tile
  301: IR transparent window for IR transceiver
  302: IR transparent window for IR transceiver
  303: removable button assembly
  304: removable button assembly
  305: removable button assembly
  306: removable button assembly
  307: removable button assembly
  308: removable button assembly
FIG. 4: Fluentpet Tile Render
  400: Fluentpet tile
  401: Duplicate of 409.
  402: IR transparent window for IR transceiver
  403: removable button assembly
  404: removable button assembly
  405: removable button assembly
  406: removable button assembly
  407: removable button assembly
  408: removable button assembly
  409: speaker port (grill)
  Unnumbered but present: top facing camera sensor on top
    of tile just above speaker grill
FIG. 5: Fluentpet Tile Render
  500: Fluentpet Tile
  501: speaker port (grill)
  502: IR transparent window for IR transceiver
  503: removable button assembly
  504: removable button assembly
  505: removable button assembly
  506: removable button assembly
  507: removable button assembly
  508: removable button assembly
  bottom hook and loop attachment (velcro bottom)
FIG. 6: Fluentpet Tile Render
  600: Fluentpet Tile
  601: IR transparent window for IR transceiver
FIG. 7: Fluentpet Tile Render
  700: Fluentpet Tile

701: speaker port (grill)
  702: IR transparent window for IR transceiver
  703: removable button assembly
  704: removable button assembly
  705: removable button assembly
  706: removable button assembly
  707: removable button assembly
  Centrally located removable button assembly
FIG. 8: Button Assemblies With Switch and Push Force
Measurement
  800: Removable button top assembly
  801: button top assembly plunger
  802: micro switch
  803: hinged lever
  resistive force sensor
  spring
  804: Fluentpet tile
  806: standard computer keyboard switch assembly
  807: resistive force sensor
FIG. 9: Fluentpet Tile With Adjustable Button to Button
Spacing
  900: Fluentpet tile
  901: magnet with north side oriented to the outside
  902: IR receiver
  903: IR transmitter
  904: magnet with south side oriented to the outside
  905: magnet with north side oriented to the outside
  906: magnet with south side oriented to the outside
  907: magnet with north side oriented to the outside
  908: magnet with south side oriented to the outside
  910: magnet with north side oriented to the outside
  911: magnet with south side oriented to the outside
  912: magnet with north side oriented to the outside
  913: moveable button assembly guide rail
  914: magnet with south side oriented to the outside
  915: magnet with north side oriented to the outside
  916: magnet with south side oriented to the outside
  917: IR Transceiver
  918: magnet with north side oriented to the outside
  919: magnet with south side oriented to the outside
  920: spacer in between tiles to fill up space in between
    tiles according to chosen button spacing
  921: moveable button assembly guide rail
  922: moveable button assembly
  923: moveable button assembly guide rail
  924: moveable button assembly
  925: moveable button assembly guide rail
  926: IR transmitter
  927: IR receiver
  928: IR receiver
  929: IR transmitter
FIG. 10: Fluentpet System Overview
  1000: smartphone with Fluentpet application
  1001: smartphone WiFi connection
  1002: smartphone bluetooth connection
  1003: Fluentpet application
  1004: Fluentpet connected tile
  1005: dog collar
  1006: connected speaker and sensor box attached to dog
    collar
  1007: Fluentpet tile
  1008: speaker port (grill)
  1009: removable button assembly
  1010, 1011, 1012, 1013: visual representation of audio file
    representing a spoken word in Fluentpet application
  1014: speaker and sensor box WiFi connection
  1015: speaker and sensor box bluetooth connection

1016: audio speaker
1017: analog amplifier IC
1018: digital analog converter IC
1019: Low-Power SoC (System-on-Chip) with MCU, and RF Transceiver (WiFi, BLE, Thread, Zigbee, . . . )
1020: ITAC (brand name of ble tag)
1021: connected button bluetooth connection
1022: connected button 433 MHz connection
1023: Connected button
1024: connected button
Inside button for switch and bluetooth SoC
FIG. 11: Fluentpet System Overview Rev2
1100: Fluentpet cloud services
1101: Smartphone application
1102: home WiFi access point
1103: Fluentpet mother tile with bluetooth and WiFi connectivity. Has audio speaker and 6 buttons
1104: Low-Power SoC (System-on-Chip) with MCU, and RF Transceiver (WiFi, BLE, Thread, Zigbee, . . . )
1105: Speaker
1106: switch
1107: Fluentpet child tile
1108: BLE capable Soc
1109: switch
1110: Fluentpet mother tile with bluetooth and WiFi connectivity. Has audio speaker and 6 buttons
FIG. 12: Interconnection of Tiles
1201: Edge of one corner of first hextile
1202: Edge of one corner of first hextile
1203: Edge of one corner of second hextile
1204: Edge of one corner of second hextile
1205: Edge of one corner of third hextile
1206: Edge of one corner of third hextile
1207: Attachment point
1208: Attachment point
1209: Attachment point
1210: Attachment point
1211: Attachment point
1212: Attachment point
1213: Tether
1214: Tether
1215: Tether
1217: Attachment point
1218: Attachment point
1219: Rubber element
1220: Rubber element
FIG. 13: a Soundboard With Hexagon and Arrow Shaped Tiles
1301: hextile
1302: button
FIG. 14: a Soundboard With Adjustable Length Interconnects
1401: Hextile
1402: Hextile
1403: Hextile
1404: Hextile
1405: Hextile
1406: Hextile
1407: Connector
1408: Connector
1409: Connector
FIG. 15: a Local Communication System
1501: Present
1502: Step 1
1503: Step 2
1504: Intertoken
1505: Step 1

1506: Step 2
1507: Intertoken
1508: Voice
1509: Start
1510: Click
1511: Click
1512: Token
1513: Click
1514: Click
1515: Grammar
1516: Token, token
1517 Broadcast: Token 1, token 2
FIG. 16: a Dog Wearing a Collar
1601: A dog
1602: A collar
1603: A speaker
1604: a camera
1605: An inertial measurement unit
FIG. 17A: a Boot for an Animal
1701: A dog's lower leg and paw
1702: A band
1703: A boot
1704: A sensor
FIG. 17B: a Putty Attachment to a Paw
1705: A paw
1706: An attachment modality
1707: A deformable coil
FIG. 17C: a Band With Sensors Around an Animal's Leg
1708: Neural and muscular events
1709: An array of sensors
1710: A band
FIG. 18: Buttons Demonstrating Communication Modalities
1801: Button
1802: Button
1803: Button
1804: Button
1805: Button
1806: Button
1807: Button
1808: Button
1809: Button
FIG. 19: a Method for Training an Animal
1901: Button
1902: Dog hears sound
1903: Dog makes sound
1904: Does sound surpass and/or meet criteria
1905: Message is broadcast
1906: Dog receives reward
FIG. 20: a Dog Engaged in a Play Bow
2001: Raised
2002: Tail
2003: Ears
2004: Pupils
2005: Tongue
2006: Mouth
2007: Bent forepaws
FIG. 21: the Motion of a Dog's Paw
2101: Prior resting position of dog's paw
2102: New location of dog's paw
2103: Arrow indicating the direction of motion
2104: Inertial measurement unit
FIG. 22: a Dog's Feet and Future Motion
2201: A paw
2202: A paw
2203: Arrow indicating required future motion
2204: Arrow indicating required future motion
2205: Left forward motion

2206: Right forward motion
2207: Left forward motion
2208: Right forward motion
2209: Left backwards motion
2210: Right backwards motion
FIG. 23: a Spatial Arrangement for Grouped Semantic Buttons
    2301: A button
    2302: A button
    2303: A button
    2304: A button
    2305: A button
    2306: A button
    2307: A button
    2308: A button
    2309: A button
    2310: A side rail
    2311: A side rail
    2312: A visual display
    2313: A sketchpad
    2314: A semantic button
    2315: A semantic button
    2316: A semantic button
    2319: A grid
FIG. 24*a*: Bidirectional Translation
    2401: Human speech
    2402: Token exchange format
    2403: Render to dog
    2404: Render to environment (general area)
    2405: Human footsteps
    2406: Human motion
FIG. 24*b*: Translation of Factors to a Token Exchange Format
    2407: Render to human
    2408: Dog sound(s)
    2409: Dog actuation of button or other device
    2410: Dog motion
    2411: Dog position
    2412: Token exchange format
    2413: Render to environment
FIG. 25: a Wall-Mounted Structure With Balls
    2501: A wall mounted structure
    2502: A ball
    2503: A ball
    2504: A ball
    2505: A ball
    2506: A ball
    2507: A ball
    2508: A ball
    2509: A ball
    2510: A ball
    2511: A collection of sounds
    2512: A slot
    2513: Ball falls
    2514: A light
    2515: A track
    2516: A track
    2517: A track
FIG. 26: a Flow Chart for Decoding a Dog's Memory
    2601: Sensors
    2602: State
    2603: Context
    2604: Valid data
    2605: Sensor data
    2606: State data
    2607: Context data
    2608: A decoder

2610: A read out
    2611: Channel A
    2512: Channel B

DETAILED DESCRIPTION

Limitations of enabling a dog to learn and communicate with buttons include button misuse (e.g. presses "up" thinking it means down), button use with no response (e.g. presses "hungry" but nobody is home to provide food), and the inability to track usage patterns. However, a practical problem is that any improvement to these issues would be expensive and difficult to roll out if it requires new hardware or if it requires most costly hardware. The instant inventions include modalities for overcoming these limitations.

In one aspect, button pressing is tracked for any button by using ambient variations in button performance, sound or other aspects to differentiate between buttons. For example, a computing device (such as a mobile device, retired from use as a phone or not, a microprocessor such as Arduino, or otherwise), may be used to detect sounds unique to each button and thereby compile a button usage history. As humans and dogs touch buttons differently (and there are differences between members of the same species), the measurements may also be utilized to determine whether a human or a dog pressed the button, and potentially which human or dog.

In one implementation, a mobile device, a "listening" device such as the AMAZON ECHO® or GOOGLE HOME® (or a different kind of computing device) may listen to the word or words played back after a button press and, using voice to text, identify which word or words were said. While voice to text does not necessarily identify a button uniquely, it does identify what playback the dog triggered.

In another aspect, identification of a button may be accomplished by measuring defects caused by manufacturing, aging, overload, climate impact, intrusion of foreign objects (such as dog slobber), location and fit on a surface, and other elements generate irregular distortion. Because dogs have far greater hearing acuity than humans, detection of such defects should be performed to indicate when a button should be replaced. Such detection may be accomplished by using an audio input device such as a microphone combined with a computing device capable of identifying noises outside of those detectable by human adults. Once detected, the system should monitor the button to determine if the dog's interaction with the button is different than the interaction with other buttons. For example, a "raw steak" button is an obvious one for a dog to repeatedly press, but a loud buzz at 45,000 Hz—well within the hearing range of dogs but well above the hearing range of adult (and most non-adult) humans—would likely dissuade the dog from pressing the button.

In one aspect, such a noise may intentionally be incorporated into the sound output from a button. This would help to solve the problem of dogs, newly empowered to communicate, making repeated demands for things such as doing on a walk. A dog may need to go outside three times a day for reasons relating to voiding of bladder or bowels, but may want to go outside every 15 minutes. Of course, a failure to take the dog on a walk after pressing the button would make training the dog far more difficult, impairing their ability to learn and rely on the buttons. In one aspect, every press of a certain button may be made unpleasant with such a dog annoyance sound ("DAS"). In one implementation, the DAS may be activated only once the dog has already been trained as to the meaning of the buttons. In another aspect, the DAS may be presented (and optionally increased in annoyance level with repeated presses) only after the button has been pressed once (and, optionally, the human has confirmed that they heard the sound by sending a signal to the button, such as via a networked device or by actuating the button in a particular way. The DAS may reduce in volume with the passage of time between presses. In one aspect, the dog may be warned that the press of the button will trigger a DAS, such as by having the button light up, emit a small sound, or otherwise.

In another aspect, the button may be "locked out" or deactivated under the same rules as issuance of a DAS sound described above. Use of a DAS has the advantage of allowing a dog facing an urgent problem (such as "let me out before I soil the carpet") to press the button despite the DAS. By imposing a small cost for multiple presses within a set time frame, button misuse is reduced. Because dogs may press a button repeatedly until the request is acknowledged by a human (or by a device operatively connected to the button), the DAS or lock out may not be triggered if there are multiple presses during a set time frame (such as 5 minutes from the first press). Alternatively, or in addition, the DAS or lockout may not be actuated until a human acknowledges that the dog has pressed the button (as described earlier in this paragraph).

Returning to irregular sound distortion, it is likely that speaker performance will change over time. In one aspect, any system, method or device that works by identifying irregular sound distortion may update the sound profile for each button as it detects minor changes. In another aspect, changes in sound distortion may be utilized as an early indicator of a device failure.

In another aspect, audio identifiers may be embedded within the audio produced by the buttons. While the button may be programmed to omit such identifiers, we initially address inclusion of the identifiers within the sound recorded and played back by the button.

In one aspect, the commands and other words recorded on the button are first recorded on a computing device such as an ANDROID® or iOS® device. The device then plays a sound that includes the commands and other words but also relays data. For example, dual-tone multi-frequency signaling, or audio steganography such as least significant bit signaling, phase coding, echo hiding, and spread spectrum. When using DTMF or similar technology, the carrier signal may be capable of holding more data than needed to simply identify the tile. In such a case, extra bits may be used for error correction.

A computing device capable of detecting sound may then "listen" to the sound and decode the data.

In another aspect, it may be desirable to use an always on listening device (the term "always on" refers to the category of device, not to the amount of time the device is on) such as the AMAZON ALEXA® or GOOGLE HOME® to listen for button presses and/or decode data within the sound.

In another aspect, an image recording device, such as a camera, may be utilized to image the tiles and their locations.

Once the tile layout is identified, in one aspect a device is used to transmit to the buttons a configuration, preferably including audio files, that matches a configuration that the pet is used to. In one aspect, when multiple pets regularly use the same device, the device may identify the animal and customize the tiles for the animal. In one aspect, buttons and or tiles may be equipped with a scent generator and/or a visual screen that match the "normal" configuration for a given pet.

Many small companies are simply incapable of putting together the resources necessary to comply with data privacy laws. In one aspect, all personally identifiable data is stored locally and not provided to the server, while providing to the server some or all of the non-personally identifiable data. A proxy for this dichotomy is that animal-generated data is sent to a centralized server while human-generated data is not.

Because of the desirability of mapping the tiles, we explore several modalities for doing so. In one aspect, each button and/or tile is equipped with a QR code. In another aspect, the materials used for the tile, HEXTILE®, and/or button is made with the inclusion of materials comprising more than one color, materials comprising more than one level of reflectivity, and/or a single or composite material with unique texturing. These differences may be used to identify a given tile, HEXTILE® or button without the need for a specific code.

It is desirable that configuration and/or use data be stored. This may be utilized to train an AI, to determine efficacy of different configurations based on dog age, size, gender or breed, or to measure a dog's performance and behavior over time. In one aspect, changes to behavior over time may be used as an early indicator of a possible change to the dog's health status. For example, a dog asking to urinate an average of four times a day may, over time, begin to average five times a day, indicating a possible change to the dog's ability to hold urine.

In one aspect, the tiles and/or buttons may use a camera to identify whether a dog is in proximity and/or which dog is in proximity. An infrared camera—even one with a single pixel of data—may be used to detect proximity of a dog. In one aspect, an IR and/or other light frequency transmitter may be located on the tile or button or proximate thereto and an IR and/or other light frequency receiver may also be located on the tile or button or proximate thereto. Different fur types and different levels of fur coverage, as well as different sizes, will alter the backscatter of that light. The backscatter may be used to identify the dog and/or the proximity of a dog.

In one aspect, an image of the dog may be used as a reference point. In a preferred implementation, images of the top, side and bottom of a dog may be captured with one or more known colors on an article in the photograph. The photo data may then be calibrated to the camera (one or multiple pixels) by having the camera read the same (or a substantially identical) article. In one implementation, the data for calibration is generated for a camera type, and loaded into the software on the device, obviating the need to image the article with the tile or button camera. In this way, dogs with multiple colors may be identified when the button or tile mounted camera matches one or more colors present on the dog. On another implementation, the tile and/or button would image the dog's color over time, developing a library of matching colors that can later be used to individuate the dog.

It is further desirable to know whether a person or a dog pressed a button. There are a variety of inventions herein to accomplish that. In one aspect, capacitance may be measured at the button. Humans may press the button with a largely non-detectible object, such as a pen, to distinguish from a dog pressing the button. In another aspect, a long press may be utilized (although a dog is capable of a long press as well). In another aspect, a press pattern, such as a "triple click", may be used to identify a human press. In yet another aspect, the button may be capable of detecting a "side press" or "squeezing" by the presence of a button or other sensor configured to identify pressure on one or more side of the button. Because a dog would be very unlikely to press a side button, and even less likely to squeeze the button, the chance of mistakenly identifying a dog's press as human is greatly reduced.

Ease of connectivity is a concern for systems of any level of complexity, and a particular concern where there are multiple components that need to communicate via a network. In such a case, an exchange of network credentials is highly desirable. Other credentials, such as credentials allowing data to be associated with an account or device, may also need to be exchanged. In one aspect, credentials are exchanged over a near field computing system, such as BLE. In another, credentials are exchanged using light, such as IR sensors and transmitters. Credentials may also be exchanged via a direct wired connection.

Nearly all portable phones and tablets are now equipped with a "flash" to accompany the camera. Data may be encoded for transmission via light emitted from the flash. In such a case, even where there are challenges to network connectivity (such as radio interference), light sensors may be utilized to receive the transmission.

The desirable size of the tiles, distance between buttons, force required to actuate the switch, and other factors may vary with the dog. For example, a tile perfectly designed for a Chihuahua would likely be too small to be usable by an Irish Wolfhound. However, the range of sizes and other factors that a dog requires fit into a range, not a fixed amount. It is thus possible to create a tile sizing mechanism, such as that described in FIG. 9. There may be a sizing knob with a number of "click in place" positions. In another aspect, tile sets may be designed for dog size ranges.

Dogs get old, shed fur, grow weaker with illness or age, etc. Identification of a dog and/or the amount of force or other interaction with the inventions herein may vary as the dog's condition varies. In one aspect, the system utilizes a moving average of the last N readings, and if the current reading is within a specified range of that average, it is considered to be a match. Thus, for example, identifying a dog by the color of fur would fail over time if an initial measurement were maintained. Instead, using a moving average (whether over time, a number of interactions, or a combination thereof) allows for variations in dog appearance over time.

We note as a preliminary matter that the figures are intended as exemplary and not limiting.

Turning to FIG. 1, we have a diagram of one potential implementation of the invention (although the shape need not be hexagonal in some implementations). The components are present on a tile 132 that in this instance is shaped as a hexagon. While the edges in this figure are lines, it should be noted that the edges of the tile 132 may be shaped so that the tiles may interlock.

In this diagram, there are six buttons (133, 134, 135, 136, 137 and an unnumbered button in the center), each with three numbered components. Components 113, 117, 119, 121, 128, 130, and 124 are microswitches. Components 114, 118, 120, 110, 129 and 125 are force sensors. In one aspect, they may be resistive force sensors. Components 112, 113, 116, 121, 130, and 126 are light emitters. In one implementation, they may be red, blue and green light emitting diodes (RGB LEDs). Because it is important in many cases that a binary value reflect whether a button has been pressed, the microswitches are actuated by pressing on the button. In a preferred implementation, the travel distance on the microswitches required for actuation is short, such as 1 mm, 1.5 mm, or 2 mm. In one implementation, the microswitches provide feedback indicating that they have been pressed. Feedback is anticipated to frequently take the form of a sound and/or a "click" resistance that results in rapid movement as the switch reaches or approaches the actuation point. Feedback may also be done via a vibratory device (not shown), the lighting components, or otherwise. While the binary switch is desirable for reasons such as providing feedback to the dog pressing the switch, it is also important to know whether the dog is pressing the switch heavily or lightly, whether the pressure value is changing over time, and other data relating to the amount of force applied to the button. The resistive force sensors provide such data.

In one aspect, the temporal relationship between changes to the resistance sensor readings and the button, the relationship between the force exerted on the button and the pattern of the force, and the length of time the button is held (together with force changes during that time) is provided together with human, artificial intelligence ("AI"), or image analysis of what the dog is engaged in or wants, is provided as part of a dataset to train an AI. Once trained, the inventions may utilize the AI and the resulting data sets to provide additional context to humans with regard to what the dog's behavior means.

Remaining with FIG. 1, we see an infrared (although it could be any portion of the light spectrum) transmitter and receiver assembly ("IR Assembly") along the edges of the tile (115, 111, 106, 112, 127, 131). In one aspect, the IR Assembly is used to transfer information between tiles. Information that may be transferred include, among other things, location data, network credentials, other credentials, data generated by the buttons and information related to the status of components.

Because it is desirable to have an input that is very difficult to accidentally actuate, element 107 ("bottom switch") may be preferentially located on the bottom surface of the tile. The bottom switch may be used to reset the device to factory defaults, may be used to alter device functionality, to trigger WPS, or otherwise. In one aspect, the bottom switch is comprised of a plurality of switches. In another aspect, the mode of interaction with the bottom switch (for example, long press vs. short press, multiple presses, presses in a pattern, etc.) may be used to actuate or alter different functions.

While the button assemblies and/or microprocessor 100 may contain a voice recording and playback function and associated memory, flash memory is provided at 123 for additional storage.

In one aspect, a microprocessor, such as the ESP32, is used as a control or partial control system at 100. This may comprise a (preferably low power) SoC (system-on-chip) with microcontroller unit ("MCU") and radio frequency ("RF") transceiver. It may be capable of a variety of communication modalities such as VViFi, BLE, Thread, Zigbee and others. Because a central speaker may be desirable (for cost control reasons, for centralization of function, and other reasons), an audio amplifier 101 operably connected with a speaker 102 may be controlled by the microprocessor. Power management may be provided by a charger controller integrated circuit ("IC") and/or battery management system 103. The device may be powered by a battery 104. While the battery in the figure is a lithium polymer battery, it should be understood that other batteries, including commonly available ones such as "aaa" batteries, may be used. In a non-illustrated variation, inductive charging and/or inductive power may be integrated.

Figure 2A:
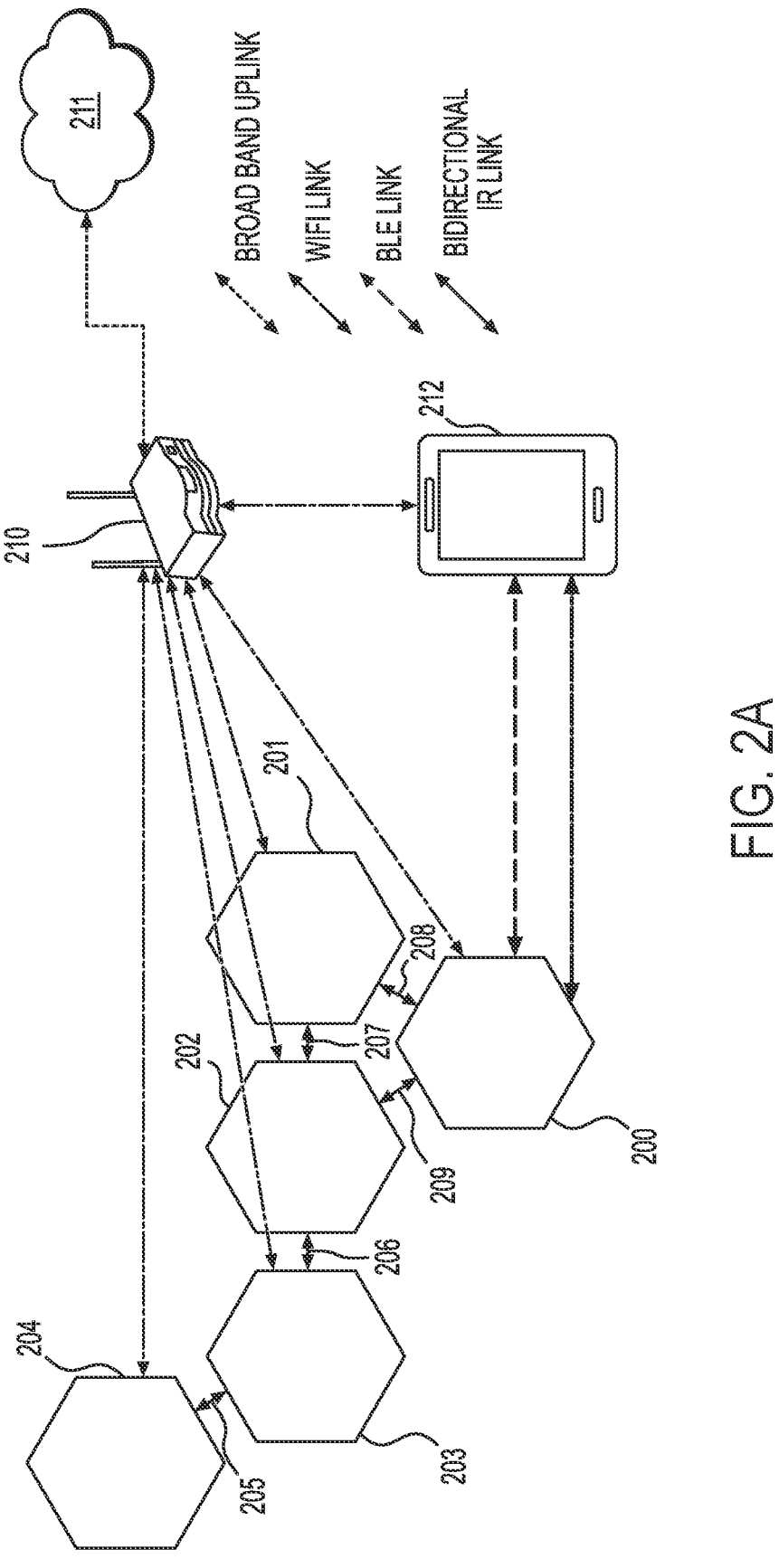
FIG. 2A is a diagram showing a control system for a plurality of hextiles.

Turning to FIG. 2, we show an exemplary diagram of a system architecture. There is at least one tile (tiles are 200, 201, 202, 203, 204). The tiles may be operably connected to each other (where multiple tiles are present) via edge-mounted connections such as IR (205, 206, 207, 208, 209). Sharing of WiFi credentials and/or other network or other credentials, as well as neighbor detection functions may be accomplished via these connections. We note that although we use labeled arrows in this (and other) figures, the labels are intended as one implementation and should not be considered limiting.

Element 210 is a network connection device. The device shown in the illustration is a WiFi router. With appropriate wide area network chips, the network connection device may be a cellular, GPRS, LTE or similar network. The network connection device need not be WiFi, but can be any device capable of connecting with the tile hardware. The tiles connect to the network connection device 210. In turn, the network device connects to the internet or the "cloud" 211. In one aspect, the on-boarding, initial connection data, or other setup (or later) tasks may be accomplished via a computing device such as a mobile phone 212. The computing device (which may or may not be the same one used for onboarding) in turn connects to the internet and can be used to receive and/or send data to the tiles via 219 to the internet 211 to the network connection device 210 and from there to the tiles via 217 or similar connections.

Figure 2B:
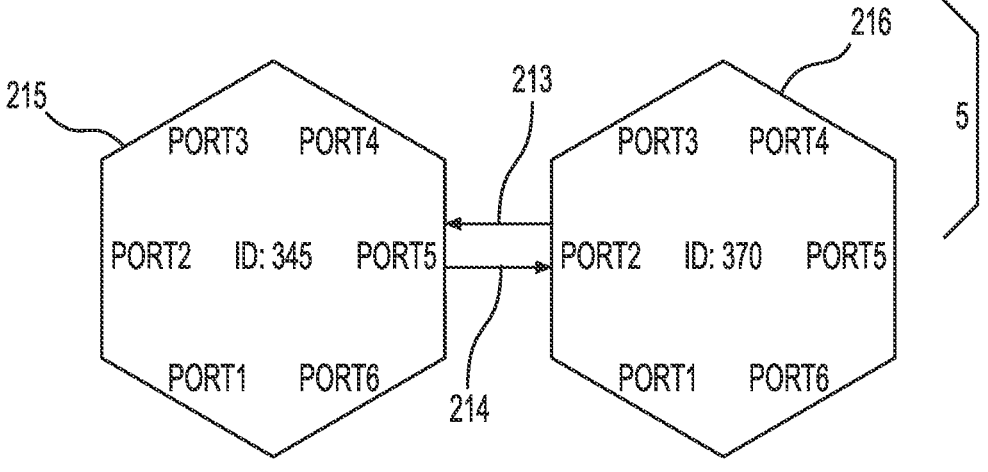
FIG. 2B is a diagram showing two interconnected tiles.

A simplified view is also provided in FIG. 2B. As can be seen in two interconnected tiles 215, 216, the tiles are equipped with one or more ports that facilitate bidirectional communication 213, 214.

Figure 3:
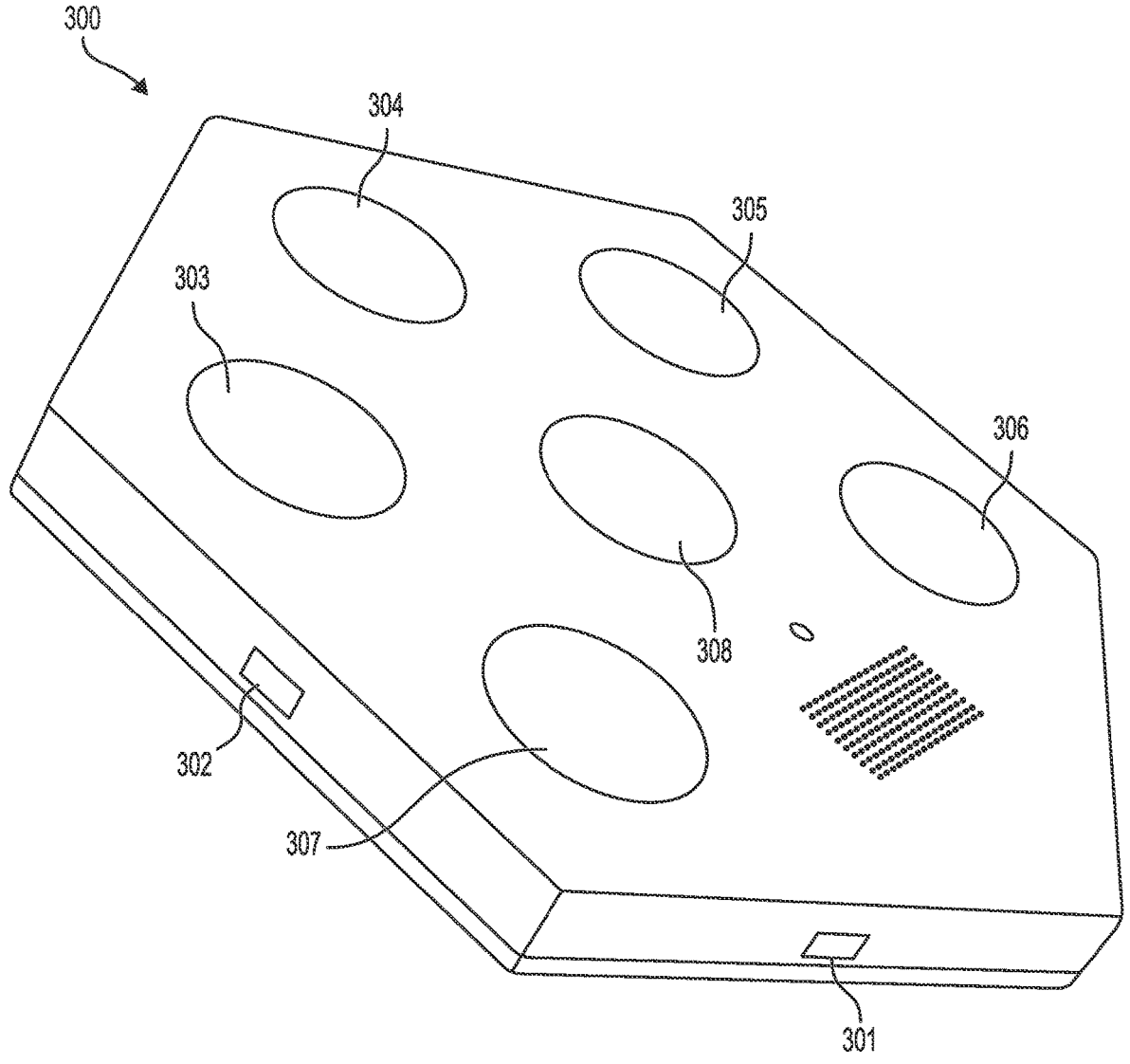
FIG. 3 is a perspective view of a hextile.

Turning to FIG. 3, we see a close-up view of a tile 300. In one aspect, there are cutouts for buttons to fit in 303, 304, 305, 306, 307, 308. The cutouts can be deep or shallow. In one aspect, the cutouts are areas that are slightly depressed on the tile and equipped with a mechanism to hold the button in place, such as magnets or hook and loop fasteners. In one aspect, the depressions are designed to look similar to the remainder of the tile, somewhat obscuring the fact that a depression is empty (if one is empty). Two communication ports 301, 302 are visible.

Turning to FIG. 4, we have three different views (FIGS. 4A, 4B and 4C) all depicting a single tile 400. There are cutouts for buttons 403, 404, 405, 406, 407, 408 as well as ports on the edge 402. There is a speaker present 401.

Figure 5A:
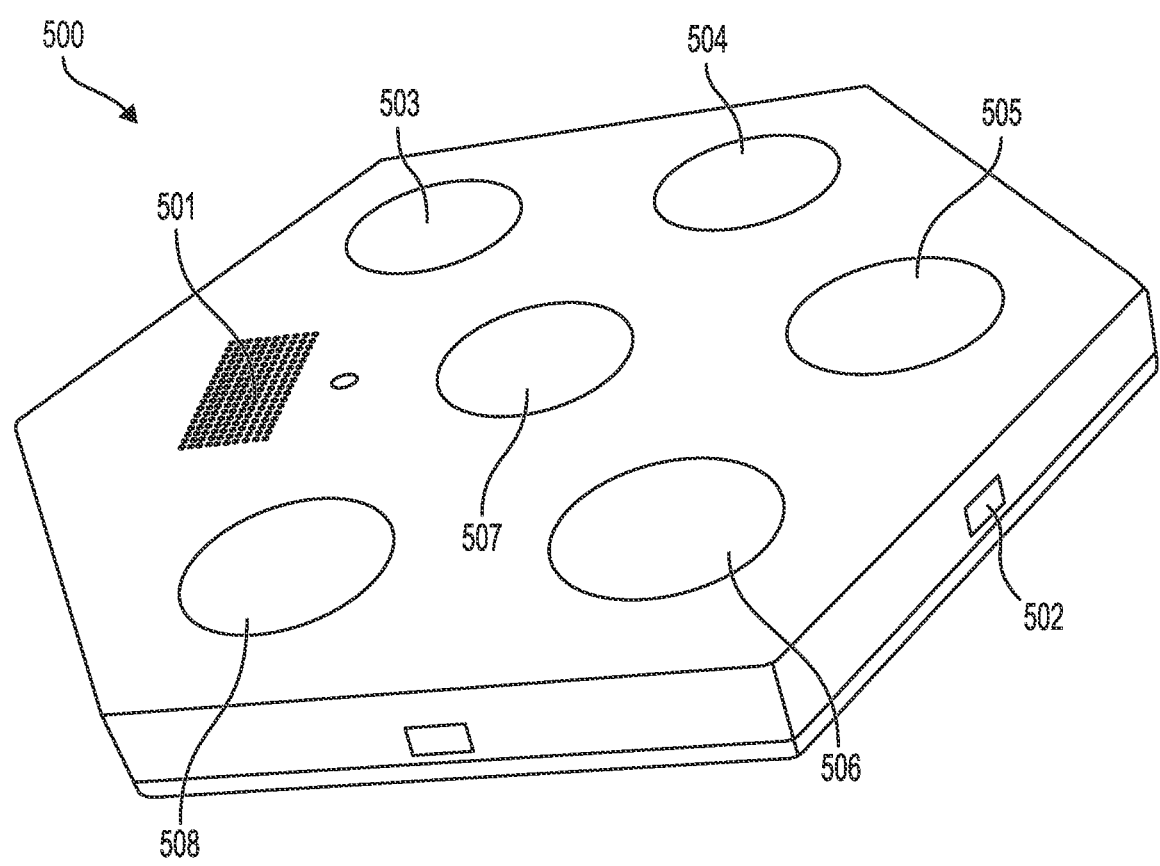
FIG. 5A is a perspective (primarily top) view of a hextile.
Figure 5B:
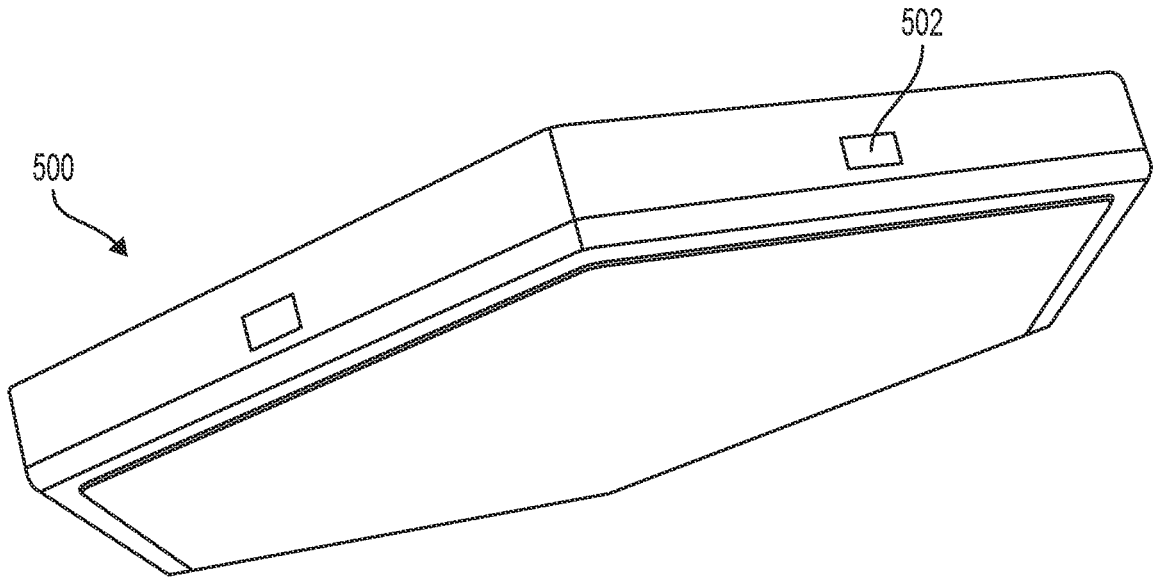
FIG. 5B is a perspective (primarily side) view of a hextile.

FIG. 5 shows two different views (FIGS. 5A and 5B) that show two views of a tile 500. The tile has a speaker 501, a port 502, as well as cutouts for buttons 503, 504, 505, 506, 507, 508. The bottom of the tile 509 is, in a preferred implementation, equipped so as to be stable on a surface. In one aspect, part or all of the bottom 509 is comprised of hook and loop fasteners. In another, section cups, a rubber surface, a patterned rubber surface, clamps, magnets, other fastening devices and/or a combination thereof may be deployed on the bottom 509 as well as counterparts (where needed, such as with hook and loop fasteners) present on the floor or surface the tile will rest on. In one aspect, hooks may be attached that are of the correct size to grip one or more varieties of carpet.

Figure 6:
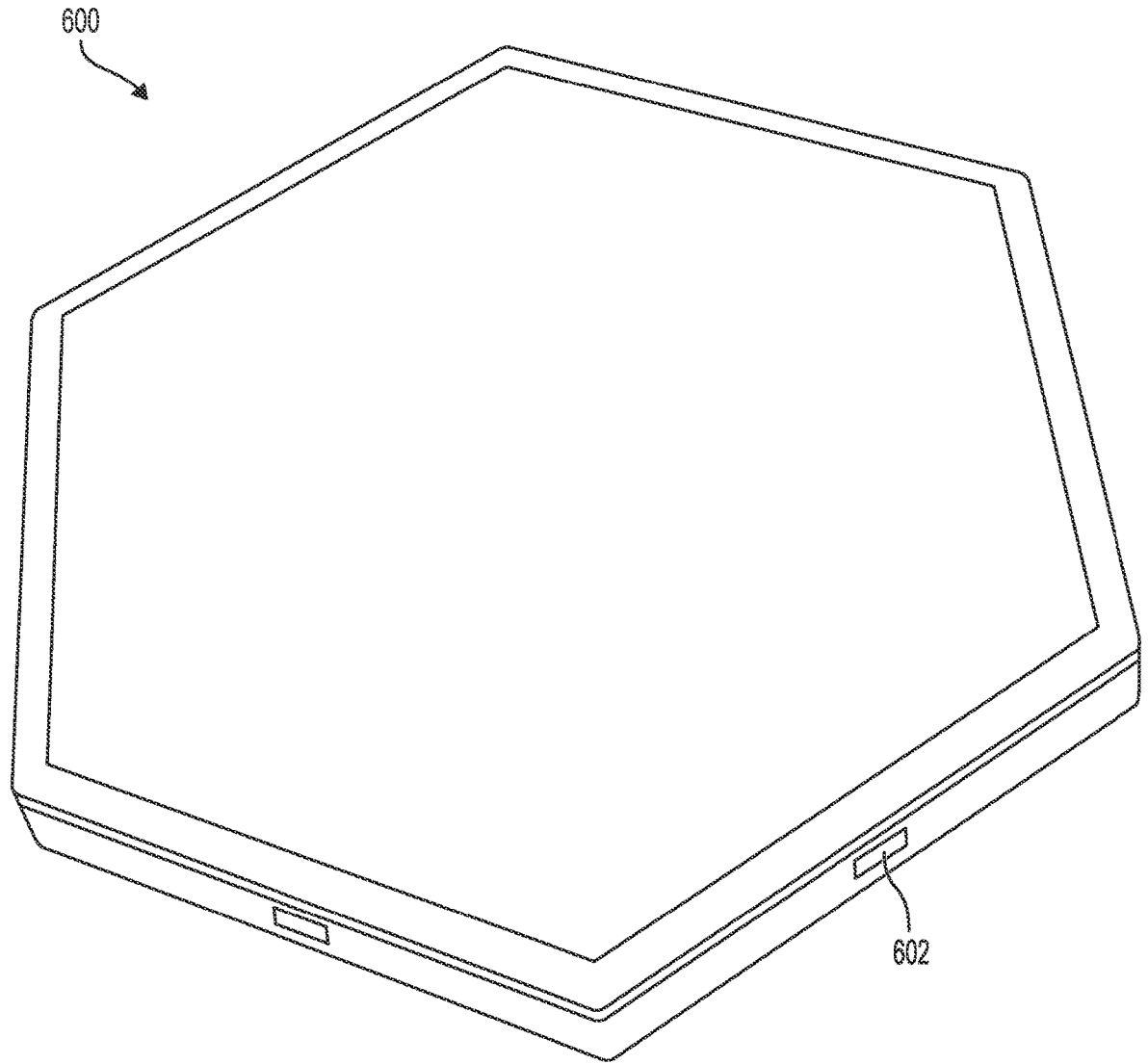
FIG. 6 is a perspective (primarily bottom) view of a hextile.

FIG. 6 shows the bottom surface of a tile 600. As described with regard to FIG. 5, a variety of anchoring techniques may be enabled by appropriate attachments to the bottom of the tile (or by appropriate characteristics of the bottom of the tile). A port 602 is visible.

Figure 7A:
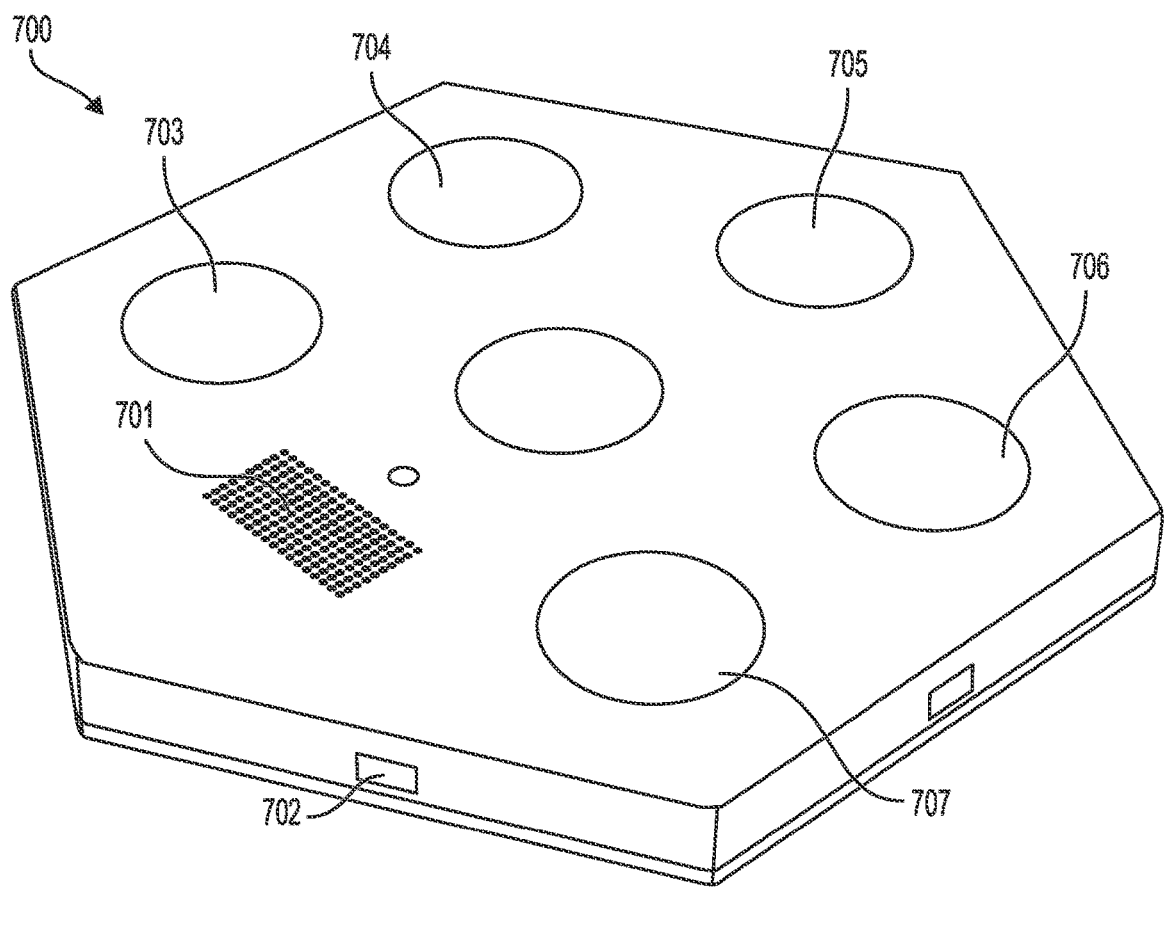
FIG. 7A is a perspective (primarily top) view of a hextile.
Figure 7B:
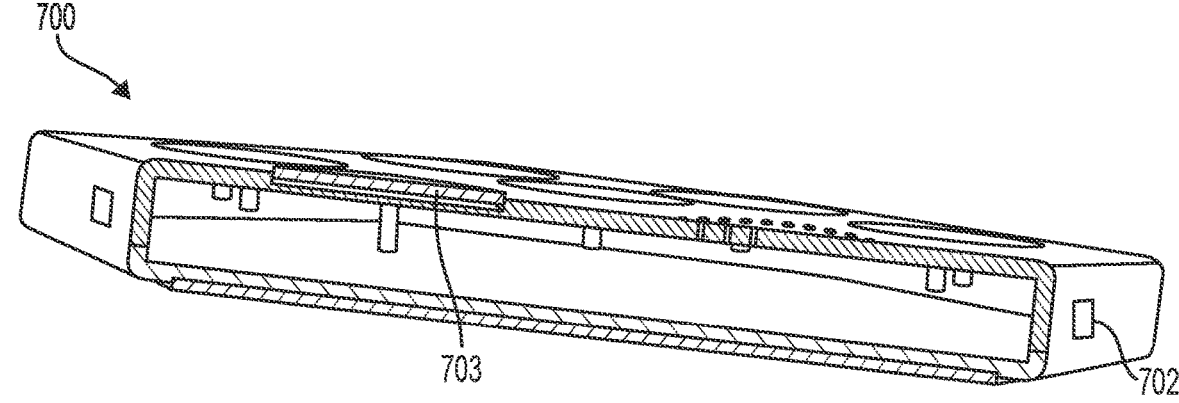
FIG. 7B is a perspective (primarily side) cross sectional view of the interior of a hextile.

FIG. 7 shows a tile 700 (FIG. 7A) and a cross-section of that tile 700 (FIG. 7B). Button cutouts are present 703, 704, 705, 706, 707 as well as a speaker grille 701 and ports 710 as well as a transparent window or cutout to facilitate the transmission of light or IR signals 702. Element 703 is a cross-section of a switch, showing the minimal travel required to actuate the switch. Not pictured is a non-binary pressure sensor such as a resistance sensor that in some aspects may be located below or proximate to the switch. In addition, the figure shows that button cutouts may be shallow, such as 1 mm, 1.5 mm, or 2 mm.

Figure 8A:
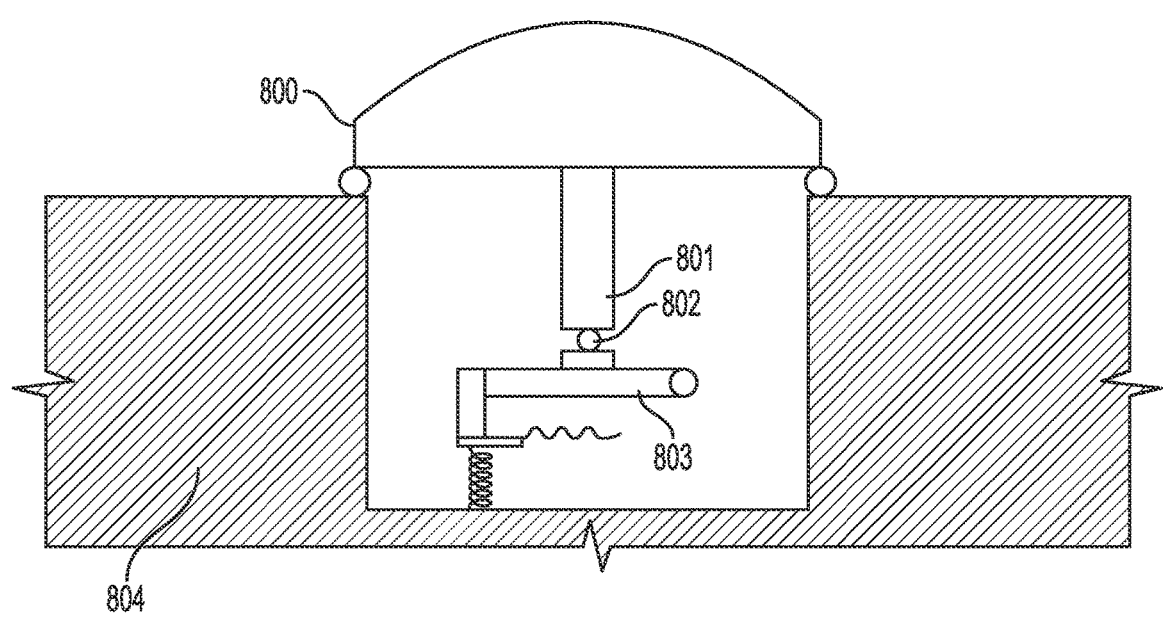
FIG. 8A is a side view of a switch actuation device according to an embodiment.
Figure 8B:
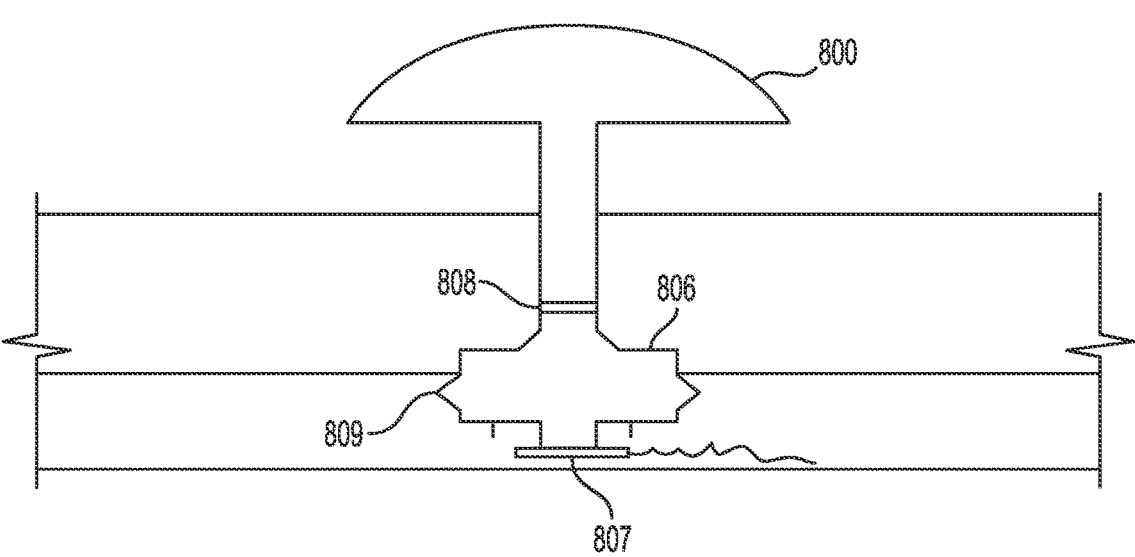
FIG. 8B is a side view of a switch actuation device according to an embodiment.

FIGS. 8A and 8B each show a switch and sensor system. Such a system is one kind of system that may be integrated into the buttons and/or the tile. A button 800 travels, when pressed, to a point where a portion of the button 801 actuates a microswitch 802 that is on top of a force sensor (such as a resistance sensor) (because of the proximity, a separate number is not provided for the force sensor). In one aspect, a hinged lever 803 may be present. The button may be mounted on a tile (shown in part at 804). In another aspect, the microsensor may be a standard keyboard switch assembly 806. The switch sits on a resistive force sensor 807. The gap 808 between the bottom of the button and the microsensor is shown as quite small in this figure. While required button travel prior to switch actuation may vary, one implementation uses a very short travel distance. The switch may flare out horizontally 809.

Figures 9A, 9B:
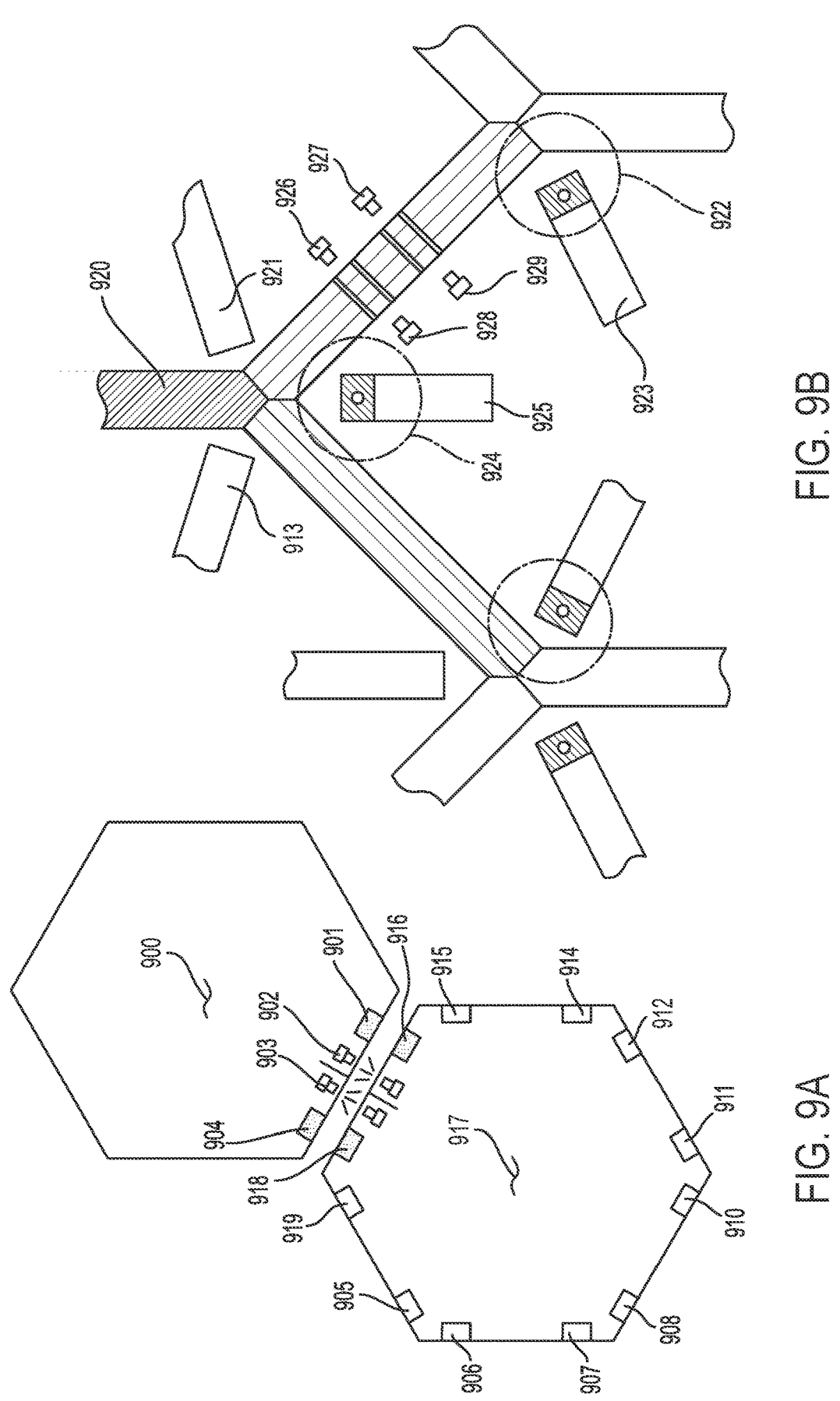
FIG. 9A is an exemplary diagram of an expandable tile system.
FIG. 9B is an enlarged view of a portion of an expandable tile system

FIGS. 9A and 9B show an expandable tile system that may be utilized as part of the inventions. The tiles 900, 917 may be equipped with IR receivers 902, 927, 928 and IR transmitters 903, 926, 929. In one implementation, the hextiles may be connected with magnets such as 901, 904-908, 910-912, 914-916, 918-919. The tiles may be equipped with moveable button assemblies and/or guide rails 913, 921-925 that allow the buttons to move in or out from the center. A spacer 920 may be placed between the tiles so that the buttons, when moved toward the tile edges, are not too close to buttons on adjacent tiles. In one aspect, the spacers are equipped with magnetic connectors.

In one aspect, the moveable button assemblies may be controlled by motors. In another, a mechanical linkage to a centralized adjustment device (such as a ring around the center tile) may utilized. The adjustment device may be turned to cause all of the button assemblies to move a substantially similar distance from the center (although the center button would normally not move).

Figure 10:
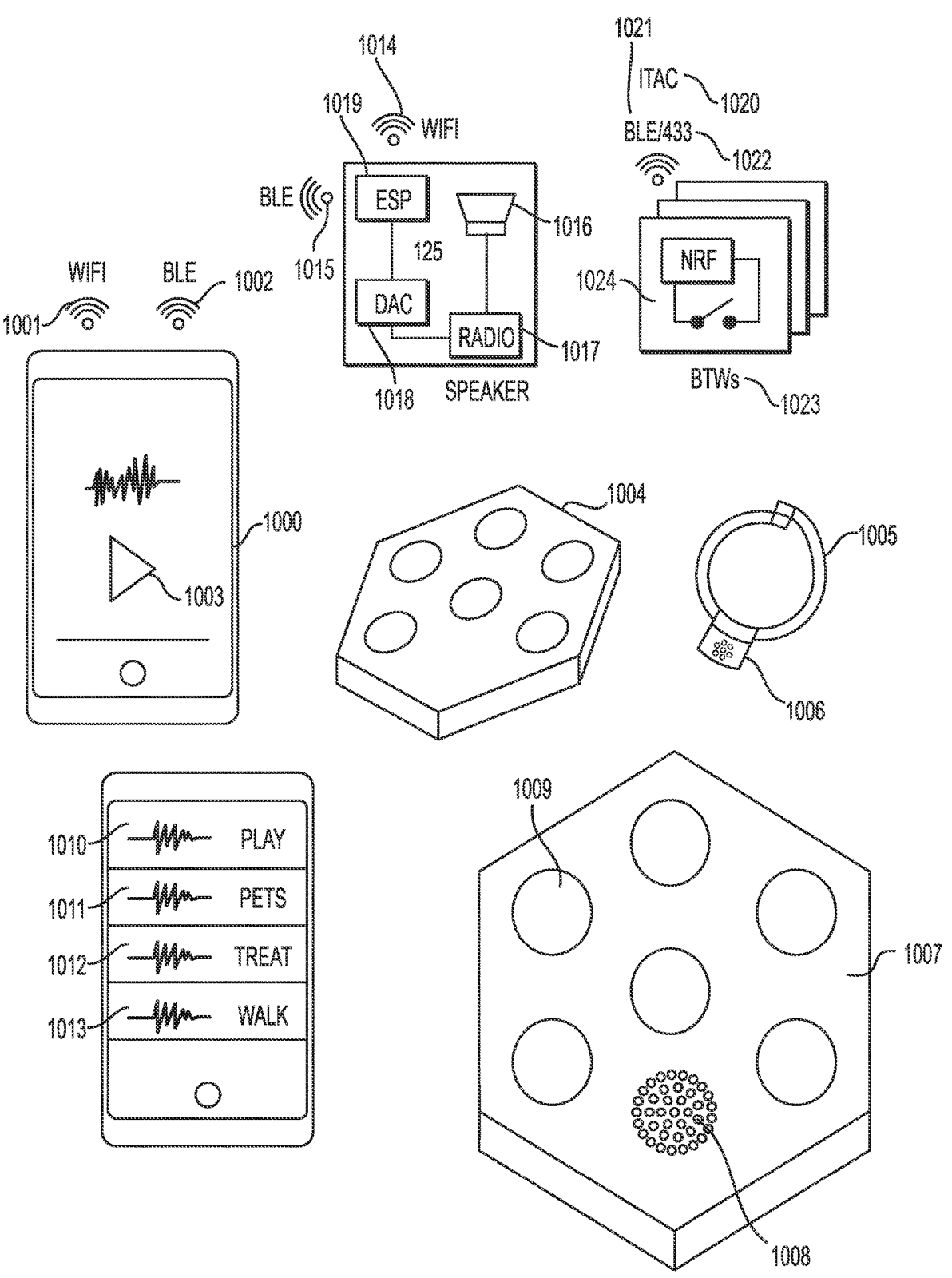
FIG. 10 is a diagram of an integrated system for controlling a communication appliance.

Turning to FIG. 10, we see a set of components and linkages. A computing device such as a smartphone 1000 utilizes a network connection such as WiFi 1001 and/or a near field computing connection, such as BLE 1002 while running an application (e.g., a Fluent Pet application) 1003 that is capable of controlling, monitoring, receiving data from, and/or sending data to a tile 1004 and/or buttons and/or the cloud and/or the internet.

In one aspect, it may be desirable to mount a speaker 1006 to a dog's collar 1005. There are several benefits to doing this. Humans are used to hearing voices come from the face area of a communicator, and colocating a speaker with a collar makes this a more familiar communications modality. A location proximate to the dog allows the use of a lower volume that the dog can still hear. It also brings the sound closer to the dog, which may have a benefit with regard to training.

Another illustration of a hextile 1007 is present, showing a cutout for a button 1009 and a speaker 1008. The computing device 1000 may visually represent words recorded for use on the device and/or programmed into the device and/or associated with buttons actuated by the dog. Such a visual representation may include a wave form associated with the sound 1010, 1011, 1012, 1013. Because the speaker need not be collated on a tile or a collar, a speaker and sensor box may be connected via WiFi 1014, BLE 1015 or otherwise. The speaker and sensor box may include an audio speaker 1016, an audio amplifier (such as an audio amplifier integrated circuit) 1017, a digital to analog converter (such as a digital to analog converter integrated circuit) 1018, a (preferably low power) System-on-Chip 1019 with microcontroller and/or RF transceiver. A BLE tag 1024 or other connected button 1023 connection may be utilized 1020-1022.

Figure 11:
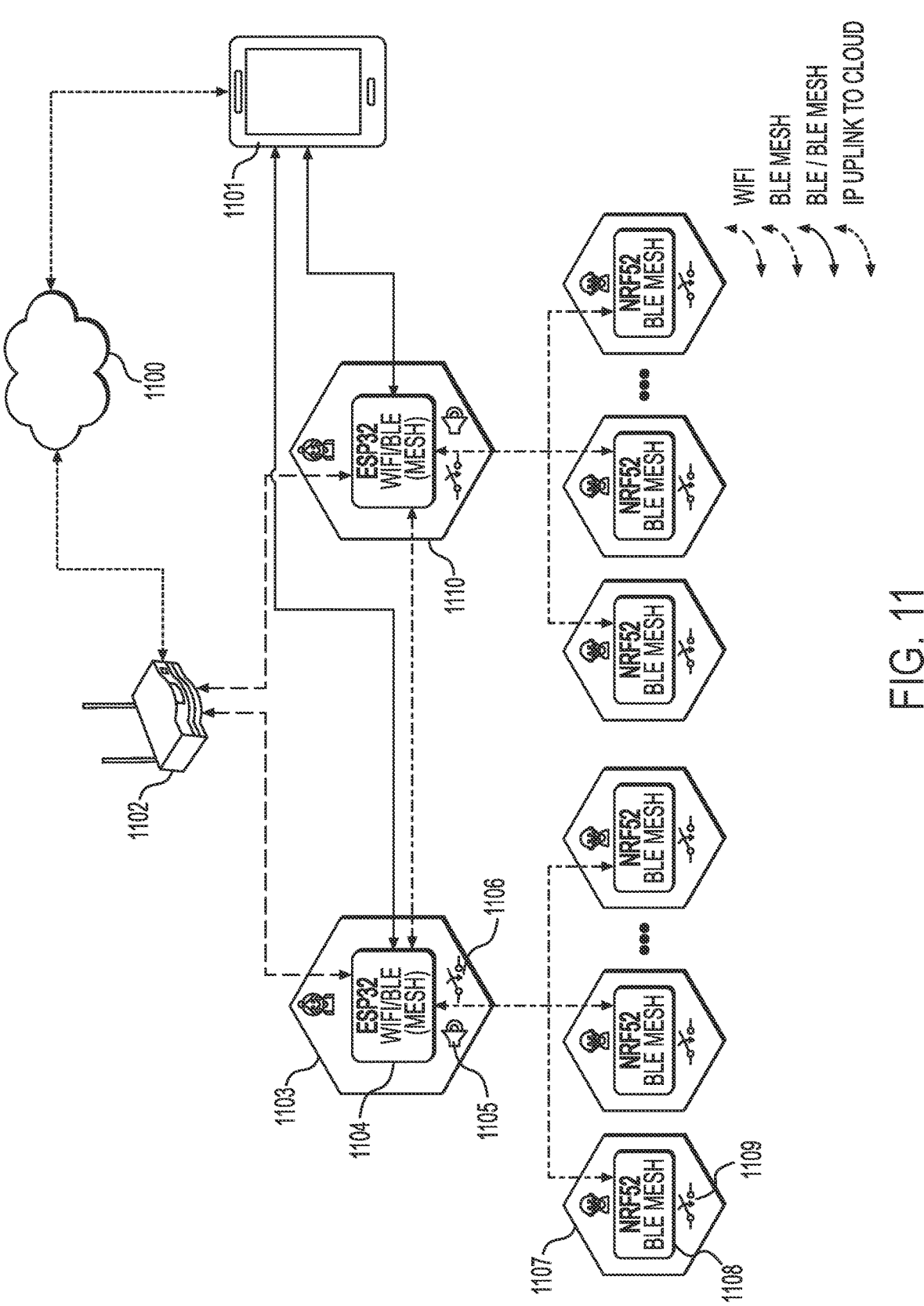
FIG. 11 is a diagram of a mesh network with mother and child devices.

FIG. 11 shows a mesh network implementation where one or more "mother tiles" 1110, 1103 serve as communication gateways and/or hubs for child tiles (such as 1107). It should be noted that the mother tiles may be physically distant from each other. Such distance may be desirable in the long or short term for, among other reasons, locating buttons related to a particular thing (such as the "walk" button and the front door) near that thing while the dog learns the button. The mother tiles may have bluetooth, BLE, WiFi and/or other connectivity 1104, an audio speaker 1105 and may hold a plurality of buttons and/or have one or more integrated buttons, one or more of which may have a switch 1106. The child tiles may have a switch 1109 WiFi, near field computing, BLE 1108 and/or other connectivity capabilities and may have a speaker.

The data flow from the child tile flows from the child tile to the mother tile to a network connectivity device, such as a WiFi router 1102. The network connectivity device connects to the cloud and/or internet 1100 and may send data to a computing device such as a smart phone 1101. The data may also flow from the child tile to the mother tile to a computing device directly (such as via an ad hoc WiFi network, Bluetooth, etc.). The data may also flow in the reverse direction.

Hextile and Other Tile Attachment and Arrangement Aspects:

Because the hextile will be utilized in conjunction with an animal, safety, ease of training, ease of cleaning and other facts require innovation over existing art.

Figure 12:
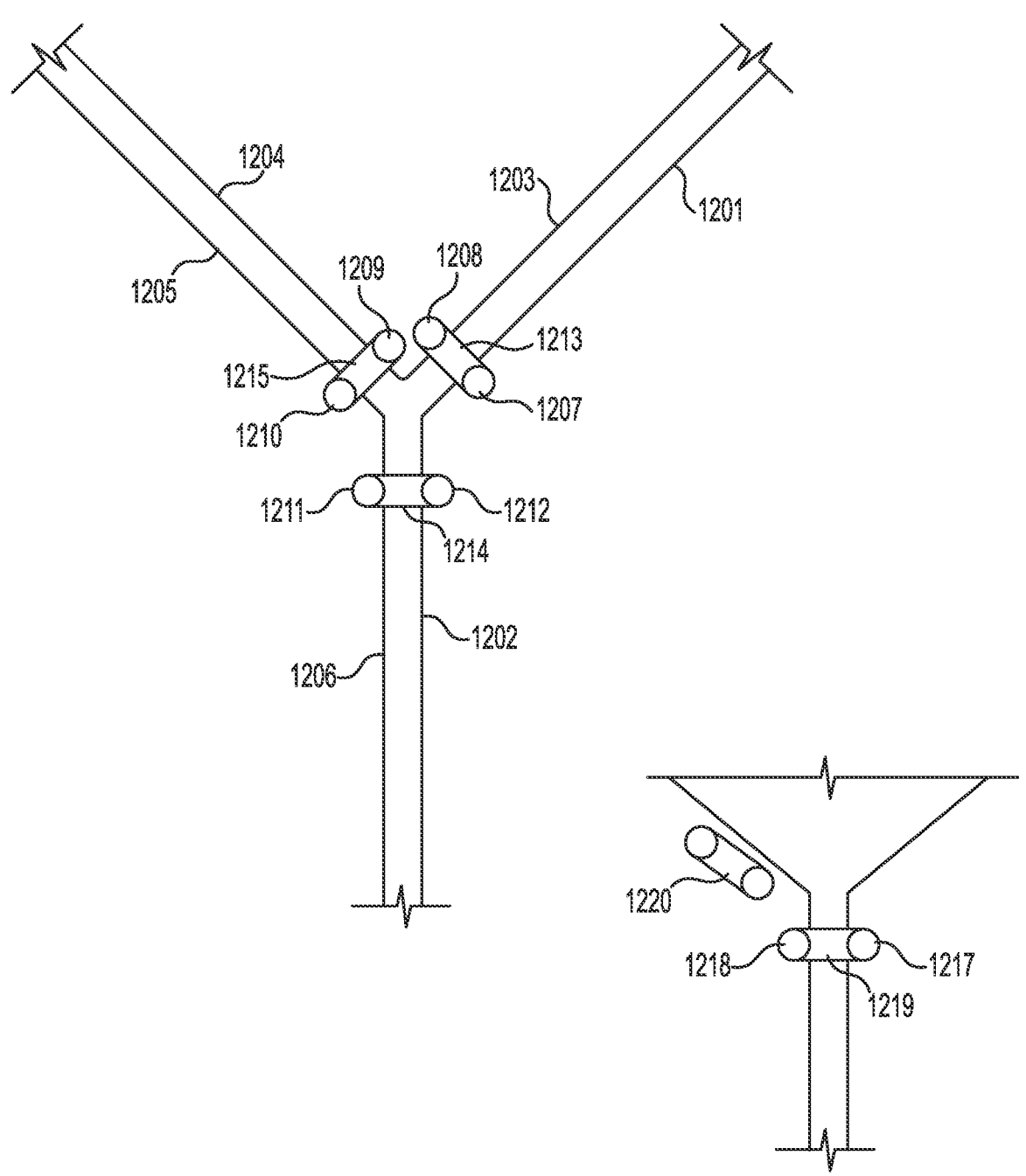
FIG. 12 is an illustration of the interconnection of tiles according to an embodiment.

Turning to FIG. 12, elements 1201 and 1202 form the edges of one corner of a first hextile; elements 1203 and 1204 form the edges of one corner of a second hextile; and elements 1205 and 1206 form the edges of one corner of a third hextile. In one implementation, a rubber (or other texturized or similar material, collectively "rubber") tether may be utilized to connect the tiles. The attachment points 1207 and 1208; 1209 and 1210; and 1211 and 1212 connect the first and third hextiles; the first and second hextiles; and the second and third hextiles respectively. A tether 1213, 1214, 1215 connect the hextiles via the attachment points.

While the rubber tether 1219 may connect two attachment points 1217, 1218, it may also be desirable (for example to better stabilize the tile on a surface) for a rubber element 1220 to connect between attachment points on the same hextile.

The rubber tether or element may be made of a different material or be textured differently for different surfaces. For example, for use on a tile surface, it may be desirable to have a tile made of rubber while for carpet, it may be desirable to have spikes extending from the tether that "grab" the carpet.

In one aspect, the tether element may have two sides and be capable of being flipped over so that one side grips one category of surface (for example, tile) and the other side grips another category of surface (for example, carpet).

In one implementation, the tether(s) are attached to the tiles at the corners. One benefit of such a connection is that the hextile will be less likely to wobble over the tether as a pivot point.

The tether may be comprised of conductive rubber, may have one or more wires, may have a clear pathway or fiber optic cable or may otherwise conduct signals so that they may be used as a conduit for signals between hextiles. A one wire, two wire, or multiple wire protocol may be utilized for electrical signals.

Figure 13:
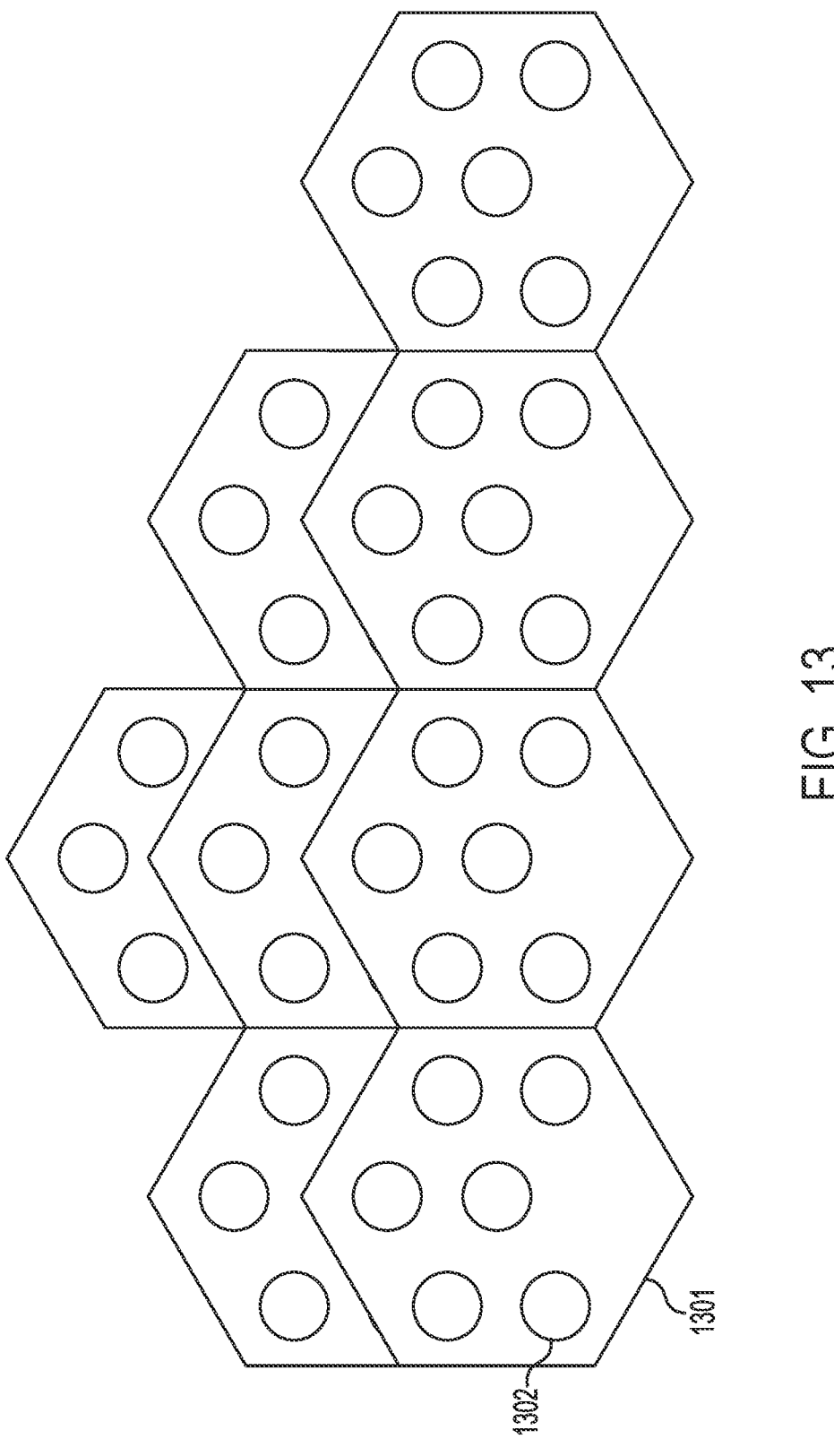
FIG. 13 is an illustration of a soundboard with a combination of hexagon shaped tiles and arrow shaped tiles according to an embodiment.

As FIG. 13 shows, one arrangement of hextiles 1301 may be used to hold buttons 1302 in place. However, each of the hextiles themselves may comprise a button.

Figure 14:
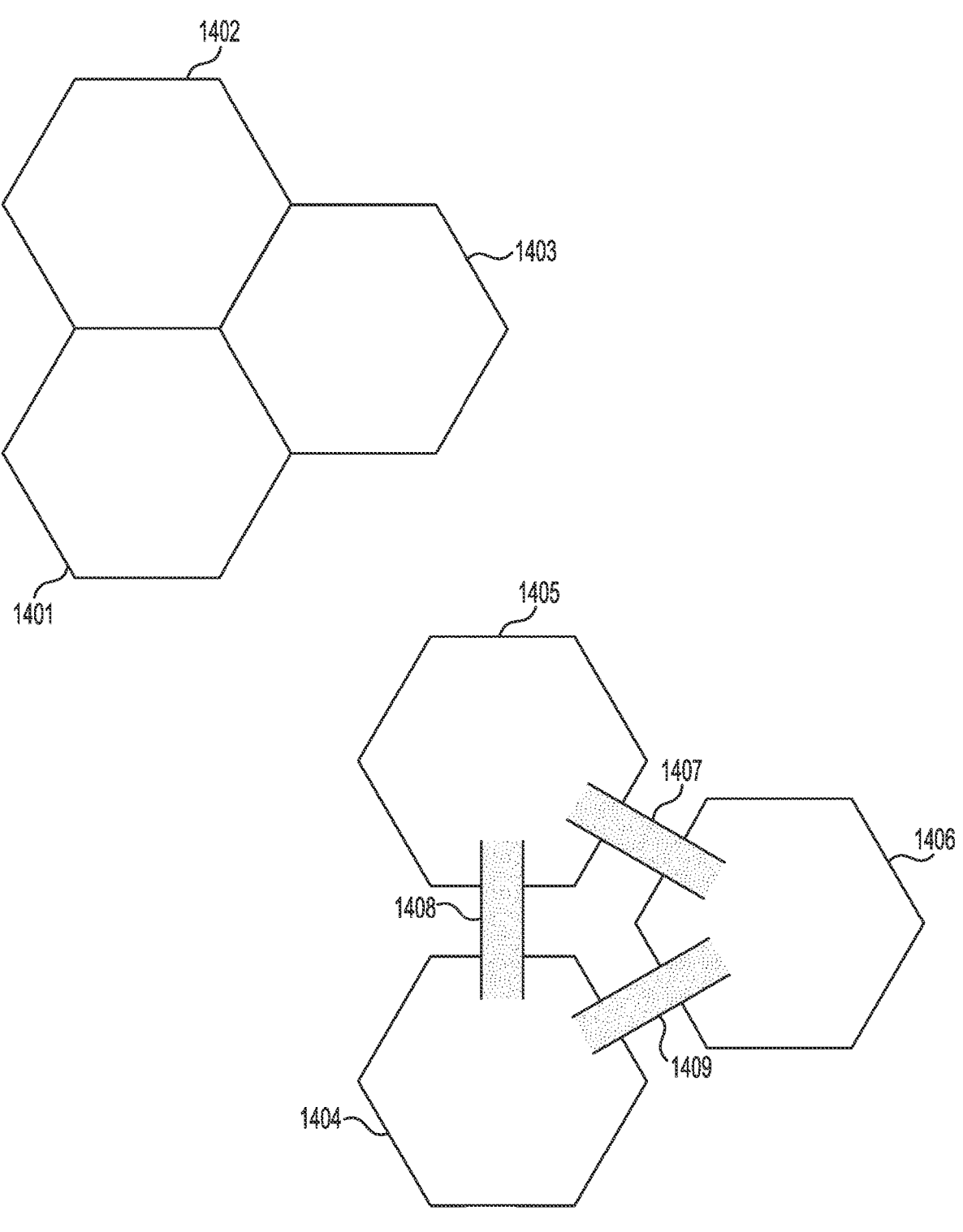
FIG. 14. is an illustration of a soundboard with adjustable length interconnects between I tiles.

Regardless of whether the hextiles contains hold buttons or comprise a button, spacers may be utilized to separate the hextiles. Turning to FIG. 14, we see three hextiles 1401, 1402, 1403 connected in a direct, edge-to-edge manner. For training purposes, aesthetic purposes, or otherwise, it may be desirable to allow the hextiles to be more distant than an edge-to-edge connection permits. Connectors 1407, 1408, 1409 may be utilized to space the hextiles 1404, 1405, 1406 at an arbitrary distance from each other. In one embodiment, the connectors fit into a track in the inside of the tile; in another, they fit into a track on the bottom of the tile. While it would be desirable primarily in special cases, they may also fit into a track on the top of the tile. In place of a track, they may be affixed using hook and loop fasteners, magnetic fasteners, snap fasteners, an attachment point or other mechanisms for attachment. The connectors may be rigid or flexible.

Looking at the track implementation (particularly when using substantially rigid connectors), the track itself may be capable of holding the connectors at a variety of angles. This may be accomplished by making the track wider than the connectors. In one aspect, this is accomplished by allowing the track to rotate within a region so that the hextile may be moved an arbitrary distance from another hextile. Without the capacity to rotate, a rigid connector 1407 and another rigid connector 1409 would fix the hextiles in place, not permitting movement of the hextiles away from (or toward) each other, as the angles at which the connectors enter or affix to each hextile would change as distance between hextiles changes.

Because it is frequently desirable to have the hextiles connected in a manner that cannot be disconnected by an animal, in one aspect a switch is present on the one or more tracks or affixing points that, when actuated, turns on or off the ability of the track to pivot. In this way, once the human adjusts the tiles to the desired distance, the tracks are made temporarily immobile, and being fixed at a specified angle prevents the hextiles from moving closer or further.

In another aspect, the connectors may have one or more points that can bend or pivot so that they can connect at an angle that the track (particularly a fixed track) would not accommodate. Those points may be, in one aspect, equipped with a switch to turn on or off the ability to bend or pivot.

Whether in conjunction with these connectors or otherwise, pieces of material may be placed between the hextiles (when they are not in an edge-to-edge position) so that there are no (or fewer) gaps.

In one aspect, which may be accomplished whether the hextiles themselves comprise buttons or simply hold one or more buttons, hextiles may each perform one or more different functions. For example, one hextile may be a battery enclosure; another may be a speaker; another may be one or more buttons, etc.

Affixing the buttons to hextiles may additionally be accomplished using magnets embedded in the material of the hextile to connect to magnetically responsive material in, under or on the buttons.

In some aspects, machine learning or artificial intelligence ("AI") may be useful. In one aspect, we take signals from the dog (which may include direct measurements of EEG, sensors within the brain and/or other signals) and present visual, auditory feedback to the dog. For example, if the dog pushes a button, an algorithm measures input from the dog and figures out what the dog meant at that point.

In one aspect, a similarity metric may be measured and/or utilized. For example, age, breed, home environment (such as indoor only or indoor/outdoor or outdoor only), level of training, affinity for food and other factors may be utilized. Similarities and differences may be measured by a machine learning algorithm and (whether via machine learning or otherwise) used to present dogs with predictive results. For example, if dogs with a history of being "rescue dogs" may be presented with quieter voice feedback to avoid triggering skittishness. In another aspect, certain instant behaviors, for example a combination of tailing wagging and a change to body temperature, might mean the dog has to void and will press "outside". The device may suggest things like "out-side" which the dog can confirm.

There may be a confirm and/or a reject button. The system may then make an auditory suggestion to the dog, such as "do you want to go outside", to which the dog may press "yes" or "no". Similarly, video and/or audio and/or other sensory data may be obtained to measure the dog's reaction to the suggestion and action taken based on the reaction. In a simple example, in response to "do you want to go outside", the dog may wag her tail and head to the door. In such a case an action, such as alerting the dog's human companion, may be taken.

The dog's response to suggestions and/or the press of buttons may also be utilized, particularly within an AI context. For example, we can also use this to discover missing buttons or functions. In one simple example, press-ing "outside" in combination with a wagging tail may mean "I want to play outside" while pressing "outside" in com-bination with a lot of micro-movements may mean "I want to void my bladder outside". Similarly, types of "food" can be differentiated. A truly hungry dog's behavior may be differentiated from that of a dog simply pressing "food" to eat without accompanying hunger.

A variant is that human speech has not just phonemes but prosody and intonation. Firmness of press and body posture can be measured to determine (or to add weight in one direction in determining) how the word that is being pressed sounds. The system may speak back to the dog, such as by saying "chicken" and "beef" and measuring the reaction to each. The dog can approve or disapprove meanings for example by body posture, tail wagging, etc. The force/speed/ timing of button pressing or switching between buttons may also be utilized.

Predicting, speaking for the dog, and taking away the requirement that the dog press the button. The AI may start asking questions based on dog posture/behaviour. For example, "Do you need to pee" and may be confirmed via dog posture/tail, etc.

The dog will learn to modulate their physical behavior in order to make the sounds match their emotion. In one aspect, the system may keep feedback/intonation data while the dog is learning as well as letting it change dynamically while learning.

Dogs will often imitate other dogs. In one aspect, video, audio, and/or holographic sounds or images may be utilized to show the dog how to press buttons and/or the outcomes of pressing the buttons. The same video/audio, and/or holo-graphic sounds of images may be utilized to show the dog alternative meanings. For example, a dog pressing "outside" may be presented with holographic or 3D video of a dog peeing, a dog defecating, and a dog playing and the dog's reaction to each image measured to determine the likely meaning of the dog's button press and/or behavior. The system may use computer vision to see the posture the dog adopts to achieve a certain prosodic outcome.

Interpretive landmarks may be set out in the space. For example, a space may be divided into 3 or 4 subspaces. The dog is either in one of the 4 or not. They learn to operate in that paradigm. The system may gradually make the classi-fication subspaces smaller and let the dogs explore the interstitial subspaces. A gradual process of exploring the space, setting a core space that gradually becomes more nuanced, etc. may be utilized. One goal may be to increase the bandwidth of communication.

The system may also utilize the human response to any of the foregoing in tuning its interpretation of the data and/or identifying a response to behavior.

AI data may be derived from a dog-mounted device. This way for example a dog that pressed "potty" and goes on to pee can have their behavior when pressing the button correlated to the later behavior.

Figure 15:
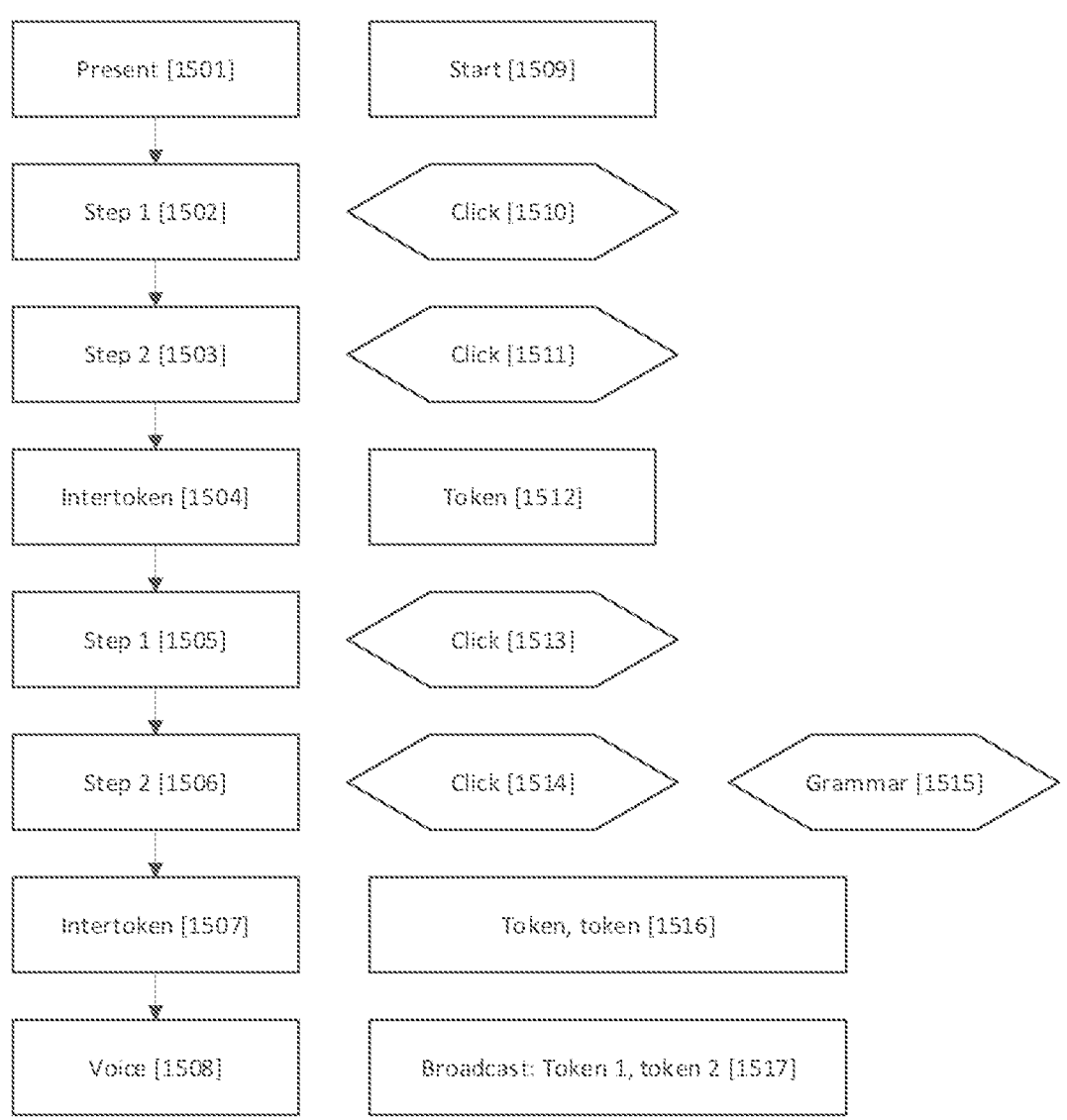
FIG. 15 is a diagram of a local communication system for communicating with an animal.

Machine Learning, artificial intelligence, and other aspects:

Turning to FIG. 15, we have a diagram for a local communication system with a dog (in most cases prior to broadcasting a communication). Steps 1501-1508 (the left side) represent a chain of events initiated by dog actions that cause the system to advance through states. Steps 1509-1517 (the right side) show the transition from one state to another. In some implementations, the state change is indicated to the dog with auditory feedback. Where the state change is indicated with auditory feedback, elements 1510, 1511, 1513 and 1514 represent sounds.

Present 1501 is the action the dog makes to initiate communication. The dog is presenting itself to a listener. The listener may be a person, another animal, a listening station during training, or a similar modality. We note that while we use the term "listener", it should not be interpreted in this context as limited to auditory observations only. For example, text, lights, vibration and/or other stimuli may be "listened" for. During normal use the present 1501 may simply be that gesture at any location, as assessed by a monitoring device. An example of a present action may be a play bow. Another present action, and one that canines seem to adapt to easily, is the press of a button. A start tone 1509 is presented to the dog to acknowledge the presentation request. The start tone may mimic a human exchange, such as playing a voice saying "I'm ready."

In some aspects, at this point the dog may generate a volitional command. In this example, these commands are footsteps (or pawsteps) of particular types: Either a left or right foot, and then a direction of motion to indicate the type. For example, step1 and step2 may be: left foot moves left, then right foot moves left. Using four directions for decod-ing each step, only the front two legs, there are 64 tokens a dog could generate. Other traits of footsteps could also be used in the step typing. For example, the duration of a paw lift, or the height of a step or the force transferred onto a forelimb from a hindlimb. In one implementation, each step would be acknowledged with a click, and/or feedback about the received step type. The completed two steps would map to semantic buttons, presumably with auditory association that already carry meaning to the dog.

Figure 18:
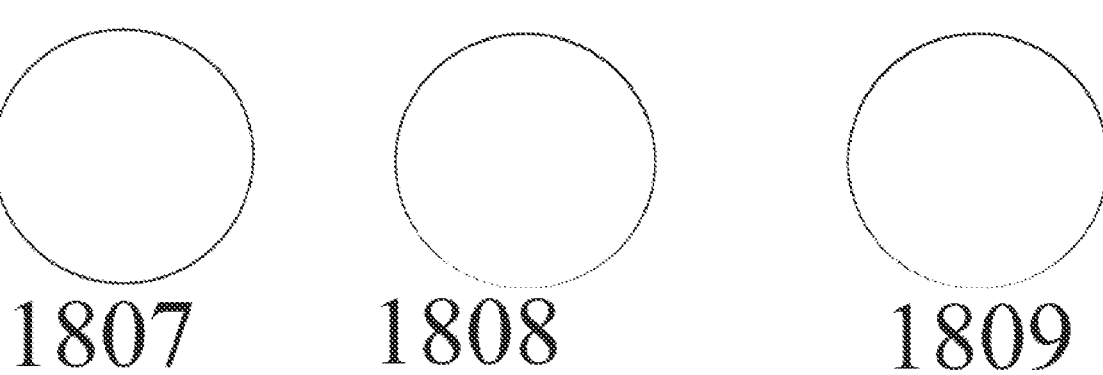
FIG. 18 is a diagram of buttons demonstrating communication modalities.

Semantic buttons are communication modalities. We use the term in both data reception and transmission mode. That is, a button may be used to send data from the dog (such as pressing the "go for a walk" button) and/or to send data to the dog (such as beeping in response to a press to alert the dog that the press was detected). In one aspect, semantic buttons may light up and/or make a sound and/or release a scent and/or change colors to indicate (a) which of the buttons are possible candidates for the completion of the communication sequence, or (b) which button has been selected. Imagining an example as shown in FIG. 18, we start with nine buttons 1801-1809. If moving the front right paw forward means "far away button row" and the dog moved in that manner, buttons on that top row 1801, 1802, 1803 would light up. If moving the front left paw up and down in place means "middle" and the dog next moved that way, then only the middle button on the top row 1802 would illuminate.

In one implementation, the completion of steps would result in an internal presentation of a token such as token 1516. In this example, if audible feedback were used and button 1802 means "outside", that means that the dog would hear the voice "outside" delivered reasonably quietly from the speaker. The speaker may be located on a tile, proximate to the buttons, in the dog's ear, oriented towards the dog or otherwise. This is delivered during the intertoken 1504, 1507 phase. At each intertoken phase, a delay in action results in the full message sequence being played back to the dog. Continued steps would append more tokens to the end. Note that the delay could be as short as 0 milliseconds (ms) or as long as 10,000 ms (or even longer). In a preferred embodiment, the delay substantially corresponds to the cadence of timing of human vocal response to a stimulus provided by the dog.

In one aspect, a "cancel" motion may be utilized. The "cancel" motion may fully cancel the communication sequence or may "undo" the most recent portion or portions of the sequence. Different motions may be utilized for a full cancel and for the undo cancel. For example, a fresh play bow might cancel the full message and start fresh, while a sound (detected with a microphone) such as a bark, or a different motion, such as turning in a circle, may initiate the undo cancel.

In some embodiments, a series of tokens with incorrect grammar would append an error tone and cancel the message. In some embodiments a voicing from the dog would collect all tokens since the last play bow and render the sounds for a human and dog audience. In other embodiments, and/or based on user preference settings, after sufficient delay without a cancel (full or undo) or present action, a token sequence would be broadcast. One optional difference is having a dog explicitly opt into a broadcast vs opting out. Related to this, some users may favor voicing from the dog as this begins to shape qualitative sound generation that matches the target sequence. This is the public message, which people receive and respond to. It may be played from a speaker or a smart watch or be sent as a text message or otherwise.

In one aspect, a temporal element is utilized.

In another aspect, dog motion may be interpreted by the system and converted into a sound and/or other signal. For example, a dog that wants to go for a walk might walk in place to trigger the "walk" command; a dog that wants to urinate might lift a hind leg (primarily a male behavior); a dog that wants to void its bowels might squat; a dog that is hungry might mimic chewing motions. In one aspect, the system would provide feedback by saying the corresponding word. In another aspect, where the dog's message is unclear (a female dog squatting might mean defecation or urination for example), the system might say the possible words and select one based on a dog's reaction or motion or sound. It should be appreciated that buttons are optional with a position and/or motion and/or sound recognition system.

In some embodiments, the public message is only broadcast if traits of the dog voicing match traits of a token render (examples might include amplitude modulation for the number of syllables of the words, physical movements matching word complexity, etc.). In some embodiments, the broadcast message will include the dogs voicing. In some embodiments, the dog's voicing will be transformed by a vocoder to capture aspects of the target message. In other embodiments, a variational autoencoder will map sounds generated by the dog into natural language speech. In other embodiments, a custom neural net, trained on a corpus of recorded dog voicing and target, may be used for translation from dog learnable actions and/or dog voicing, to the spoken counterparts in human natural language. In other embodiments, pre-recorded sound from the dog will be used to render each of the available tokens with the phonetic palette the dog is capable of, allowing the dog to "pronounce" each of the words. Notably, both the dog and the human will "hear" the sound created by the dog. As the dog's initial voicing stretches closer to the target sound, their palette may expand, and each of the tokens may re-render. One can appreciate that through learning, a dog's voicing in person will better approximate a target, and the rendered public voicing will also improve, and may decrease the decoding error for large lexicons with similar tokens. These traits will both help a dog learn, and allow human listeners to assess progress. In another embodiment, publicly voiced pairs may allow listeners (dogs and humans) the ability to assess the proximity of voicing to a target.

Figure 19:
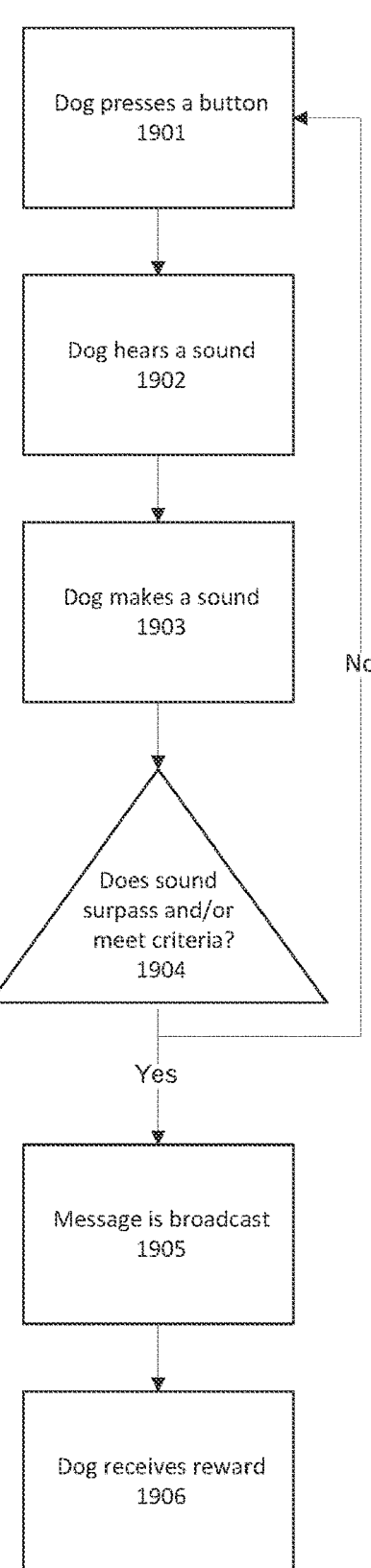
FIG. 19 is a flow chart diagram of a method for training an animal according to an embodiment.

In one implementation shown in part in FIG. 19, the dog may press a button 1901. The press triggers a sound that the dog hears 1902. The dog makes a sound (or motion) in response (a confirmative action or rejection action) 1903. If the sound meets and/or surpasses certain criteria 1904, the message is broadcast 1905 and the dog is optionally rewarded 1906. If the criteria are not met/surpassed 1904, the sequence may restart at step 1901.

Sensors may decode the state of a dogs external working memory into multiple channels, as well as how that state may be updated based on the sensors that encode the dog's actions and intentions, the existing state of the working memory, and the context of the dog in communication. A sensor state may be the observation of a left paw being moved with a particular velocity to a particular location for a duration of time. The sensor data will be encoded into a tokenized state in the external working memory. The process of tokenization may have access to the previous state of the working memory buffer. One may consider many inputs to act as "transforms" on the token state in working memory. In some cases, the impact of new sensory data will be to append tokens to a list. But other embodiments are better described by a function that map from previous token state to new token state, conditioned on the sensor input. Finally, additional context may impact the transform.

It should be appreciated that in some aspects, some or much of the linguistic complexity is handled by the sequence of actions that generate the token. The voicing of the dog could range in specificity anywhere between consent to broadcast (no qualitative impact), an opportunity to customize the quality of the rendered output (the words in the message are the same, but the acoustic aspects of the broadcast message adapt to traits of the dogs voicing), to a system that gates the output conditioning on rules with increasing specificity, ultimately requiring the dog to produce acoustic messages on their own, which could be understood without translation.

In terms of training the system, training may be done by the dog, the person, or a combination. For example, a play bow followed by walking would encode left-foot forward, right-foot forward, which could decode as the WALK token. A loud voice (a bark), could be rejected as an acceptable voicing format. A quiet murmur, could be detected as a voicing attempt, broadcasting the contents of the previously generated WALK token.

Figure 16:
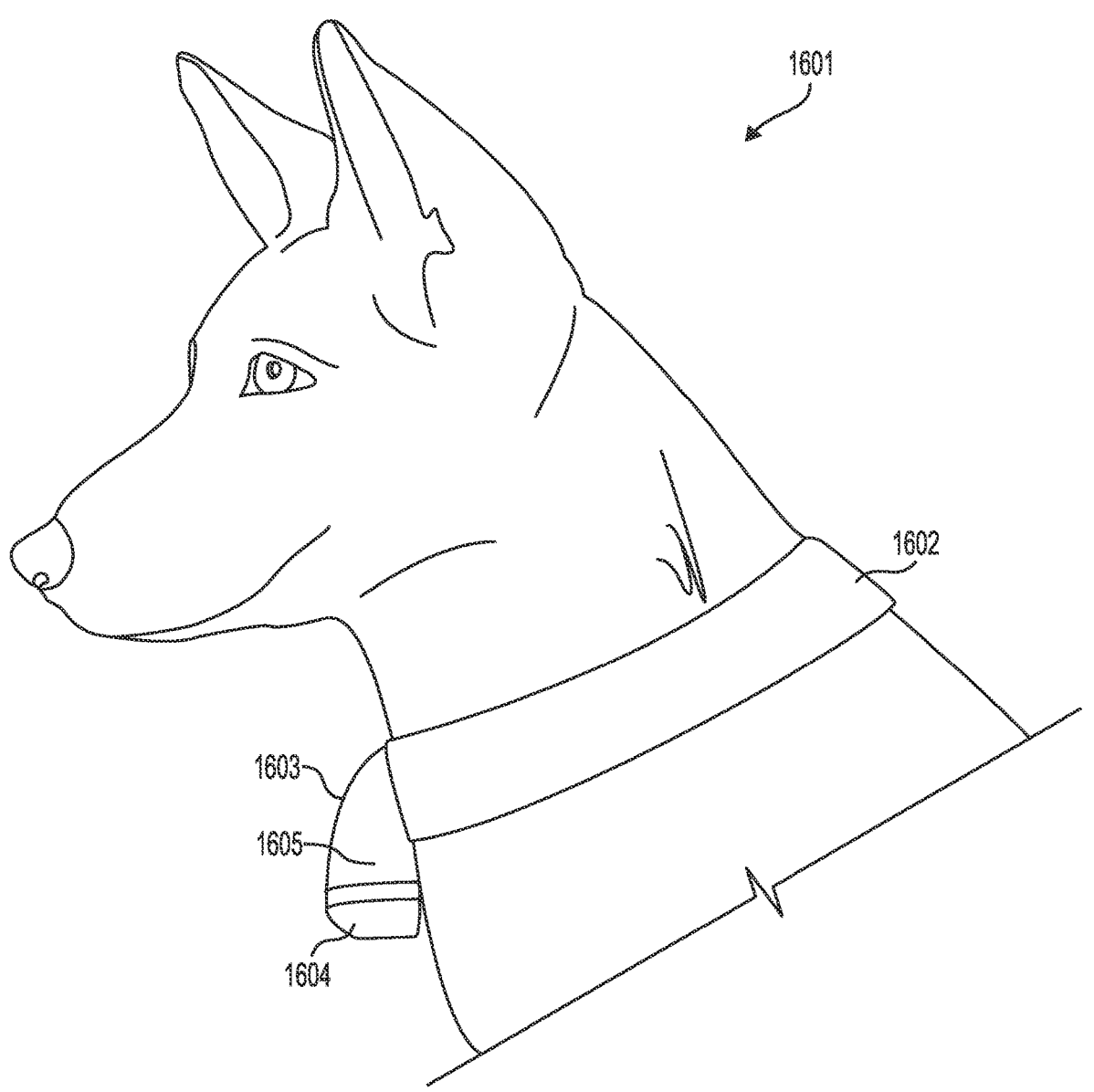
FIG. 16 is a dog wearing a collar.

Turning to FIG. 16, we see a dog 1601 wearing a collar 1602. The collar contains a camera 1604. In a preferred implementation, the camera is downward facing and/or equipped with a wide angle lens. The collar may also contain a speaker 1603 and an inertial measurement unit 1605.

In one aspect, the camera is optimized to record the dog's front paws. The paw steps may be used to generate tokens.

In one aspect, the tokens may be denominated in a way to escape or bypass normal language conventions.

In one aspect, the technology discussed herein may be utilized to enable a multi species or multi animal exchange language. Of course, humans and dogs are of different species, so in this context we are talking about a language that may also be used between different members of a non-human species, between members of more than one non-human species, and/or between humans and a member of a non-human species. Such a language may be constructed by creating modalities whereby common meanings are assigned to communication modalities where the information disclosing communicator is able to send a signal that is understood by the information receiving communicator.

Taking as an example the communication of the meaning "I want to play", and using a dog and a cat as the two species: The dog is capable of hearing well and pressing buttons. The cat is capable of hearing well and minimizing unintentional body movements (such as when hunting prey). The dog may press a button to trigger the sound "let's play", which the cat understands. If the cat wishes to ask the dog to play, the cat may limit all body motion except for the front right paw, which the cat lifts twice and a digital vision system identifies as associated with the term "let's play", triggering that sound.

To the extent that one species is incapable of understanding information from another species, a "no translation" indicator may be utilized. For example, a human may want to tell a dog "we'll go to the beach tomorrow". While the dog can understand "beach", it may not have the temporal sense to understand "tomorrow". The human may receive feedback, such as a buzz, when they attempt to input the term "tomorrow" into the communication device.

In one aspect, there is audio output capable of generating sounds easy for a dog to hear, but not disturbing to people nearby. This may be accomplished by controlling the volume, controlling the pitch, or a combination. Much of this may be achieved by orienting the output, and controlling amplitude. Using higher frequency sound output may be desirable in some embodiments.

In some implementations, audio feedback may be used for "self-speech," that is, feedback about previously generated tokens that can be perceptually assessed by the dog before generating new tokens, modifying tokens, canceling past tokens or messages, or transforming the tokens present in the scratchpad/sketchpad. Roughly, token sequences may serve as a sketchpad for arranging an intended message, assessed before it is broadcast. It serves to reduce errors in translation of Dog Sign Language (described below) to tokens.

A GPS tracker (or other geolocation technology, such as WiFi triangulation) may be included in some embodiments. A physical location may assist in translating steps into tokens in a context sensitive manner.

In one aspect, speakers may exist on either side of the head to assist in orienting tasks and/or providing stereo feedback.

In another aspect, environmental context may be utilized to improve translation. For example, weather, age and/or time of day may be utilized.

Figure 24A:
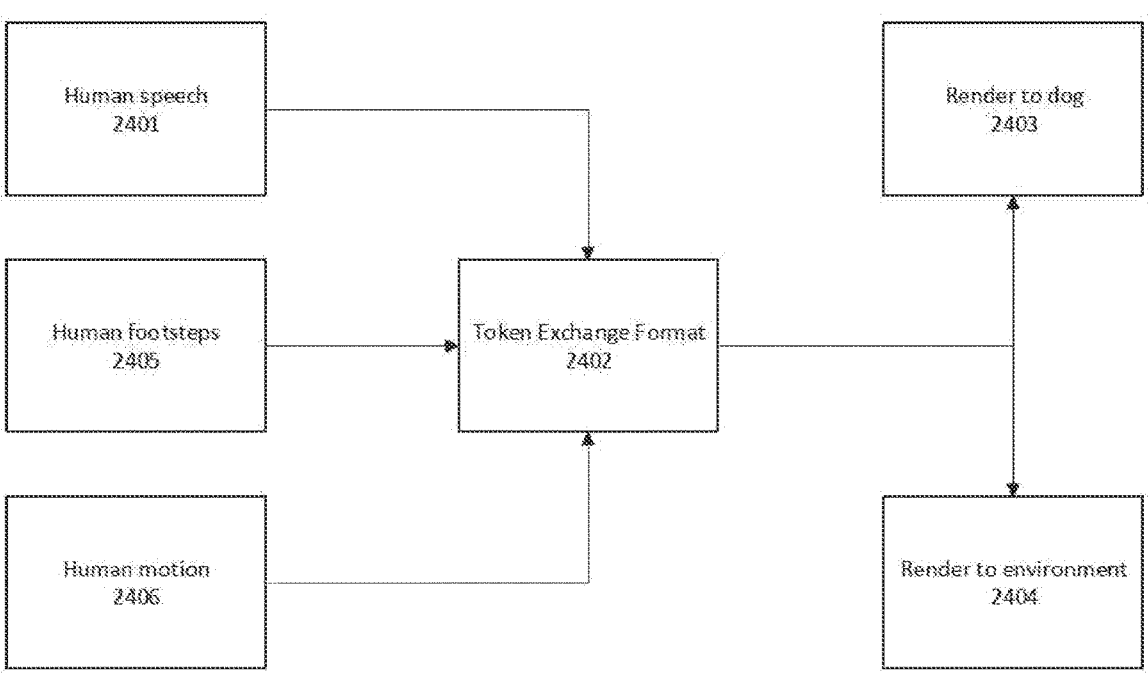
FIG. 24A is diagram for bidirectional translation.

Translation may, in some implementations, be bidirectional. Turning to FIG. 24a, we see that human speech 2401, human footsteps 2405, or other human motion 2406 may be translated to a token exchange format 2402. From there, it may be rendered to a dog 2403 and/or to the environment and/or to the general area 2404. Looking at FIG. 24b, we see that dog sounds 2408, dog actuation of button or other device 2409, dog motion 2410, and/or dog position 2411 (as well as many other factors such as heart rate, temperature, tail wagging, weather, ambient scents, etc.) may be translated to a token exchange format 2412. From there, it may be rendered to a human 2407 and/or to the environment 2413.

The footstep translation to speech is referred to as DSL, for "dog sign language". But also could have a "dance sign language," sometimes used to refer to a human performing the same footsteps that a dog would have to do, in order to send a message. It should be understood, of course, that it is thought that dogs can understand many words.

Figures 17A, 17B, 17C:
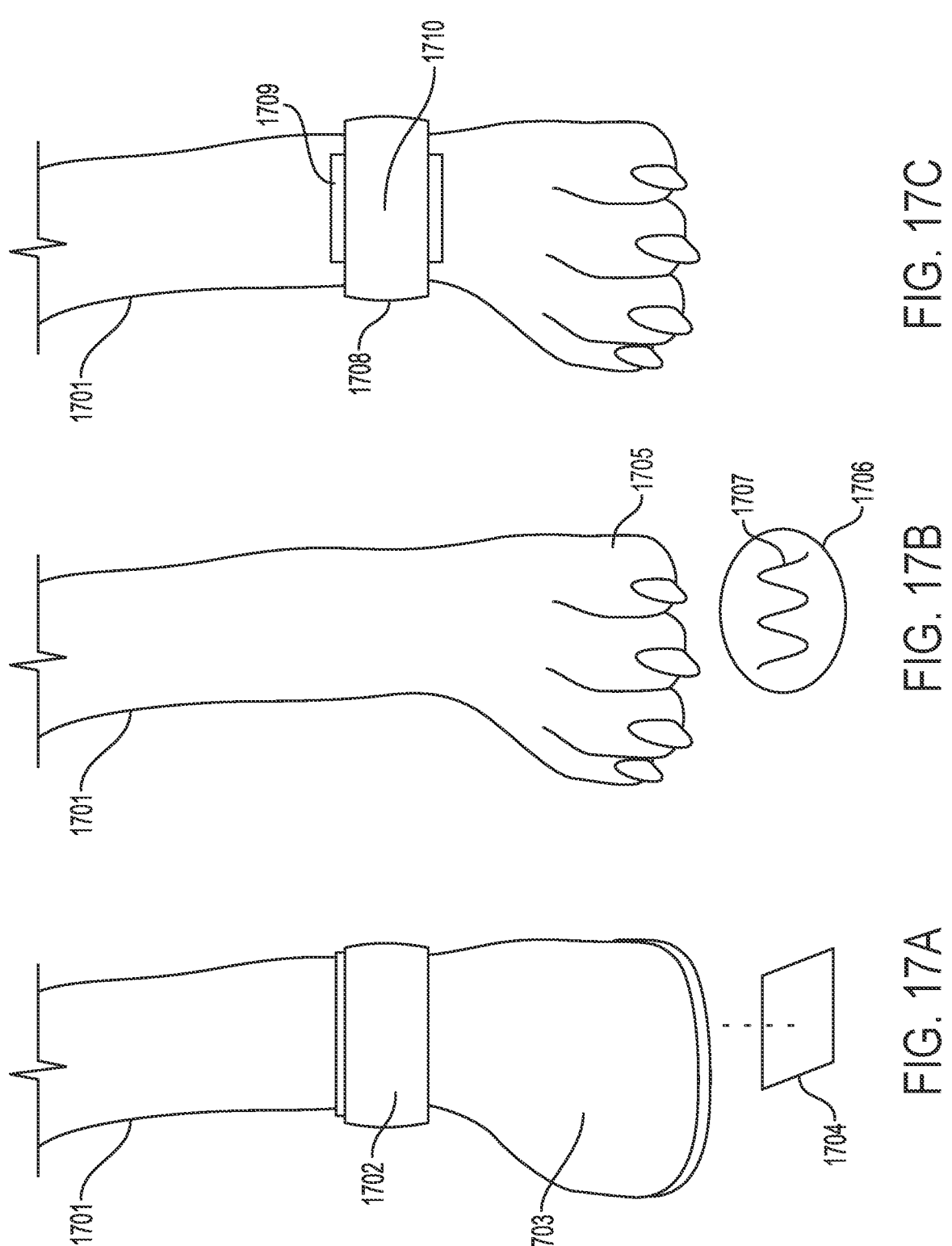
FIG. 17A shows a boot for an animal that compresses a sensor according to an embodiment.
FIG. 17B shows a putty attachment that may be adhered to a bottom or a paw according to an embodiment.
FIG. 17C shows a band with sensors around an animal's leg for detecting neural and muscular events according to an embodiment.

Turning to FIGS. 17A, 17B and 17C, we see a dog's lower leg and paw 1701. These figures show, inter alia, three examples of auxiliary sensors for monitoring dog steps in the absence of semantic buttons.

FIG. 17A shows a boot 1703 that compresses a sensor 1704 (which sensor may or may not be integral to the boot), indicating the time and duration of a footstep. In one aspect, as shown in FIG. 17B, the sensor may comprise a putty or other attachment modality 1706 that may be adhered to the bottom of a paw 1705, containing a deformable coil 1707 that senses aspect of compression, including, but not limited to detecting onset and duration of footsteps. In the same or other implementations, as shown in FIG. 17C, the dog may also have a band 1702, 1710 comprising at least one device with an array of sensors 1709, which sensors may be for detecting neural and muscular events 1708 in the foot and leg or a dog. One may appreciate that all three forms may have an equivalent system that can generate useful sensory estimates with nothing more than an IMU with the appropriate constraints to locate the IMU at the relevant physical location of the dog's paw. A combination of sensors may be used. Note that while we use "paw" as an example, other animal parts may be utilized, such as a tail, phalanges (in species with them), a tongue, a leg, a nose, etc.

Figure 20:
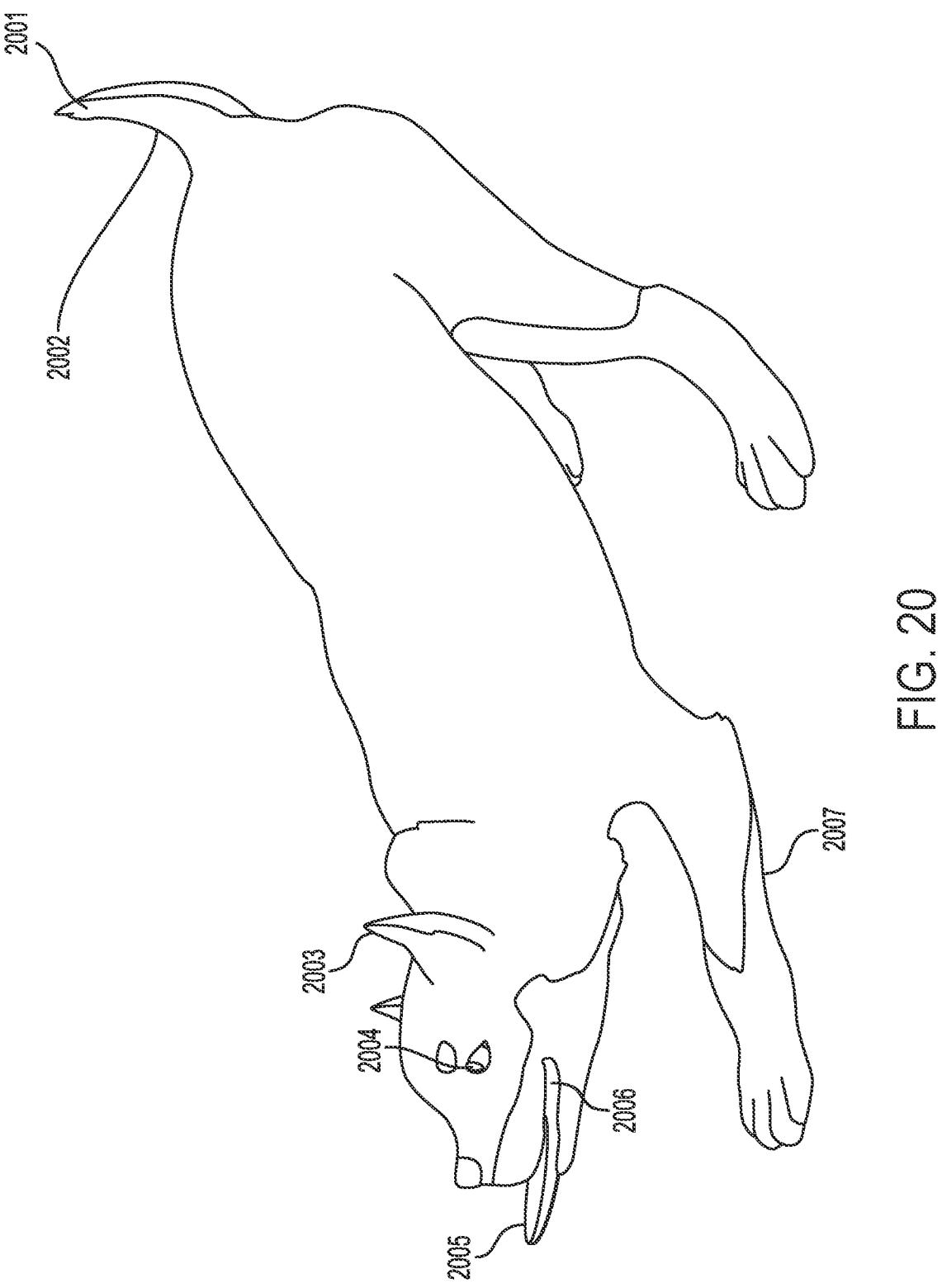
FIG. 20 shows a dog engaged in a play bow.

Turning to FIG. 20, we see a dog engaged in a play bow. While each dog behaves in a unique way, in a typical play bow: The tail 2002 is raised 2001, and the tail 2002 may wag or wave. The ears 2003 are typically raised (where the dog is anatomically capable of doing so). The pupils 2004 are often dilated. The mouth 2006 is typically open and the tongue 2005 may be exposed. The front end of the dog is typically lowered by bent forepaws 2007.

FIG. 20 generally shows a dog engaged in a play bow. The naturally occurring behavior in dogs, used to signal a non-threatening social interaction. It offers a physical marker of the intent to start a sequence of communication.

A system that initializes vocalization from a play bow has advantages, including in terms of discoverability and/or positive affect. But it could be a source of misinterpreted commands in the case of genuine high energy play (e.g. not intended by dog as linguistic communication). As such, subsequent steps may be filtered by energy, to keep deliberate directional steps as part of language behavior, and treating large bounding steps differently. In some cases the map from paw steps to tokens could differ during play. In one simple exemplary mode, high energy steps would not translate into tokens, and thus no clicks would be created from these "non-linquistic" steps, cueing the dog to change their behavior if language communication was the goal.

Figure 21:
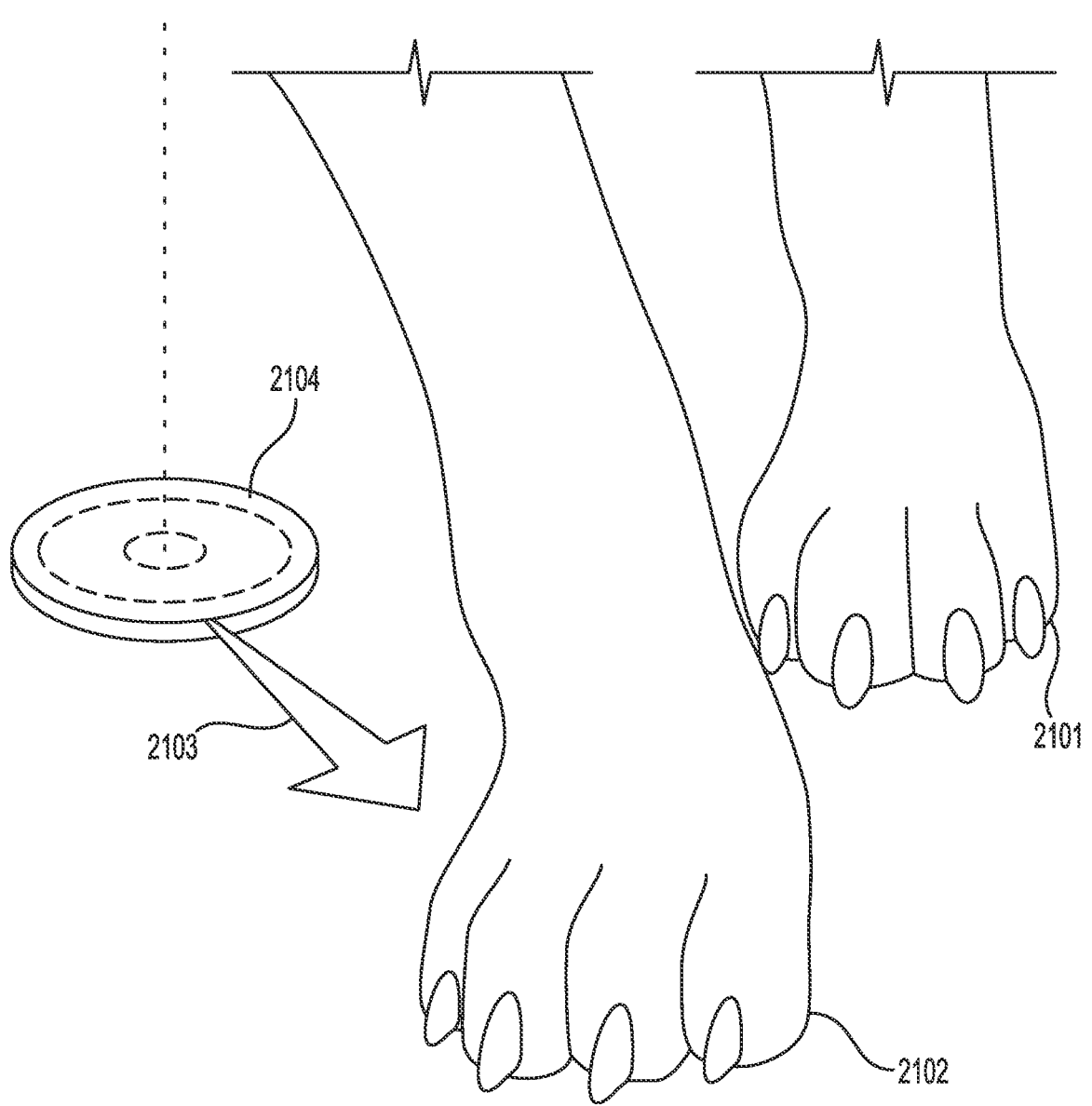
FIG. 21 shows the motion of a dog's paw from a prior location to a new location.

Turning to FIG. 21, we see the motion of a dog's paw 2102 from prior resting location 2101 to a new location 2102. An arrow 2103 indicating the direction of motion of the paw is provided to assist in understanding the invention. The direction of motion may be assessed by an inertial measurement unit 2104, or via a projection onto an imaging plane, e.g. via a camera on the dog's collar.

Figure 22:
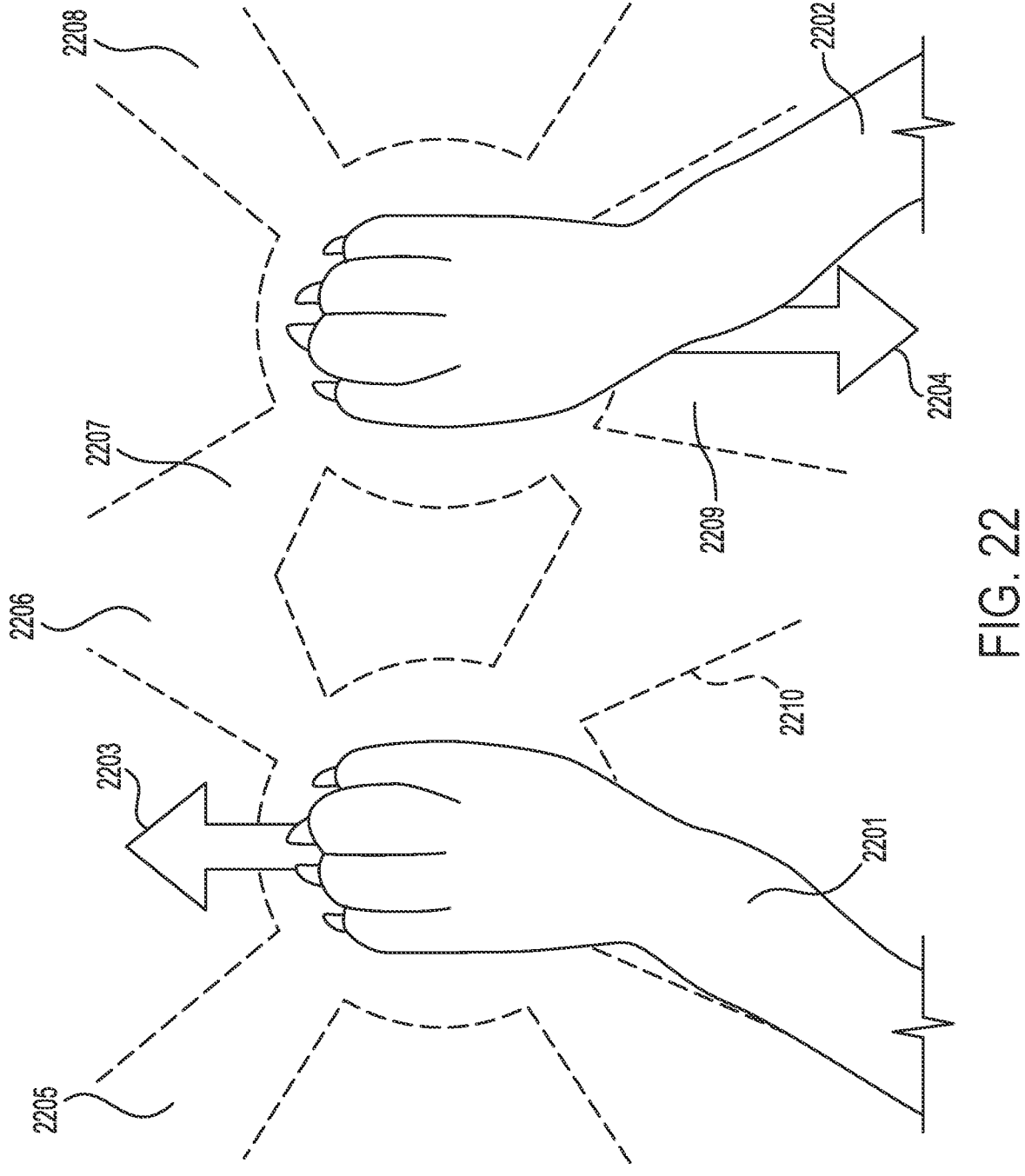
FIG. 22 shows a dog's feet and future motion to generate a token.

Turning to FIG. 22: A view of the dog's feet is provided. The view may be from an overhead camera carried by the dog (e.g. on a collar). In this example, arrows 2203, 2204 indicate the required future motion to generate a particular token. The left foot 2201 must move forward and then contact the ground within a bounded region. The right foot 2202 must move backward.

FIG. 22 shows one implementation of motions that a dog may make for motion recognition by a camera or other measurement device. The paws 2201, 2202 may move (either independently or together) left-forward 2205, 2207; right-forward 2206, 2208; left backwards 2209; right backwards 2210 or a combination or sequence of those or other motions.

In this example, each paw has four regions, chosen to represent an encoding of muscle movements easy to learn. Additionally, distinct translation regions are likely to engage distant muscle groups, and thus have premotor commands that facilitate decoding of intent. It can be appreciated that other spatial maps, for example, at different distances of displacement or angular offset, are also possible. Without limiting the foregoing, in one variation, these may be allocentric and in another they may be intrinsic.

Human language may have developed (in whole or part) by harnessing neural machinery for planning and evaluating mutually exclusive sequences of commands. We note that the sequencing of mutually exclusive motor commands demands a serialization of events. Regardless of the speculative evolutionary past, one aspect of the inventions may harness dogs' existing "language like" internal capacities (e.g. reasoning about the outcomes of chained future sequences of actions), and provide the digital armature to extend their communication capacity (e.g. via external working memory, phonological loop, error correction tools, sound generation, etc).

Figure 23:
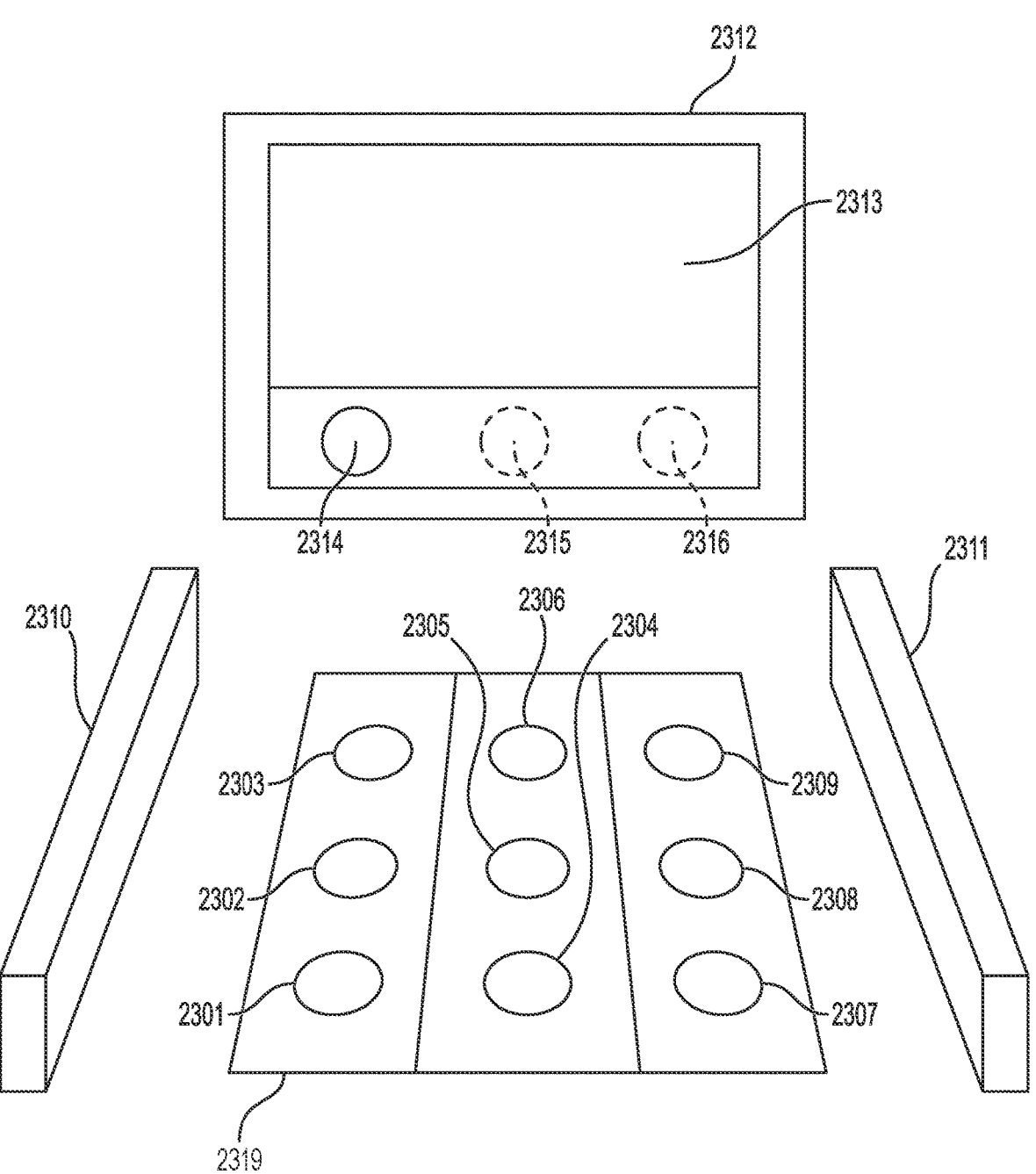
FIG. 23 shows a spatial arrangement for grouped semantic buttons with side rails and a visual display.
Figure 24B:
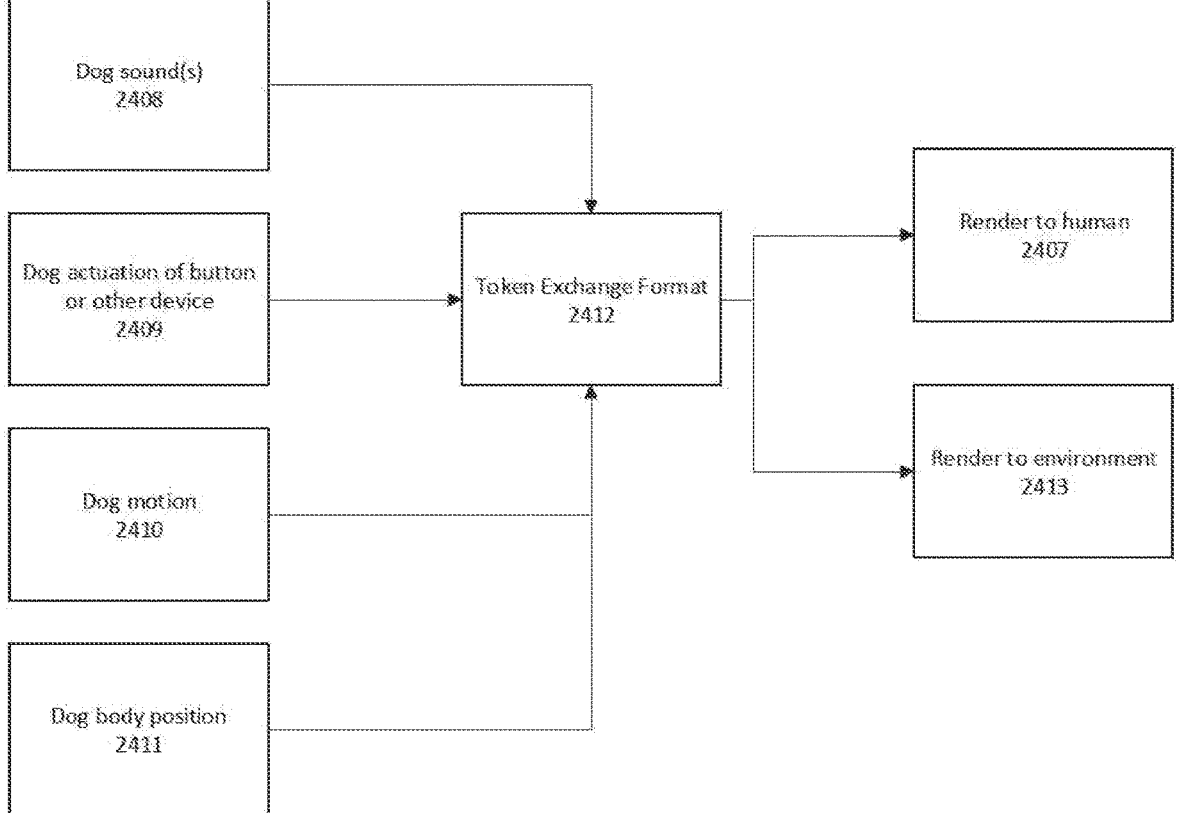
FIG. 24B is a diagram for translation of factors to a token exchange format.

Turning to FIG. 23: A spatial arrangement for grouped semantic buttons, with two side rails, and a visual display is shown. The buttons may comprise a grid 2319 (such as shown), with buttons on the left 2301, 2302, 2303; on the right 2309, 2308, 2307; and in the center 2306, 2305, 2304. The rails 2310, 2311 may contain sensors, displays, speakers, or other information collection and/or dissemination modalities.

Side rails 2310, 2311 encourage a dog to approach a semantic floor map 2319 from a consistent starting location. This preserves the meaning of "to the left of" or "closer to me" in a manner that is consistent with egocentric spatial coordinates. If, for example, a dog approached the same physical board, always on the left side, the relative motor commands for generating semantic tokens would be "rotated." This would be confusing in a manner similar to typing on a keyboard that was upside down or rotated 90 degrees.

Additional sensors may be used to accomplish a more precise position for a dog that is presenting as "ready to communicate". A physical location may suffice for many purposes, but a consistent relationship from initial speech intent can simplify the subsequent motor commands that generate semantic tokens. Notably, lower variance behavioral mappings (e.g. All the neural commands from start intent to completed message tokenization) may facilitate the learning of a semantic map with an egocentric coordinate frame independent of buttons.

In one aspect, we may utilize object-centered hextile grids. In another, we may utilize multi-scale hextile grids (or a combination of the two).

A visual display 2312 (if included) may be used to create a visual spatial working memory that re-enforces partial or whole consequences. Notably, in the example, the union of three semantic buttons 2314, 2315, 2316 are grouped together as a single "message." In this embodiment of a triplet language, a message is only broadcast after three tokens are combined. The sketchpad 2313 achieves many goals for learning. It serves as a perceptual referent for past actions, simplifying memory demands. It shows what past selections were. Additionally it serves as a visual cue for future actions. In other words, if the message buffer with all three tokens is not "filled" the message will not be automatically broadcast. The possibility exists to maintain an order dependent on mapping of tokens, separately from a visualization of the relationships between words. For example, if a series of tokens "RED FRIEND FOOD" is created, English may resolve to implying the subject is the red friend, rather than the other colored friends. If, however the topic is more about a friend eating red food, a less ambiguous visualization could Accompany the token history on the bottom. For example, graphical images or video or symbolic patterns could disambiguate the adjective relationship. It should be appreciated that the visual display may serve to modify digital documents, a representation of communication intent before a message is sent. As such, it provides a considerable advance for dogs to be able to create, persist and exchange messages in a variety of forms with an exchange between dog sign language, visual feedback, auditory feedback, and various natural languages.

Groups of semantic buttons in the spatial array could be organized by "subject, verb, object." Certain tokens may be implicit in short language commands. In one simple separation, buttons in a front row 2303, 2306, 2309 may be noun-like; buttons in a middle row 2302, 2305, 2308 may be verb-like; and buttons in a bottom row 2301, 2304, 2307 may be adjective-like.

Figure 25:
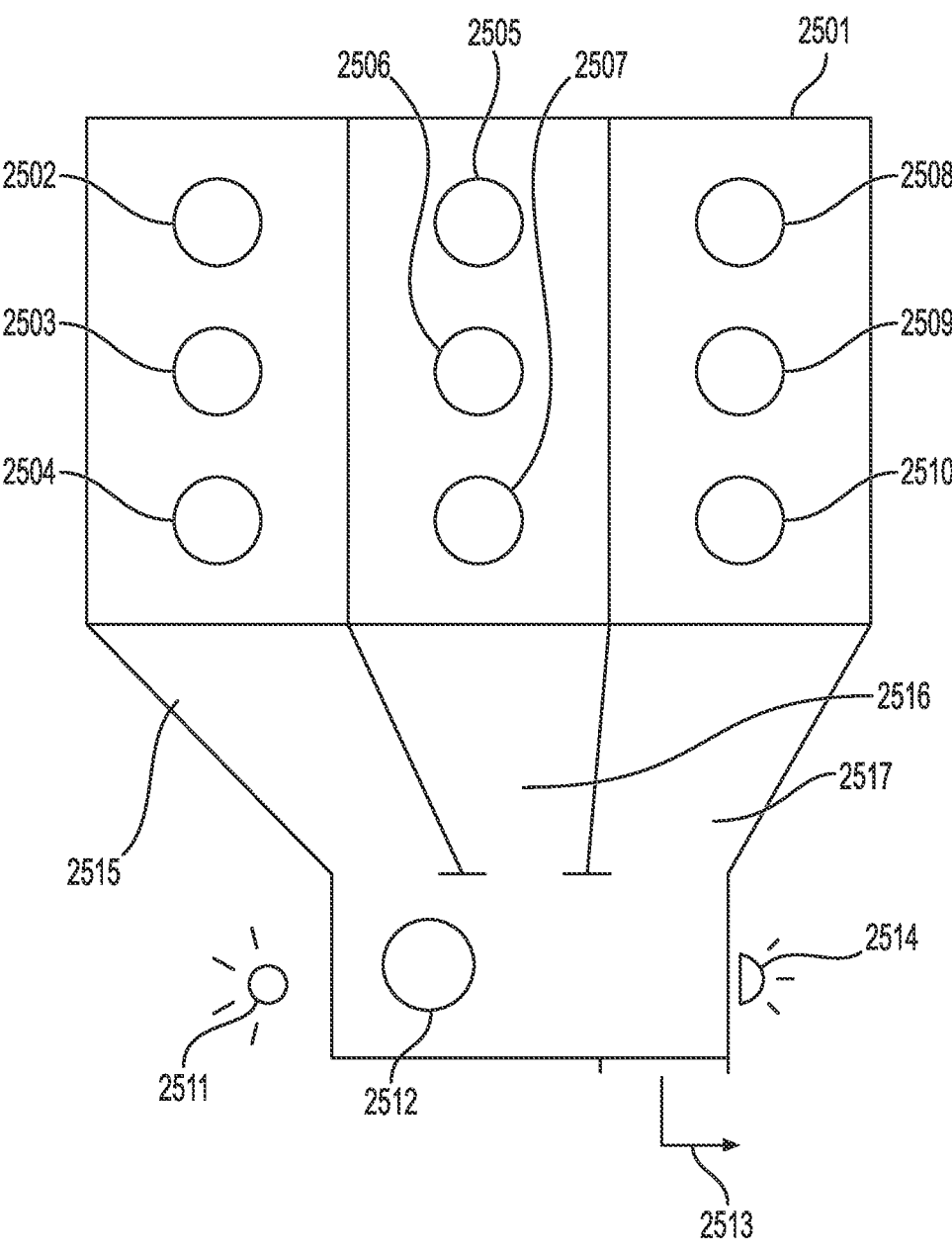
FIG. 25 shows a wall-mounted structure with balls that roll down into slots in a token representation.

Turning to FIG. 25, we teach a wall mounted structure 2501 with balls 2502, 2503, 2504, 2505, 2506, 2507, 2508, 2509, 2510 that fall out of a position, roll down a track 2515, 2516, 2517, and are placed into a slot 2512 in the token representation. In this example, nine semantic actions can be represented by the 9 holes. If a dog performs a specific action, a ball emerges from the hole and, via gravity and the slopes of ramps, falls 2513 into the appropriate slot. A physical design may accommodate an ordering of temporal action, or of typed tokens. For example, consider the embodiment where the left column is entirely of adjectives, and the middle column for subject nouns, and the right column for verbs. The physical structure would only allow for learning to create a certain class of sentences. But it may also enforce that invalid sequences (three adjectives with no noun, may not be constructed, and therefore may not be broadcast.) An additional system, existing behind the display, would "replenish" the tokens, moving them back up to the visible hole, without releasing them. The unique aspects of this include allowing a visual learner to inspect the causal consequences of emitting a ball. It should be understood that while the balls and device shown in FIG. 25 may be an actual physical device and balls, it may also be a digital representation in a screen or other display modality. The utility is to increase the odds of learning the relationship of an abstract token by mapping the formal logic of rules onto physical tokens that obey the results. Insofar that dogs attend to moving objects, like balls, and have inuitions over naive physics of the world, the binding from "a floor action" (stepping on a button, or performing a DSL action), can be imbued with grammatical meaning, with inspectable formal relationships to other tokens.

A physical system may have a light 2514 used to draw attention to moments, and a collection of sounds 2511, paired to formal transforms of the sketchpad. These sounds may operate in isolation to provide the same perceptual sketchpad, even in the absence of the physical device. For example, a collar-based, or ankle-based monitoring system may be paired with the appropriate speaker to achieve the same results, and not require a visual or physical display of the token state prior to broadcast.

It can be appreciated that a skeuomorphic digital representation of this physical device may also be an effective way to communicate the conditional logic of actions to token, and tokens to broadcast messages. In some cases, a dog may learn with a physical system and then transfer learning from the physical state.

Figure 26:
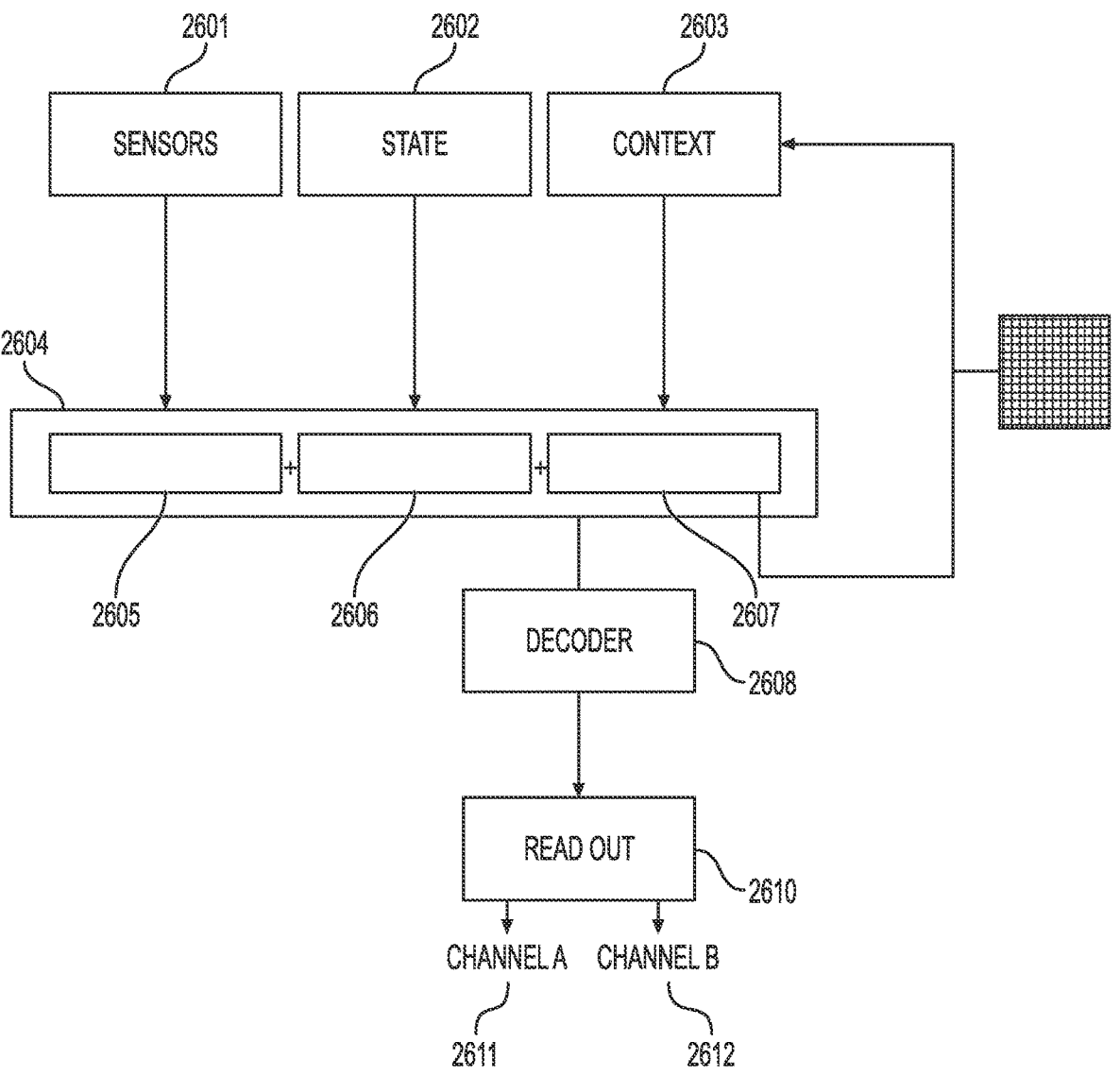
FIG. 26 is a flow chart for decoding the state of a dog's memory.

Turning to FIG. 26, we see an exemplary flow chart. Sensors 2601 may determine state 2602 and context 2603. Once valid data 2604, which includes sensor data 2605, state data 2606 and context data 2607 is presented, it may be passed to a decoder 2608 and ultimately a read out 2610. The read out may be channelized into multiple channels, such as channel A 2611 and channel B 2612.

Here we show decoding of the state of a dog's external working memory into multiple channels, as well as how that state may be updated based on the sensors that encode the dogs actions and intentions, the existing state of the working memory, and the context of the dog in communication. A sensor state may be the observation of a left paw being moved with a particular velocity to a particular location for a duration of time. The sensor data will be encoded into a tokenized state in the external working memory. The process of tokenization may have access to the previous state of the working memory buffer. One may consider many inputs to act as "transforms" on the token state in working memory. In some cases, the impact of new sensory data will be to append tokens to a list. But other embodiments are better described by a function that map from previous token state to new token state, conditioned on the sensor input. Finally, additional context may impact the transform.

In some embodiments, sensors include digitized recordings of dog voicings, paired with the contents of external working memory.

In some embodiments sensors may include measurements of the dog's physiological state which may be fully or partially volitional. For example, a measurement of activity in premotor cortex, heart rate and/or tail wags.

In one embodiment, the concatenated representation of a new sensory volley, the current token state and the current context may serve as an input vector to a neural network. The output of the neural network may be the subsequent token state. Alternatively, the network may be construed as having multiple output channels. On channel may be the internal voicing to the dog. Another channel may be the public voicing, presented to both the dog and human. Yet a third channel may be the voicing presented to a person, and not the dog. The desired perceptual attribute may be specified for any or all of these channels. We refer to each decoded channel as a different "rendering" of the state of working memory. Importantly, the state of working memory is shared across all channels. Also relevant is that the perceptual error between a rendered state and a target state may be assessed differently across channels, allowing for different observational capacities in the listeners. For example, dogs may be well attuned to high frequency differences, but may confuse plosives. Thus the magnitude of error for imperfect rendering should differentially and accordingly impact a gradient-descent-based learning algorithm that includes labeled examples in multiple output modalities.

In some training regimes the input output pairs of sensor, state, and context may be aggregated over multiple dogs. In other contexts, the training may be focused on the observations of a single dog. Especially during learning, the opportunity exists for the dog to learn how to create the actions to generate a desired communication output. During this time, an algorithm may work to update the mapping from sensory data to the dog's transmitted message. Nonetheless, knowledge from other dogs may assist in creating a good starting point, as well as preventing rapid fitting procedures that emphasize recent observations from becoming stuck in a local minima likely to prevent long term learning.

Similarly, it is possible for rendering algorithms to update with different criteria for human and dog voicing. The dog voicing may be evaluated for its capacity to accurately model the dog's tokenized actions, allowing for correction of errors. Clarity with respect to the dog's perceptual system is important for their own learning. On the other hand, people may be motivated to hear clearly as well, or they may prefer to have alternate rendering. The latter is possible because the cognitive domains of understanding the speech may be low for a human, enabling transformations in the perceptual domain that are aesthetically satisfying. For example, by rendering an acoustic signature to make speech output feel more "dog like" or even characteristic of this particular dog. Rendering a visual display may emphasize the rules of grammar, and correction of errors, or may simply emphasize the creation of visual rewards aligned with correct grammar or shaping trajectories consistent with a target learning activity. Or in another example, allowing context, such as the repetition of a word over and over, to enable an implicit emotional tone. Such controls could be determined by individual users of the inventions.

Engagement with the teaching system (for dogs) and the communication system (for humans and dogs) may be used as an optimization signal for the design of good token transduction, decoding, and rendering, using best practices in reinforcement learning, neural networks or other frameworks for artificial intelligence.

In some embodiments, the contents of the working memory may be an estimate of the intended communication. As such, additional sensory data serves as a correction of the tokens that exist within this state. As such cases there is a benefit to indicate the region of transformation of a desired modification. For a document, the notion of a cursor is used to select and transform aspects. For a linearly extended audio output, the time of action may be an important indicator of what a communicator wishes to modify. That is, upon hearing a "readout" of the current state, the moment of initiating a command may be used to inform the subsequent transform of the token state.

We also teach translations between sound and postures. Things worth establishing:

A dog may learn to press buttons, and then transfer that skill to an environment without buttons. This could be accomplished, inter alia, by external sensors that accomplish that goal. Such sensors may include (among others) an accelerometer bracelet, a pressure sensor in booties, or in the pads of the feet, capable of detecting, an array of dry electrodes over motor cortex, a ratio of back scattered photon counts between two wave length of light, indicating deoxygenation of hemoglobin in a sub-cranial voxel, a camera and processor estimating the contact of a paw with a button region. Any of these signals could be used as predictive signals leading to a dog's button press. Similar behavior, even in the absence of a button, could trigger a speaker to emit a button sound. This gives the dog a chance to realize that their own actions control an acoustic word command. Repeating the same preceding actions would trigger the same word symbol.

While learning that these signals are part of a volitional control system, it helps to have a perceptual readout of actions, and of the system state.

In some embodiments, the maintenance of a spatial grid of concept ("a semantic map"), may be transferred to a different location or action. For example, the X and Y location of a button may be transferred to the angular position of the dog's head, left-right and up-down. By angling the head and stomping feet, the dog could issue an auditory command. Notably the "map" could be learned with buttons, including the meanings of sounds and symbols, and then the transfer could allow the meaning to move to another modality without the buttons. This establishes that the abstract symbols have the same spatial relationship and meaning. For example, preserving the meanings and relationships of position, "home" and "door" could be next to one another in the second modality.

A metaphorical relationship exists for a grid of icons on a monitor, and a mouse as a spatial navigation device. In this case, the angle of the dog's neck acts as. As the dog were to orient its nose, "move it to the left" this could trigger a neighboring virtual button to present. As a metaphor, a button can have a "hover" state when the mouse is near. An auditory feedback device could have a "nearby angle" presentation, indicating to the dog what would happen if the action was triggered.

In one embodiment, the hover action could be a presentation of the target word at low volume near the dog. In one aspect, a consent action may be utilized as a trigger. In another aspect, machine learning may be utilized to determine a trigger. In another aspect, a sound, body motion, or combination thereof may be utilized as a trigger. A trigger could be a particular sound like a whiny, or a hopping motion of both front paws, or another motion It is anticipated that the dog will be the source of the trigger, although the system may be configured to utilize another trigger source. Upon a trigger, the system could register to confirm "the latest suggested action." That action might be the subsequent acoustic broadcast of the word at a louder volume.

It may be possible to keep track of both "internal voicings," e.g. the stream of events that the dog generated by visiting a semantic position through body posture, as well as the "public voicing" that they initiated. The relationship of these symbols can be used to infer a greater sensitivity to the dog's communicative intent. A public voicing may also create a text message, while an internal voicing may be logged as an event for aggregate review at a later time.

A dog's action with respect to a button may be paired with a sound to indicate environmental control. For example, the action of the dog would then increase or decrease the brightness of the lights. A query {ADJUST ME?} sound may be presented to the dog, paired with a flicker dimming of the light. The meaning would be: do you want to change the lights? The format of query and orienting change would indicate to the dog, this is a part of the world you can control. Again, for a user interface, by metaphor, we can realize that a slider grants us analog control of some parameter. An acoustic cue might provide the same indication for affortance to the dog. LIGHTS MODULATE+{ADJUST ME? Sound} . . . analog behavior is mapped to room brightness. The same could be used for control of volume, or temperature, or a screen.

A visual display may be used to indicate the state of communication to a dog. In some embodiments a grid of spatially arranged semantic tiles afford being directly pressed. In other embodiments, a visual referent of the semantic tiles could be triggered. For example, a whole grid may be depicted on a screen and then the dog's actions or posture or sound generation would be mapped to a "press" or one of the semantic tiles. The board serves to map learnings from one domain (hextiles) to another (a screen). As the effectors may differ considerably on the dog's part (such as a sound and stomping both front paws), the dog would preferably be presented with the ability to learn about the space of potential commands without committing to them. One such possibility is to create a visual guide on the button grid, which could reflect a thresholded probability of decoding a word. Thus, if a particular action were performed, the top three interpretations could light up yellow (indicating progress to potential selection, but not selection yet). In another embodiment, a sequence of actions of the dog would navigate a "tree structure" of messages, whereby future choices are visible. If a dog has a particular target button in a virtual space, the encoding of the actions required to get there could be visible.

For another metaphoric interface for UX to the dog domain, television remotes allow for four button presses (up, down, left, right) to select the next letter. The four most common letters may be presented to allow for a shortcut in. Even if the mapping is not dynamic, there is room for a visual representation to indicate both the STATE of working memory, as well as the FUTURE STATE, conditional on actions. Yet another metaphor: autocomplete in sentence generation.

Morse code is a mapping from dots and dashes to letters. Written languages map letters to words. Now consider a map from eight "posemes" to 512 semantic buttons. A random mapping may take more time to establish and learn, but a sparse tree structure, whereby similar chains had similar communicative intent may be useful to the learner. Importantly the composability of the "parts" (e.g. a pose) would have a semantic reinforcer that carries meaning to the dog.

In one instantiation the semantic meaning may be carried by having the system produce a sound, e.g. speaking the semantic token.

Combinations of feedback systems may also be desirable. For example, saying the sound, then showing the video clip of the dog pose, then showing the sound again. The order and slight delay of these events creates a stream of experiences tightly coupled in time, with a potential interpretation of causal relationship. Regardless of the interpreted correlation or causation, their proximity in time, and repetition at different moments, creates a binding of meaning between the symbol sets. In this case, the disparate perceptual aspects get reinforced as "carrying the same meaning." Ultimately, a dog may generate a sequence of poses in isolation of the visual display, and the spoken "message" would only be broadcast. As such, the visual display acts as an external sketchpad of working memory. The goal state of communicating a sentence/message/command would have a direct "read out" from the sketchpad of working memory For yet another metaphor, we are helping the dog write a text message or email. The status or correctness of the intended message is inspectable by the sender, before it is sent.

In some embodiments the semantic boundaries of the dog's commands, the internal state space, and the final transmitted message, may be adapted to a particular dog. Consider handwriting. A child's written "A" need not be identical in graphical form to the A of another writer, but yet it still has the same observable traits. A reader of the written letters, whether human or OCR software, must group all written "A"s into the same symbol A. Symbolic typing of dog behavior, especially the volitional posemes under consideration, requires a certain variance to accommodate behavior and size differences in dogs, yet a similar consistency to benefit from common criteria. Among others, criteria of good language maps may include: the learnability of actions, the non-confusability in the command space, as well as the intermediate representation in working memory sketchpad. Additionally certain maps, in addition to being learnable by dogs, are also "good at supporting neural readout" such that premotor planning is performed by a cortical area and which is likely to support a linear readout of symbol states. A camera may provide input to a processor which defines a set of boundaries of analog observations of body posture and how they map to symbols. This may be established by a rigid set of rules or rules that adapt over time. The rules that adapt over time may be embodied by a neural network that applies backpropagation from a training set of observed behavior to a target set of observations. The training set of observation may include examples of past videos of dog actions (or other physiological correlates or sensors) that led to acknowledged or consented messages. The pool of recent history, which may be the last 1, 5, 500 or 10000 symbols, may be curated with some examples being included for their proximity, span and contiguity to the previous examples. If a new example is too disparate, it may be excluded from the online learning pool. If the example is too similar to existing content it may be included. Periodically (e.g. upon addition of new information), or new. As the classification of symbols has much to do with the maintenance of boundaries between other similar input features, a margin classifier may be used to maintain support of evidence proportional to their uses in establishing a boundary. One skilled in the art can appreciate that past observations ordered by time, can account for nonstationarities in symbol formation, as expressed by a single language emitter over time. This is particularly important during the learning phase of a learner, where they are exploring the very mapping of symbol generation. But it is also very important when other downstream forces transform the observed features of the dog's intent. For example, a sensor may change its position, and thus encode information differently. This change may be dramatically discontinuous at a moment in time, or it may drift smoothly. Mere recalibration of sensor gain may not be enough to accommodate. The map from sensors to symbols may need to change. Thus, more recent observations may be favored. Yet, other prior states may also be revisited, such as a different form or motion used on a cold morning. Thus, knowledge learned from past mapping should not be entirely thrown out, as prior modes could return. A gaussian mixture model might capture the likelihood of the sensor state, or other hidden states that influence the transform from raw sensory data to intended symbol. Similarly, past actions that led to rejected symbols can be informative. One candidate cause is a bad map that caused a symbol to be decoded that was not the intended one. In some cases, one could use these for hard mining negative examples.

Finally, a map may allow a local flexibility to a subject, but may enforce a proximity to an "objective map" shared across users. That is, transforms to a local map may be weighted by their tolerance of warping an objective map. The end goal is for all learners, or at least all learners within a common language pool, to share the same objective map. This allows for the possibility of evaluating "good maps" and thus "good constraints" to impose on the flexibility of signal to symbol transforms as learners gain expressivity over new symbols.

Consider a pose language that is optimized to communicate to a viewer in front of a dog. Notably a key aspect of communication "being ready to speak" would be to frontally present to a listener. This could be a person, a dog or a camera based interpretive system. The difference between poses should be clear to make as well as to "decode" by viewing. In the case of posture.

Consider a language set optimized to be detected by an array or electrodes and or piezoelectric sensors distributed across the surface of a dog's body. For example, in a dog jacket, or in a subcutaneous sensor. As different sensors measure posture or muscle contractions.

Consider a language where the relative posture of limbs encodes symbols. In one embodiment, a regular time interval sets a clock at which poses are evaluated. Within each interval there is sufficient time for a dog to reposition each of the front two legs. Upon repositioning, the change of each leg (forward, backward, left, right, no change). Thus, one symbol may be "both legs stepped forward" and a different symbol may be "left foot back and right foot forward." By encoding changes in leg position, this offers the opportunity that the muscle commands are more measurable as a proxy for the commands. In addition to, or in full or part substitution for, the foregoing, we may also capture transitions between positions as data sources.

Of course, the absolute position of the dog's paws with respect to a resting position may also be used as a symbol. This has the advantage that a symbol is independent of the previous state. (Such as learning where to step at a moment in time in DDR).

A 360-camera located on the dog's collar has a good view of its paws. Or similarly any wide-angle camera with a field of view that reliably captures the dog's paws.

A system composed of two bracelets and a collar may be used to measure the relative change of position between these locations. In this manner movements of the head toward one paw or the other may also be meaningful. Small changes in body motion could be sensed and rewarded during a symbol learning phase. Auditory reward sounds and/or food rewards may be utilized.

Various symbol sets have been described allowing for changes in the dog's body to be sensed and transmitted as "a symbol." These symbols could be aggregated to create "a word" or reinforce that there is another path to triggering a semantic button. Imagine a dog that is walking outside and has no button "home" to press. A gesture triggers "presenting for communication." A clock starts making a tone to indicate letter frequency. The dog moves its legs. A sound symbol advances. Another leg movement with more acoustic feedback from the collar. The leg motions are aggregated by either distance sensors or camera or electrodes proximal to the premotor cortex. The dog is offered an internal presentation of the generated word. Only the dog hears "home." The dog presents a confirmation action, triggering "HOME" to be spoken from the speaker loud enough for the person to hear. One can appreciate that a similar mapping could be used from actions to. Just as motor commands to write letters are separated at multiple stages from letters, words and sentences, so too, a mapping of leg position to auditory voicings could have a chain.

We may utilize a collection of observed physiological states, such as:
  leg positions
  leg motions
  leg forces
  leg angles
  head position
  head orientation
  muscle tension
  tendon stretch
  heart rate
  voxels of deoxygenated hemoglobin
  electrodes tracking aggregate neural activity
  electrodes tracking individual or MUA spiking activity These may in turn be associated with n digital representation of working memory sketchpad, such as:
  a tree structure of clustered concepts in a semantic map
  such that each leaf is a sentence
  such that each leaf is a word
  such that each leaf is a letter
  such that the visual state indicates future possible states We may also utilize a mapping from digital working memory sketchpad to a perceptual state and/or a transform of working memory into a be expressed as a shared public communication such that each state has a visual correlate, such as a semiotic icon and/or video, and/or such that each state has an acoustic correlate (onomatopoetic).

In one aspect, spoken words of human natural language may be incorporated such that each transform of a state has a visual or acoustic such that the mapping from physiological state to working memory are learnable by an algorithm such that the physiological states are volitionally reproducible, with a low degree of error from an experienced dog.

This perceptual state may be private to the constructor, or inspectable by a motivated third party. such as looking over the shoulder of someone taking notes, making it possible to see how they are working throughout this problem. In one aspect, the system may create a log of all and/or some of the ways this kind of communication was approached.

In one aspect, a transform of working memory may be expressed as a shared public communication.

Consider the goal state of going outside. If the dog realizes that the GATE for going outside is emitting the utterance "outside", these are tools that build to emitting that utterance. The production of posemes that reliably trigger an internal view that matches "outside".

The latter stage is a denoising of communication that tolerates exploration and failure. A rewards based system may not limit internal utterance. But may throttle public utterances. E.g. 100 per day, or withheld until an observer is near a device.

A dog may recruit a listener. "Come listen to the sentence I built." A person may approach the visual representation of internal working memory. The presence of the audience triggers a read out into the listeners perceptual domain. The dog witnesses the human listening (and hears the message too). "outside now question" The person may then let the dog outside. Or the person may say "not now. We will go outside later." The dog may be rewarded, as the intended message was received. Additionally, the listener may acknowledge the sentence.

In one embodiment, each button press may cause an icon to display at the same time as a sound is played. In some cases, the icon may be a video of a dog doing something, like drinking water. In some cases, the video may be actual footage of the very dog, filmed by the owner drinking the water. In other cases, the icon may be a pattern matching the same pattern on the button (in this context, "pattern" may include a color).

The creation of a shared dog sign language (DSL) is taught. The gesture and posture of a dog's body can encode symbolic meaning. Renderings of these body postures could be shown to a dog when pairing meaning with button presses. Assuming the body posture could trigger the verbalization of the corresponding sound.

Mapping dog sounds to words could anneal based on an iterative procedure allowing dogs to experiment with symbols that map to different audio features in a phonetic way. That is, dogs can hear the phonetic structure, but can't generate the speech. If the subspace of their voicings were mapped on to a set of word symbols, dogs could achieve human intonation of sounds.

A key trait of a language is that some symbol groupings are not valid words or valid sentences. In one preferred implementation, the test for validity is forgiving of errors and/or recognizes close attempts. This allows viewers to understand when a learner has a given level of proficiency, by the absence of invalid sequences of words. Similarly, dogs have a chance to learn valid groupings when they receive feedback that the preceding sequence was a nonsense string. One way to establish this is to create a cue and reward structure for valid sentences, or even more precisely, the construction of valid sentences that expand the learner's capacity at this stage. It is possible to bury reward easter eggs for completion of target sentences that have high utility in the learners word acquisition. This is like a teacher saying "use the word 'tree' correctly in a sentence." Or, please use one noun, one verb and one object to be valid. The exact sentence itself is not reinforced, but the relations between the parts must follow the constraints. Similarly, an incorrect sentence may refuse to transmit or broadcast to an audience. Therefore, to the extent that a learner is motivated by the reception of the message, they will have the incentive of learning and repeating valid sequences of tokens. (Other token sequences just don't work). Working backwards, it is possible to construct a digital sketchpad with different rules for valid grouping of tokens.

Figure 27:
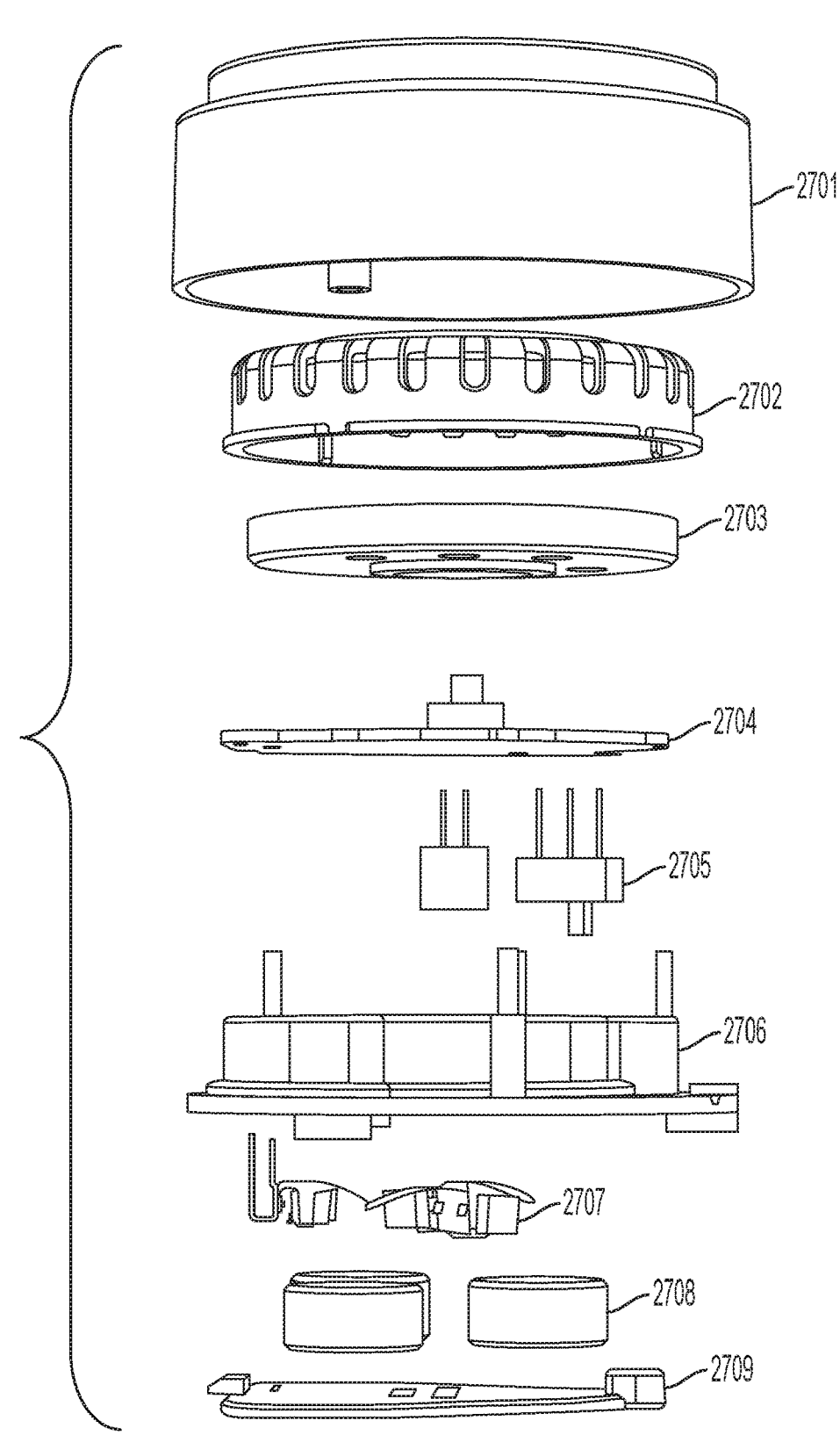
FIG. 27 is an exploded view showing components of a sound button according to an embodiment.

Turning to FIG. 27, we see an exploded drawing of a sound button. The sound button may be comprised of a shell [2701]. The shell, which may be called "side shell", "top shell", or simply "shell", may be connected to a button cap

[2702]. In one aspect, the shell [2701] and/or button cap [2702] may be made of one or more plastics including but not limited to polyethylene, rubber including but not limited to polyurethane, and/or metal including but not limited to aluminum. In a preferred embodiment, it is made from a non-porous material so that it does not absorb liquids or other contaminants. In turn, a speaker fits below and/or into the button cap [2702]. The speaker [2707] connects to a PCB [2704]. In one aspect, the speaker [2703] may also be constructed of plastic including polyethylene and/or metal including aluminum. A microphone, a toggle and/or slide switch [2705] in turn connect the PCB [2704]. The speaker [2703] then connects to a housing base [2706]. The housing base [2706] may be made of the same or similar materials as the shell [2701] and the button cap [2702]. Battery contacts [2707] connect to the housing base [2706] and to batteries [2708] (as illustrated, they are LR44 batteries, though the type of battery may be varied). A battery compartment cover [2709] encloses the batteries [2708].

The battery compartment cover [2709] may be affixed using a screw, a latch, a gasket, a combination of the foregoing, or other conventional methods.

Figure 28:
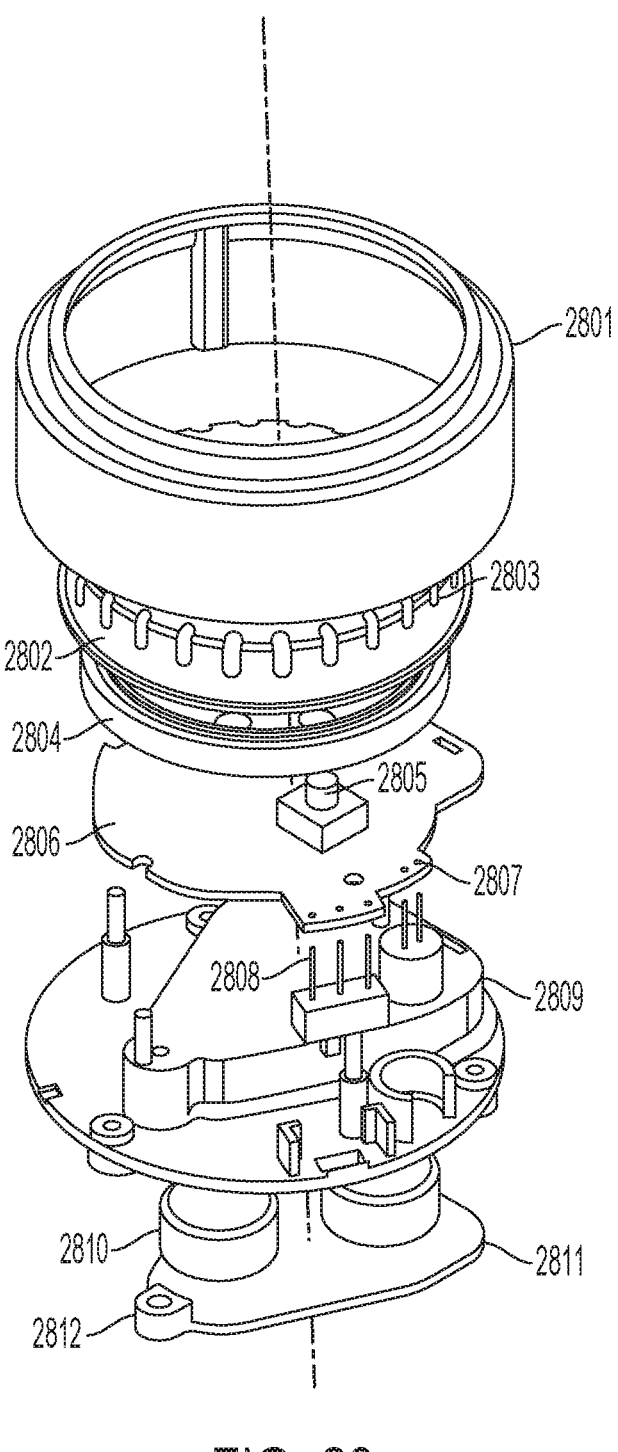
FIG. 28 is an exploded view showing components of a sound button according to an embodiment.

Turning to FIG. 28, we see an exploded view showing components of a sound button in one possible configuration. The internal components are enclosed by the shell [2801]. Placed at the top within the shell [2801] is the button cap [2802]. The button cap (sometimes called "top cap") [2802] has cut-outs (also called "recesses") [2803] capable of transmitting sound from the speaker [2804] through the cut-outs [2803], permitting high quality sound transmission. The button cap [2802], when pushed and/or forced downward, comes into contact with the speaker [2804]. The speaker, in turn, actuates a momentary (or other) switch [2805] affixed to a PCB [2806]. The PCB [2806] then emits a sound (in some aspects, a playback of a recorded sound).

The pins [2808] carrying power, microphone output, or other signals, fit through connector holes [2807] in and/or by penetrating the PCB [2806]. The batteries [2810] are enclosed by a battery cover [2811], which may be affixed to the battery compartment [2809] using a screw (not shown) through, most typically, a threaded screw hole [2812], or by other means of attachment. By covering the battery compartment [2809] (typically on the top) using an enclosure, such as plastic, the sensitive components, such as the PCB [2806], are physically separated from the batteries.

Figure 29:
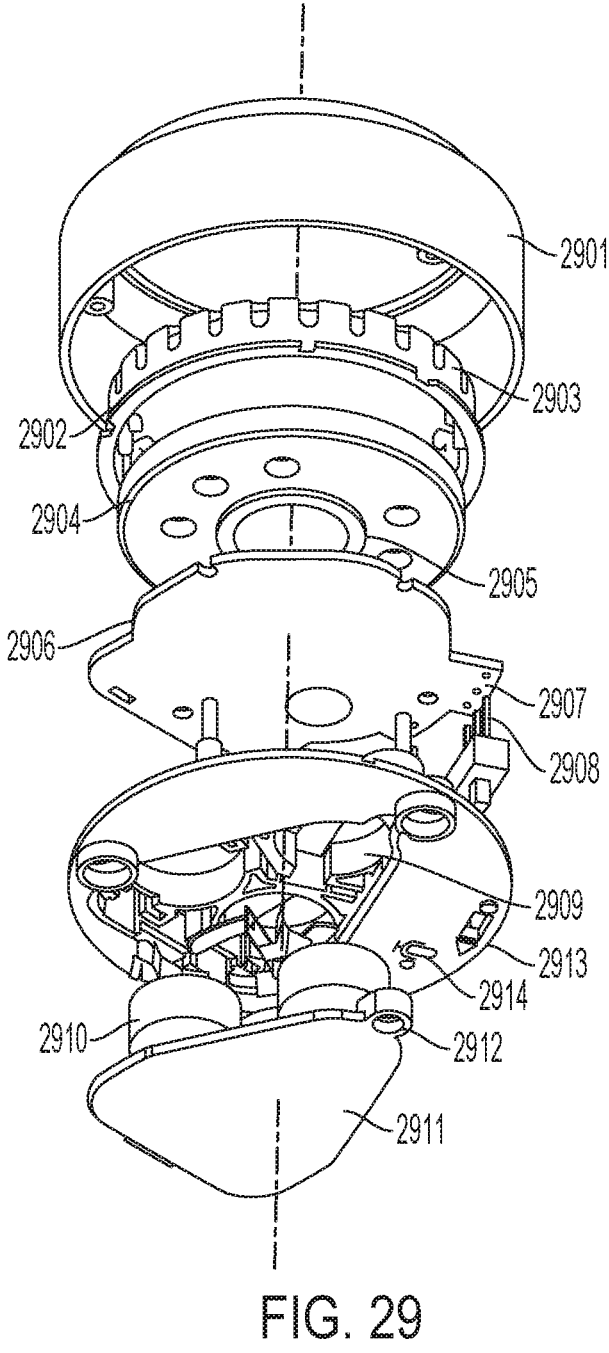
FIG. 29 is an exploded view showing components of a sound button according to an embodiment.

Turning to FIG. 29, we see an exploded view showing components of a sound button in one possible configuration. This view is a bottom perspective view. The sound button is surrounded/enclosed by a shell [2901]. The button cap [2902] is the topmost component and is, at least partially, enclosed by the shell [2901], in one aspect on the sides and a portion of the edge around the top. In one aspect, the button cap [2902] has cut-outs/recesses [2903] that house/comprise a hole through which sound waves can travel minimally impeded. The speaker [2904] projects into the airspace within the top cap [2902]. Typically, the speaker [2904] faces upward within the top cap [2902]. The bottom [2905] of the speaker [2904] actuates a switch affixed to a PCB [2906]. The PCB [2906] has holes [2907] for the connections of pins [2908] connecting the PCB [2906] to some or all of the electronics, which may include one or more of a microphone [2914], or a power source (typically batteries), below the PCB [2906].

The batteries [2910] are enclosed in a battery enclosure/compartment [2909]. The battery compartment [2909] may be held closed using a screw (not shown) in a screw hole [2912] that is typically threaded, a clip, or other conventional closure methods. In one aspect, the battery compartment [2909] may be made of one or more of plastics, including but not limited to polyethylene, rubber including but not limited to polyurethane and metal including but not limited to aluminum. A switch [2913], whether a slide switch, toggle switch, or otherwise, may be utilized to control volume, control erasure and/or re-recording of a sound, switching between sounds, connection to a wide area and/or local area network or connection, or otherwise.

Figure 30:
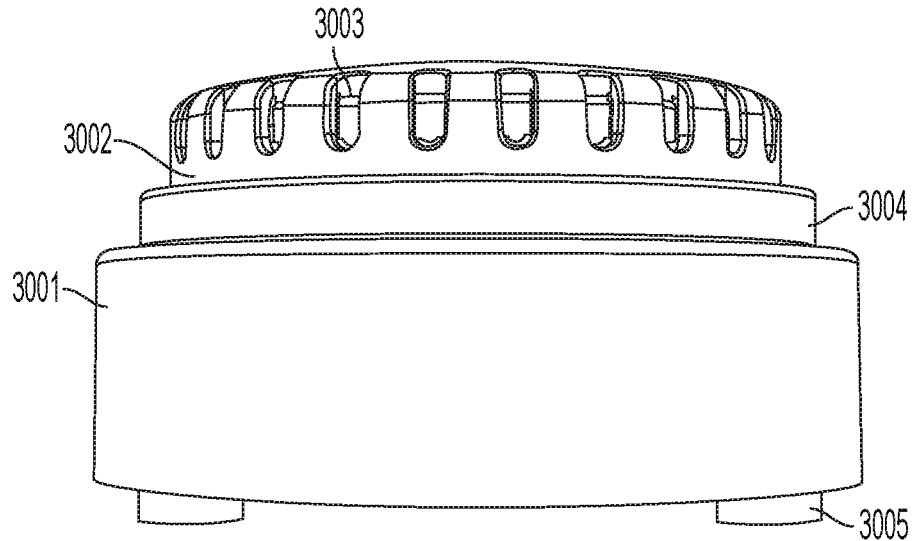
FIG. 30 is a side view of a sound button.

Turning to FIG. 30, we see a side view of an assembled sound button. A shell [3001] encloses a power source, electronics, PCB, speaker, and switch(es). The shell may have differing circumferences, such as a reduced circumference at the top [3004]. A reduced circumference may be used to keep the button cap [3002] in place, may be used for style, may be used as a collection point for contaminants, or otherwise. The button cap has cut-outs [3003] with air space (one or more holes and/or slots) to permit transmission of sound from the speaker and/or into the enclosure with few or no obstructions. In one aspect, the sound button may have feet [3005] to minimize contact with a floor surface, to which to affix a substance to grip a floor or other surface, to fit into an enclosure, or otherwise.

Figure 31:
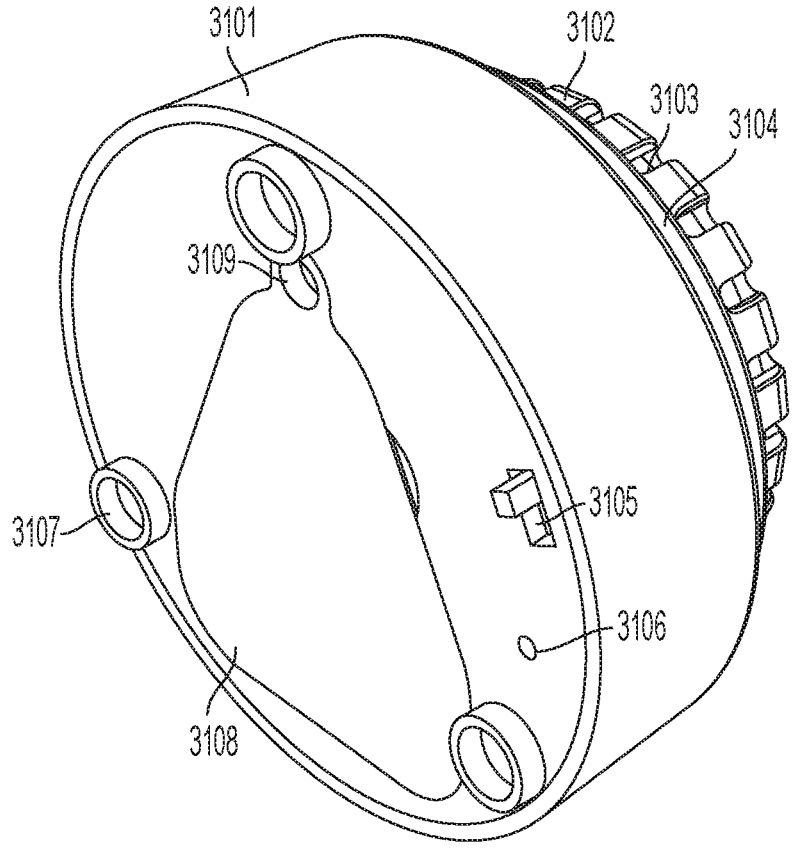
FIG. 31 is a bottom perspective view of a sound button.

Turning to FIG. 31, we see a bottom perspective view of an assembled sound button. A shell [3101] encloses power, electronics, PCB, speaker, and switch(es). Portions of the shell may have different circumferences, such as a portion [3104] with a reduced circumference at the top. A reduced circumference may be used to keep the button cap [3102] in place, may be used for style, may be used as a collection point for contaminants, or otherwise. The button cap [3102] has cut-outs/recesses [3103] with an air space (one or more holes or slots) to permit transmission of sound from the speaker and/or into the enclosure with few or no obstructions. In one aspect, the sound button may have feet [3107] to minimize contact with a floor surface, to which to affix a substance that grips a floor or other surface, to fit into an enclosure, or otherwise. A microphone input [3106] will typically be located on the bottom of the sound button, but may be placed in other locations on the sound button as well. One advantage of locating the input on the bottom is a greatly reduced risk of contamination or blockage of the sound input. In another aspect, the microphone/sound input may be located within the button itself. In a further dimension, the microphone within the button itself may receive sound through the hole in the cut-out [3104].

A switch [3105], (e.g., a slide switch, toggle switch, or other switch) may be utilized to alternate between sound button functions, such as recording, switching which recording is played, playback, maintenance, etc. A battery cover [3108] may be affixed using a screw and (most typically) threaded screw hole [3109], clasp, or other conventional methods of attachment.

Figure 32:
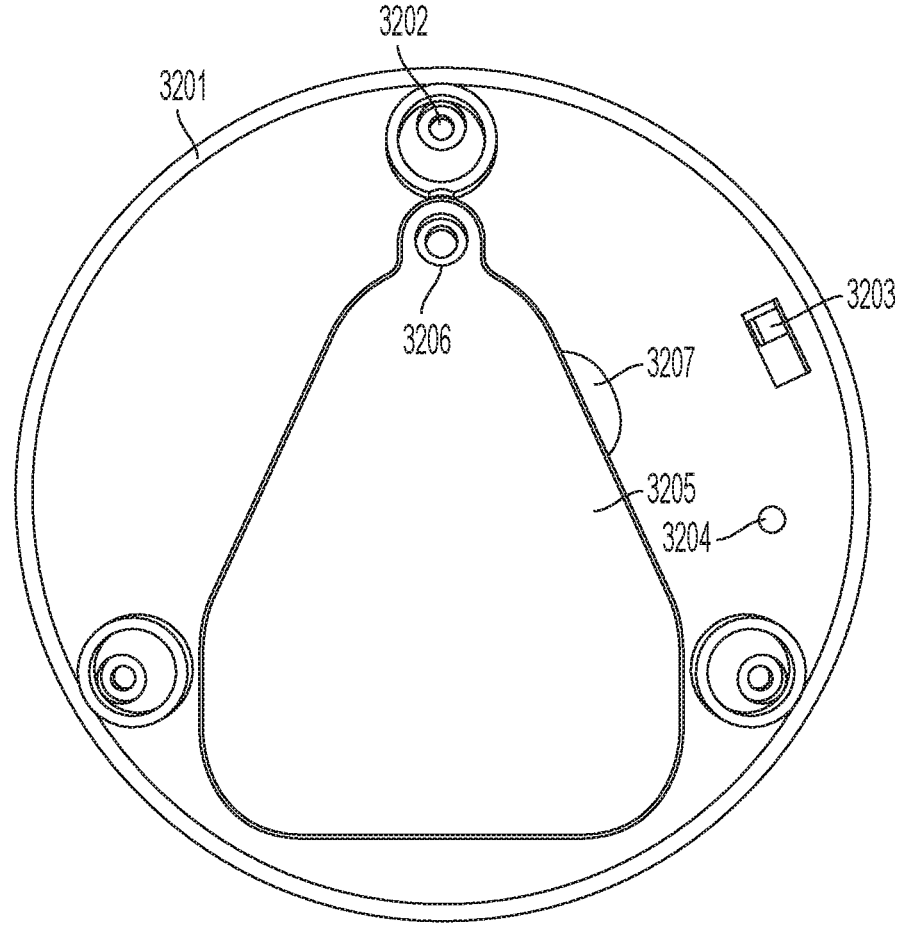
FIG. 32 is a bottom view of a sound button.

Turning to FIG. 32, we see a bottom perspective view of an assembled sound button comprising a shell [3201], feet [3202], a microphone [3204], a battery cover [3205] and a screw [3206]. The shell [3201] encloses the internal components of the sound button, including batteries, electronics, PCB, speaker, and switch(es). In one aspect, the sound button may have feet [3202] to minimize contact with a floor surface, to affix a substance or material that better grips a floor, to fit into an enclosure, or otherwise.

A microphone input [3204] may be located on, at or near the bottom of the sound button. A switch [3203], (e.g., a slide, toggle, or other switch) may be utilized to alternate between sound button functions, such as recording (with a microphone [3204] or other recording facility), switching which recording is played, playback, maintenance, etc. A battery cover [3205] may be affixed using a screw [3206], clasp, or other conventional means of affixing the battery cover to the sound button. A recessed area [3207] may be utilized to make removal of the battery cover [3205] easier.

Figure 33:
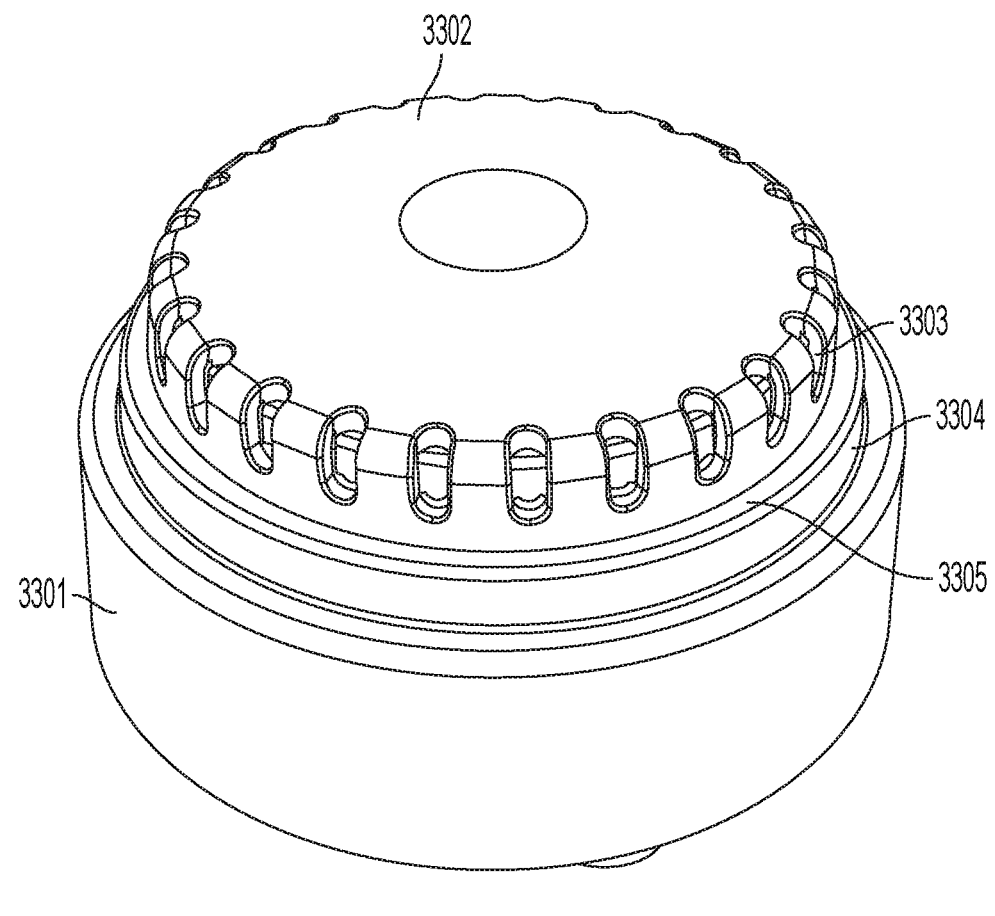
FIG. 33 is a top perspective view of a sound button.

Turning to FIG. 33, we see a top perspective view of an assembled sound button. A shell [3301] encloses a power source, electronics, PCB, speaker, and switch(es). Portions of the shell may have differing circumferences, such as a reduced circumference [3304] at the top. A reduced circumference may be used to keep the button cap [3302] in place, may be used for style, may be used as a collection point for contaminants, or otherwise. The button cap [3302] has cut-outs/recesses [3303] with air space (one or more holes) to permit transmission of sound from the speaker and/or into the enclosure with fewer or no obstructions. In some aspects, the shell [3301] may have a substantially vertical surface [3304] with a substantially horizontal surface [3305] above it. These surfaces may be utilized to capture or slow the flow of liquids or other contaminants from the top of the button.

Figure 34:
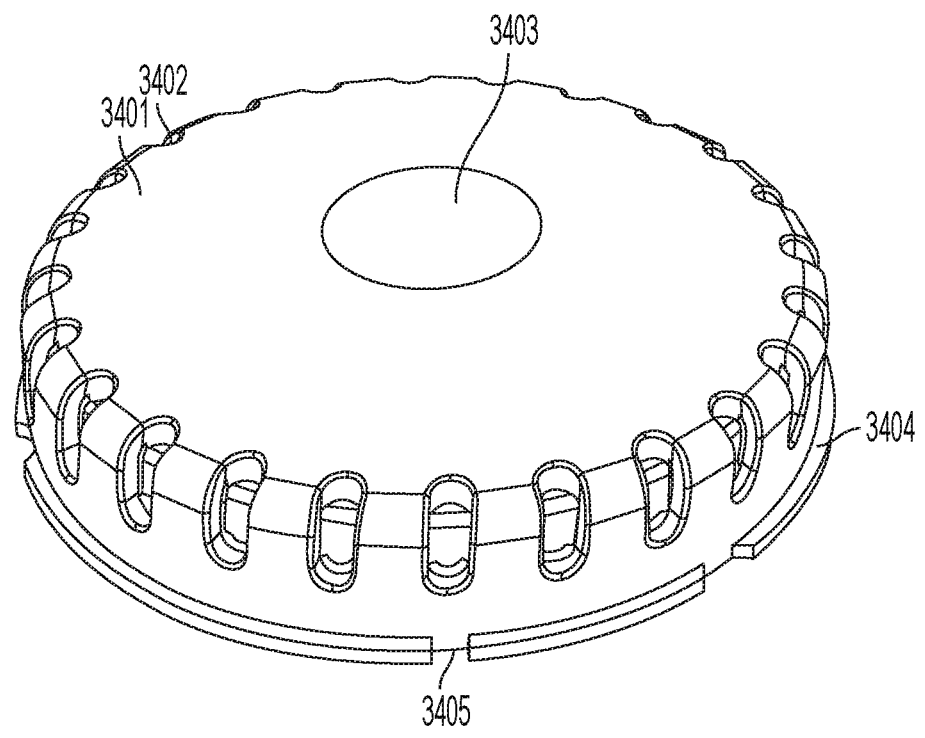
FIG. 34 is a top perspective view of a button cap.

Turning to FIG. 34, we see a button cap [3401]. The button cap has recesses/cut-outs [3402]. In one aspect, the button may have a circle [3403] or other shape in the center on the top. The circle [3403] or other shape may have embossing, a sticker, ink, drawings, or words or decorative marks within it, partially within it, or proximate to it. In one aspect, the button cap [3401] may have a lip [3403] at or near the bottom, which may aid in attaching/connecting and/or affixing the button cap [3401] within a shell (not shown), hold the button cap [3401] in place, and/or divert contaminant flow. The lip [3404] may have gaps [3405].

Figure 35:
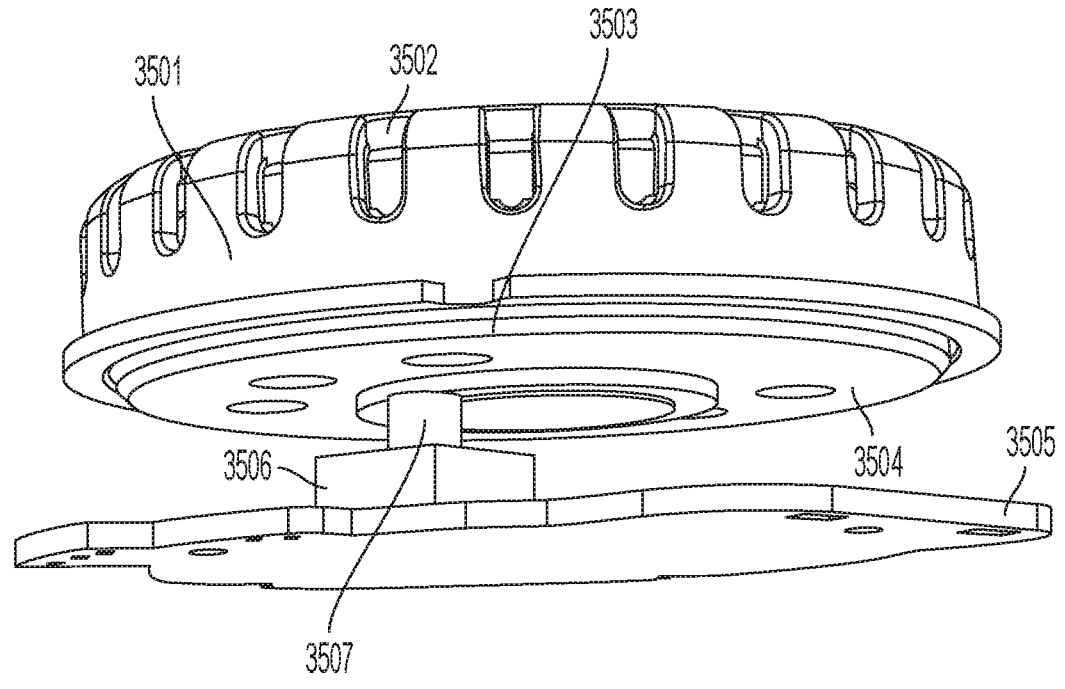
FIG. 35 is a perspective view of a button-cap, speaker, and PCB.

Turning to FIG. 35, we see a side perspective view of an exploded assembly of a PCB [3505] and an unexploded assembly of a button cap [3501] and speaker [3503]. The button cap [3501] has recesses/cut-outs [3502]. The entire assembly is substantially rigid, at least sufficiently to transmit a force applied (e.g., a button press) on the top of the button cap [3501] through the speaker [3503], to the bottom of the speaker [3504]. From that point, the pressure is transmitted to a switch [3507], typically a momentary switch, which may be mounted in a switch enclosure [3506]. The signal from the switch may then be transmitted to the relevant portion of the PCB [3505].

Figure 36:
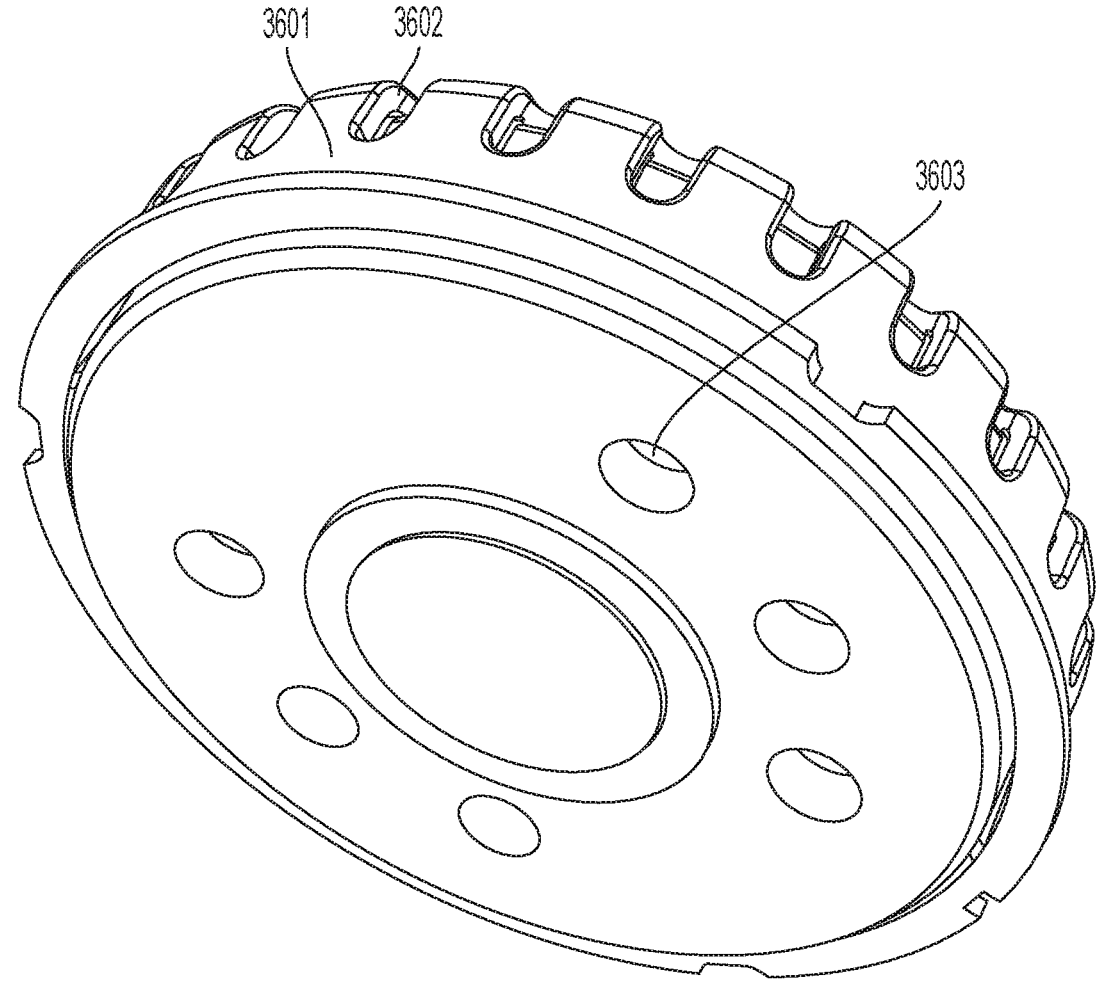
FIG. 36 is a bottom perspective view of a button cap and speaker.
Figure 37:
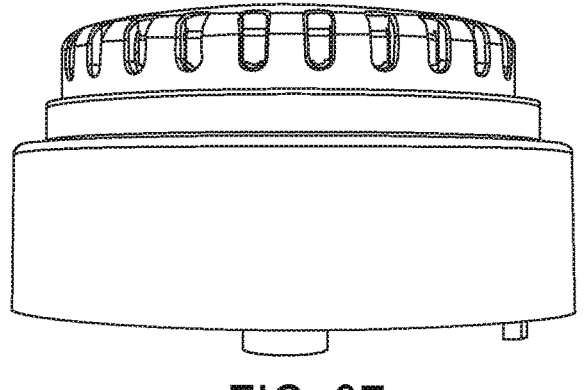
FIGS. 37-40 are side views of a sound button according to embodiments.
Figure 38:
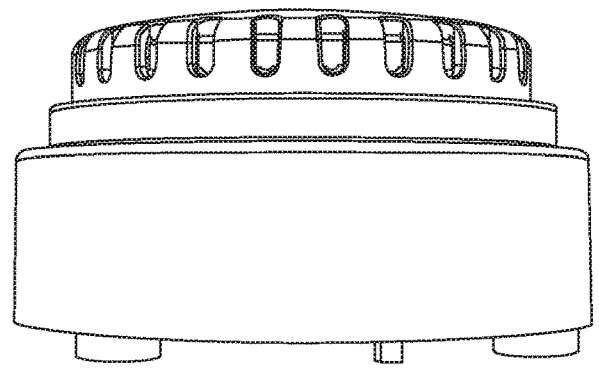
Figure 39:
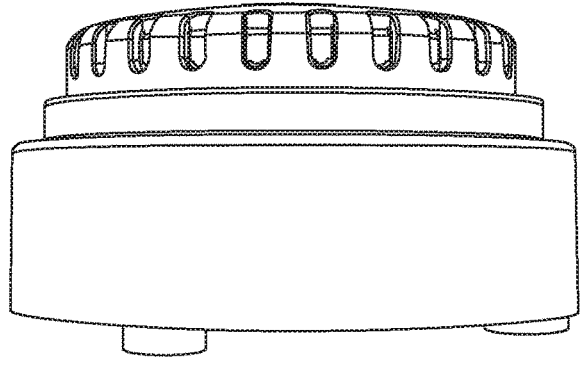
Figure 40:
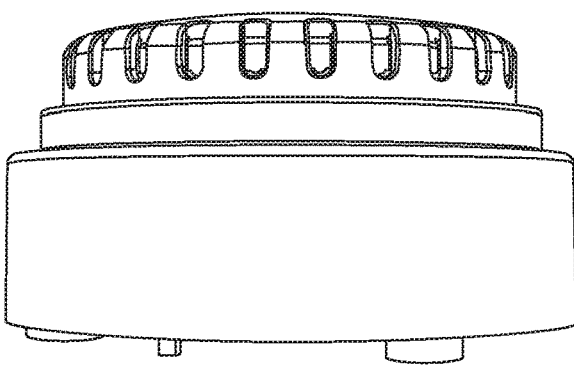

Turning to FIG. 36, we see an unexploded bottom perspective view of a button cap and speaker [3603]. Note that the button cap may have recesses/cut-outs [3602].

FIGS. 37-40, show side views of a fully assembled button cap from a variety of angles. FIGS. 41-44 show perspective views of a fully assembled button cap from a variety of perspectives.

Figure 45A:
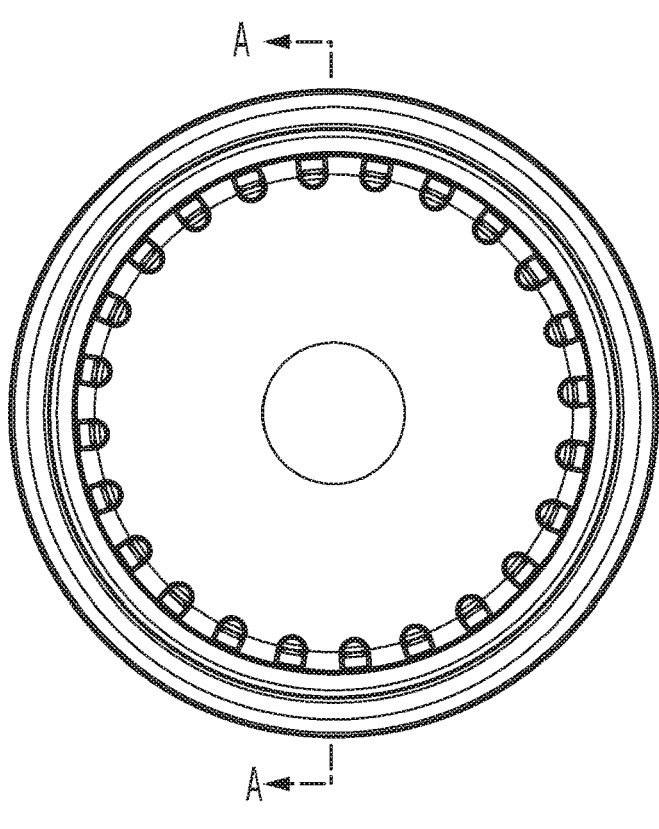
FIG. 45A is a top view of a sound button according to an embodiment.
Figure 45B:
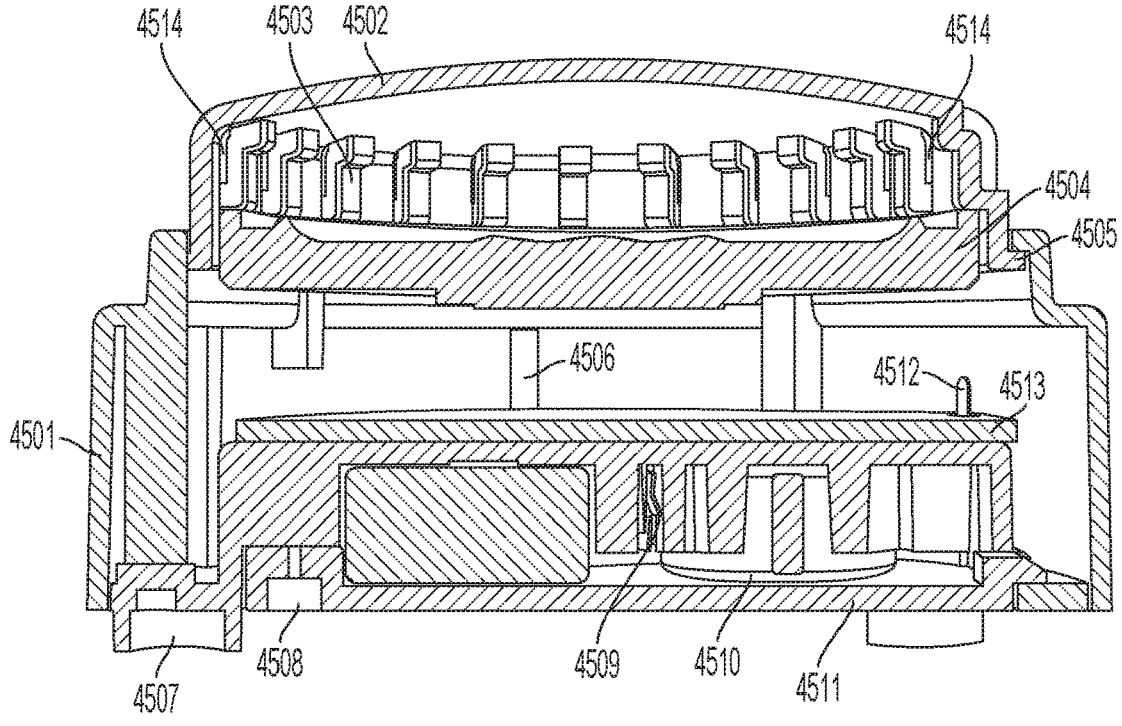
FIG. 45B is a cross-sectional view of the sound button of FIG. 45A.

Referring now to FIGS. 45A and B, we see a top view (FIG. 45A) and a cross-sectional view (FIG. 45B) of a sound button. The sound button is comprised of a shell [4501] operably coupled/connected to a button cap [4502]. As shown at the juncture of the shell [4501] and the button cap [4502], a lip [4505] may be utilized to attach, connect, hold and/or affix the button cap [4501] in place. In the embodiment in FIG. 45B, the button cap [4502] has recesses/cut-outs [4503] and the recesses/cut-outs may (or, in another aspect, need not) have a clear path to the exterior of the button cap [4502] via a hole [4514]. A speaker [4504] is below the button cap [4502], in one implementation, releasing sound into an air space within the button cap [4502]. A momentary switch [4506] may be connected to a PCB [4513] and actuated by pressure transmitted from the button cap [4502] through the speaker [4504].

In one aspect, the molding of the shell [4501] (or other components affixed to the shell [4501]) may include feet [4507] and/or a compartment capable of holding feet [4507]. A screw hole [4508] may be present to permit the battery cover [4511] to be affixed. Battery clips or connectors [4509] may be present to transmit power from the batteries [4510] to the PCB and/or other components. In one aspect, pins [4512] carrying power and/or other signals may penetrate through holes in the PCB [4513].

Figure 46A:
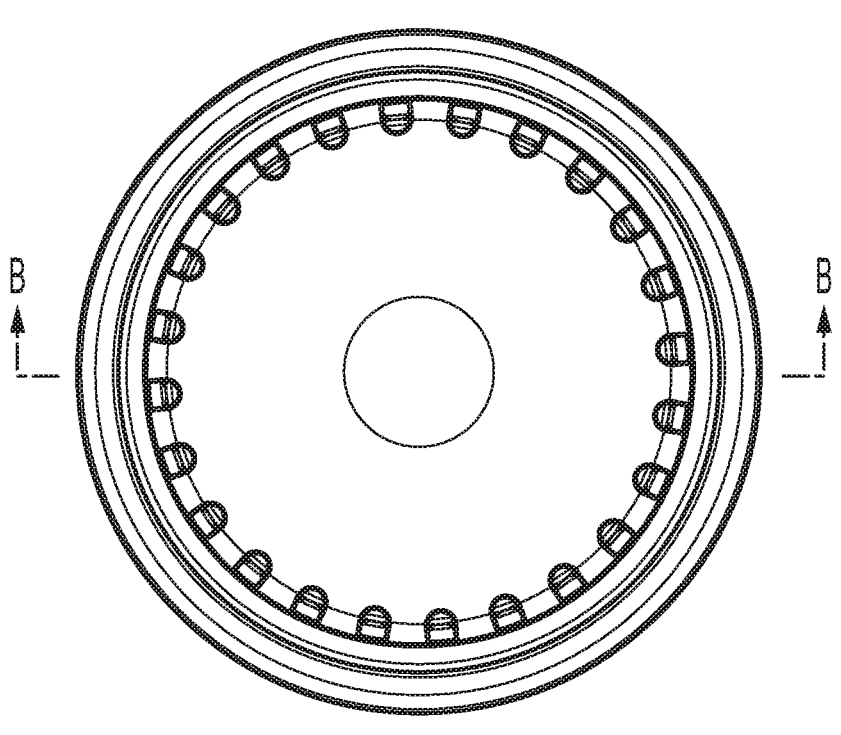
FIG. 46A is a top view of a sound button according to an embodiment.
Figure 46B:
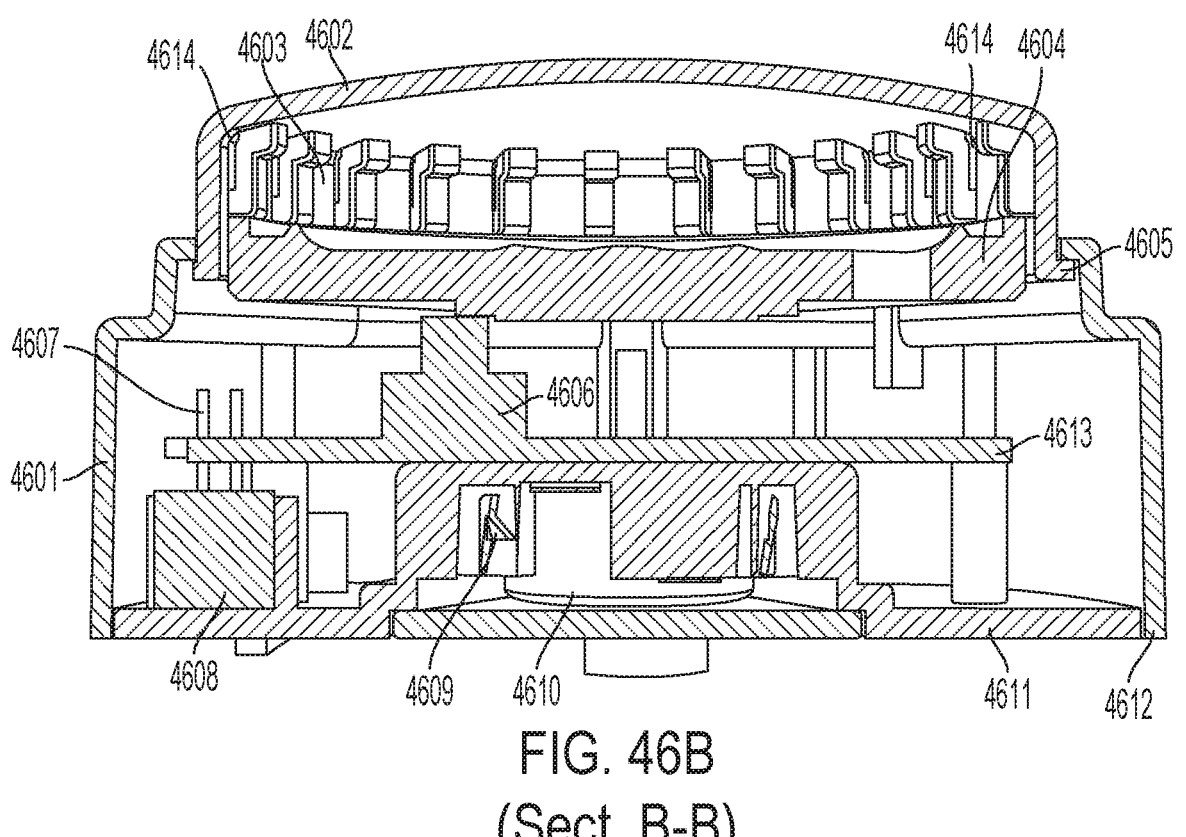
FIG. 46B is a cross-sectional view of the sound button of FIG. 46A.

Turning to FIGS. 46A and B, we see a top view (FIG. 46A) and cross-sectional view (FIG. 46B) of a sound button, comprising a shell [4601] operably connected to a button cap [4602]. As shown at the juncture of the shell [4601] and the button cap [4602], a lip [4605] may be utilized to attach, connect, hold and/or affix the button cap [2462] in place. We see that the button cap [4602] has recesses/cut-outs [4603] and that the ecesses/cut-outs may (or, in another aspect, need not) have a clear path to the outside via a hole [4614]. A speaker [4604] is present below the button cap [4602], in one implementation, releasing sound into an air space within the button cap [4602]. A momentary (or other) switch [4608] may be connected to a PCB [4613] and actuated by a force transmitted from the button cap [4602] through the speaker [4604].

In one aspect, battery clips or connectors [4609] may be present to transmit power from the batteries [4610] to the PCB [4613] and/or other components. In one aspect, pins [4607] carrying power and/or other signals, such as from a switch [4608] may penetrate through holes in the PCB [4613]. In one aspect, a side wall [4612] of the shell [4601] may be substantially flush with a bottom wall [4611] of the sound button.

Figure 47A:
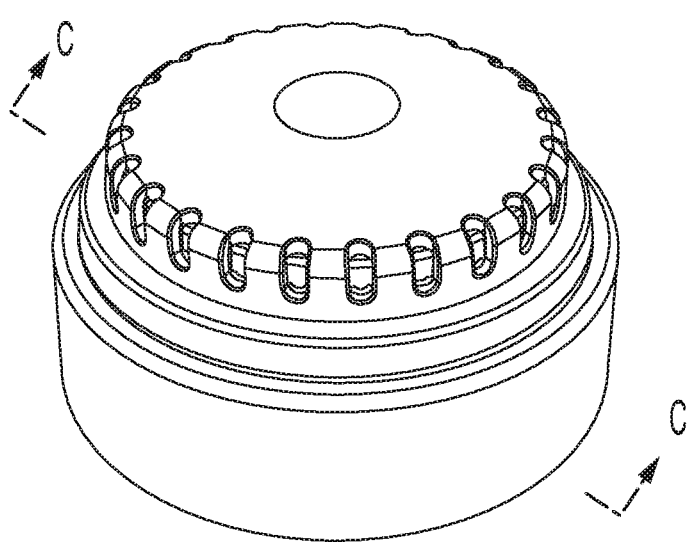
FIG. 47A is a perspective view of a sound button according to an embodiment.
Figure 47B:
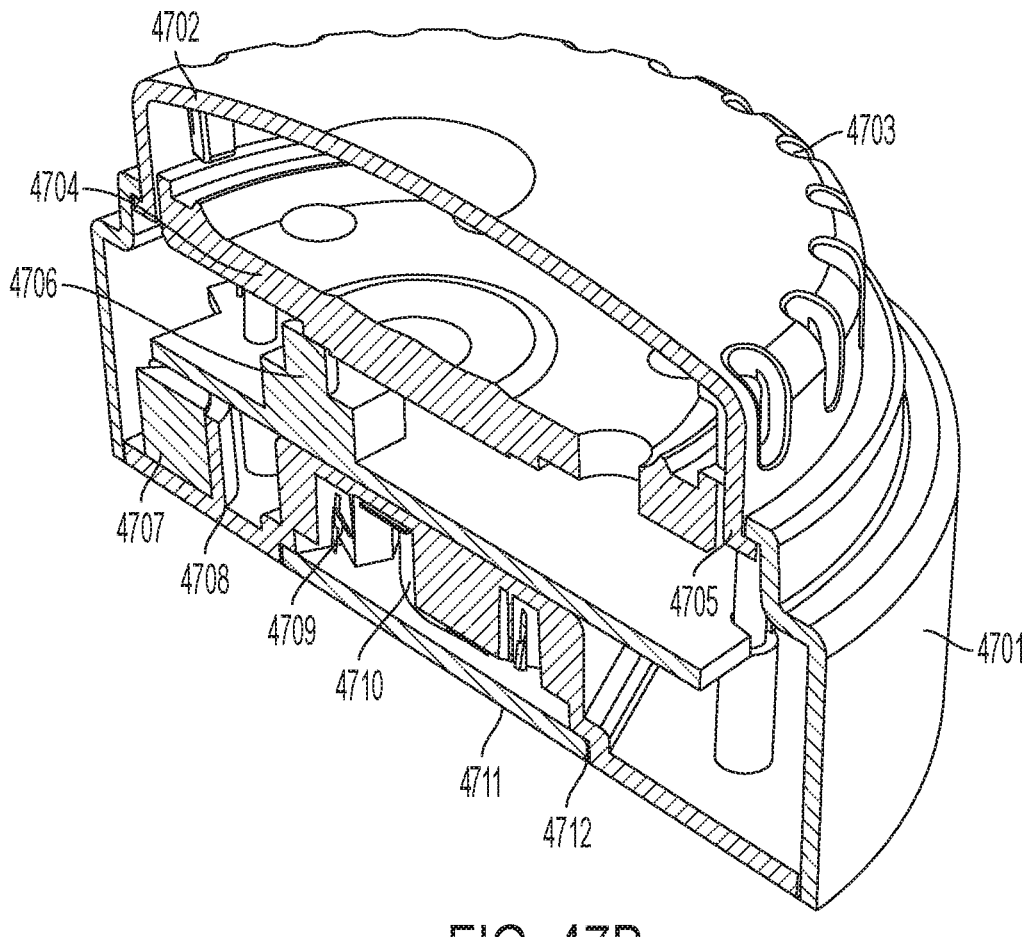
FIG. 47B cross-sectional perspective view of the sound button of FIG. 47A.

Referring now to FIGS. 47A and B, we see a perspective view (FIG. 47A) and a cross-sectional perspective view (FIG. 47B) of a sound button. The internal components are enclosed by the shell [4701]. At the top of the sound button and at least partially within the shell [4701] is the button cap [4702]. The button cap [4702] has recesses/cut-outs [4703] capable of transmitting sound from a speaker [4704] through the recesses/cut-outs [4703], permitting high quality sound transmission. When pushed and/or a forced is applied in a downward direction, the button cap [4702] contacts the speaker [4704]. The speaker, in turn, actuates a momentary (or other) switch [4706] affixed to a PBC.

The button cap [4702] and/or the shell [4701] may comprise a lip [4705] that attaches, connects, holds and/or affixes the button cap [4702] in place. A microphone [4707] may be integrated into the sound button. The bottom of the microphone [4708] may be fit to a battery cover [4711] using a lip [4712].

The batteries are enclosed at the bottom of the sound button by the battery cover [4711], which may be affixed as described above with regard to FIG. 6. The current from the batteries [4710] may be conducted with battery clips [4709].

Figure 48A:
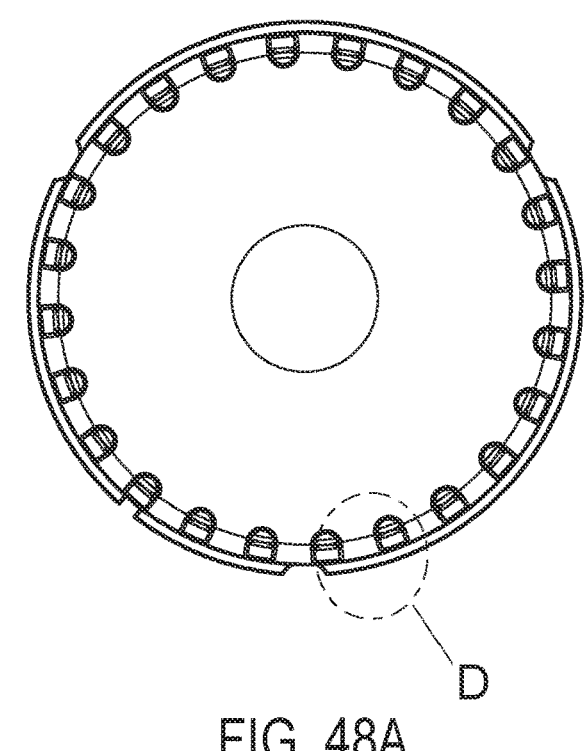
FIG. 48A is a top view of a button cap according to an embodiment.
Figure 48B:
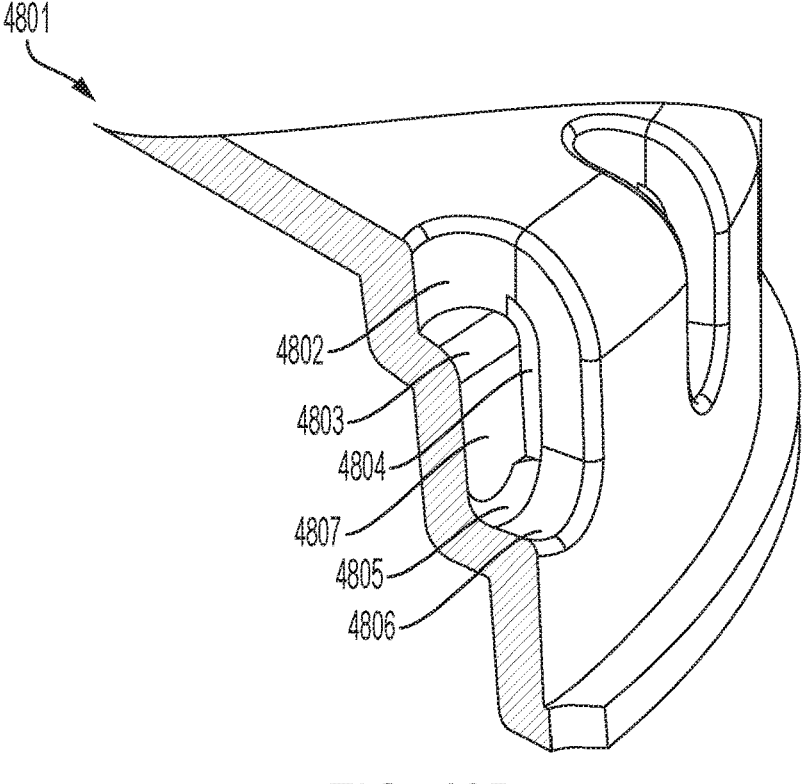

Turning to FIGS. 48A and B, we see a top view of a button cap (FIG. 48A) and an enlarged perspective view (FIG. 48B) of a portion of the button cap [4801]. In one aspect, the recess/cut-out (see e.g., recess/cutout [3303] of FIG. 33) may have a vertical wall [4802] at or near the top, a horizontal and/or a curved wall [4803], a second vertical wall [4807], a curved component [4805] and an bottom structure [4806] that, in combination, allow fluids or other contaminants to roll and/or travel down the button cap and/or sound button without (or with minimal) intrusion into a hole [4804] (e.g., typically a substantially vertical slot) that transmits sound between the inside and outside (and/or, in the case of an internal microphone, from the outside to the inside) of the sound button.

Figures 49A, 49B:
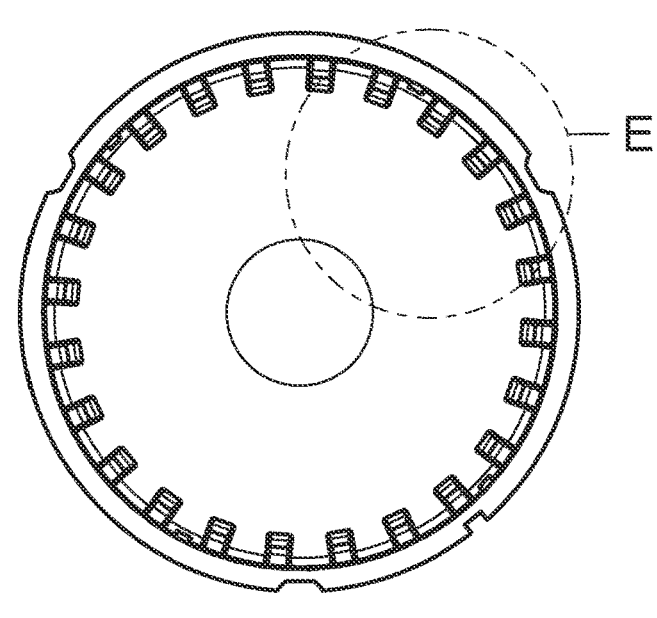
FIG. 49A is a bottom (interior) view of a button cap according to an embodiment.
FIG. 49B is an enlarged inverted interior perspective view of a portion of the button cap of FIG. 49A.

Turning to FIGS. 49A and B, we see a bottom (interior) view of a button cap (FIG. 49A) and an enlarged inverted, interior perspective view (FIG. 49B) of a portion of the button cap. In one aspect, the button cap may be circular when viewed from the top with a curved surface [4901] in between the recesses/cut-outs (see e.g., recesses/cutouts [3303] of FIG. 33) located at or near the perimeter of the button cap. The recesses/cut-outs may have a vertical surface [4902] that may transition to a curved and/or horizontal surface [4903], which in turn may transition to a vertical surface [4907]. The recesses/cut-outs may have a hole for transmission of sound into and/or out of the button. The bottom of the recesses/cut-outs may be comprised of a curved surface [4905] connected to a horizontal surface [4906]. Alternatively, the vertical surface [4907] may directly connect to the horizontal surface [4906].

Figures 50A, 50B:
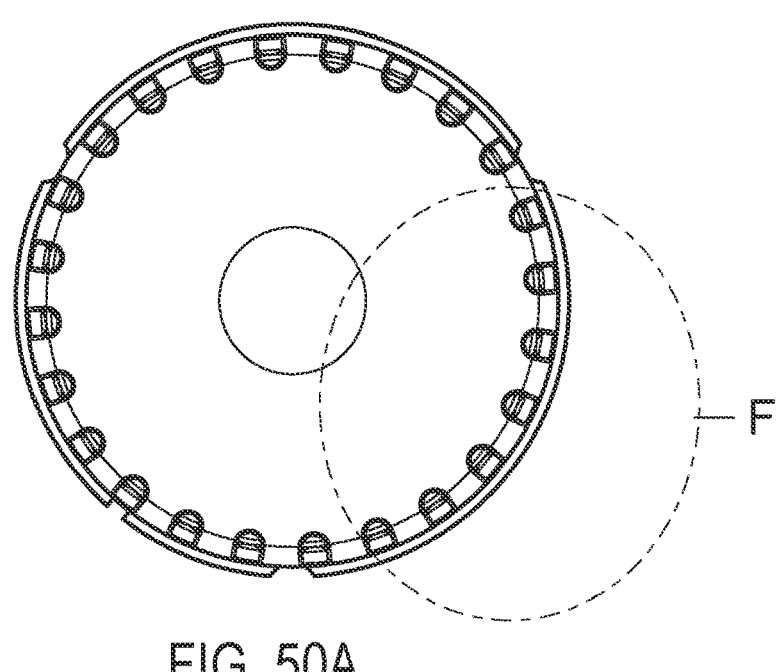
FIG. 50A is a top (exterior) view of a button cap according to an embodiment.
FIG. 50B is an enlarged exterior perspective view of a portion of the button cap of FIG. 50A.

In FIGS. 50A and B is shown a top (exterior) view of a button cap (FIG. 50A) and an enlarged exterior perspective view (FIG. 50B) of a portion of the button cap [5001]. Each of the recesses/cut-outs (see e.g., recesses/cutouts [3303] of FIG. 33) may have a substantially vertical surface [5002] connected to a horizontal and/or curved surface [5003]. A hole [5004] (typically a substantially vertical slot) is located adjacent to a side of each of the recesses/cut-outs. The bottom of each recess/cut-out may have a curved surface [5005] or may transition directly to a substantially horizontal surface [5006]. Alternatively, the recesses/cut-outs may transition directly to a substantially vertical surface. A substantially vertical surface [5007] may connect the horizontal and/or curved surface [5003] to the curved surface [5005] and/or the horizontal surface [5006].

Figures 51A, 51B:
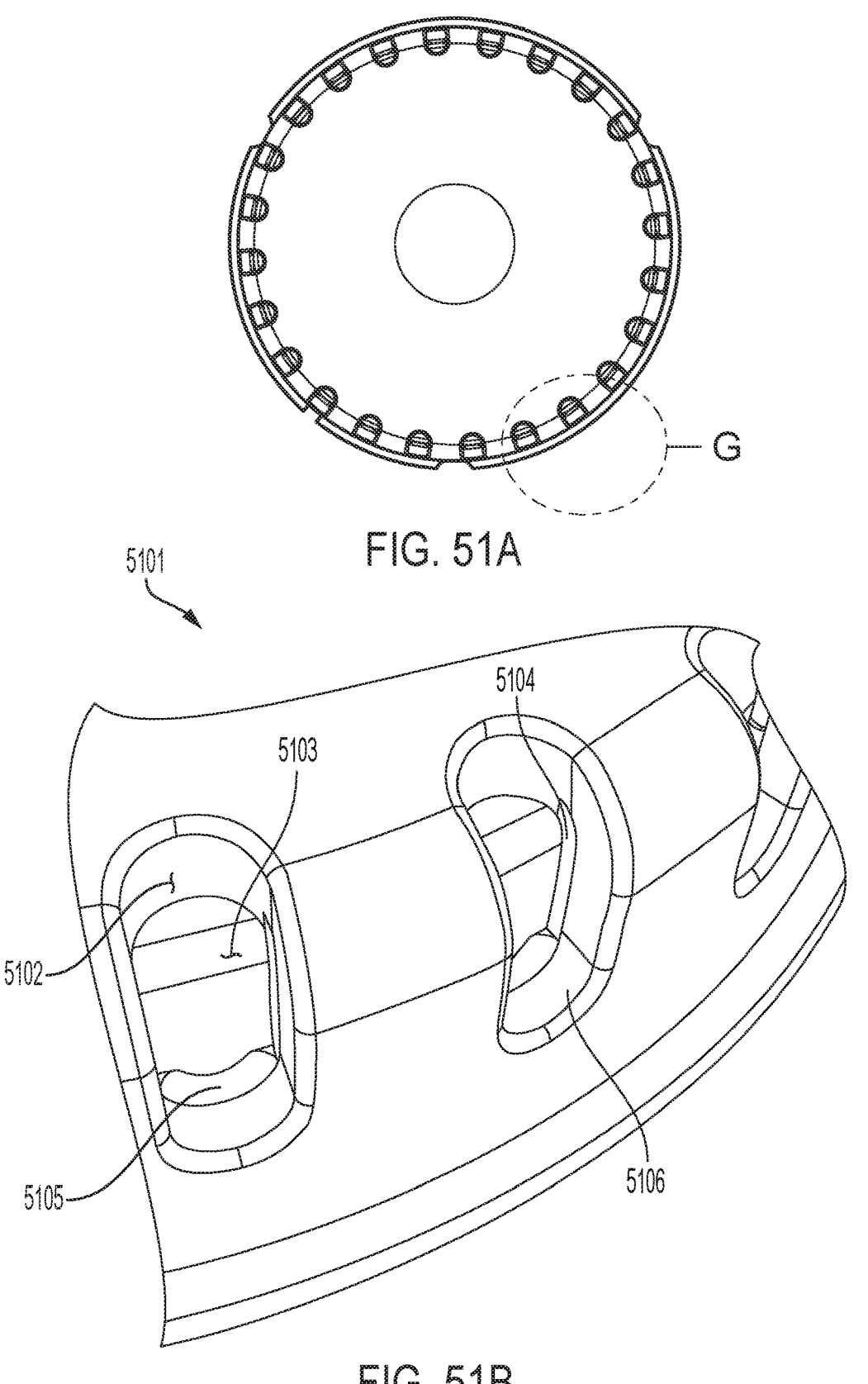
FIG. 51A is a top view of a button cap according to and embodiment.
FIG. 51B is an enlarged perspective view of a portion of the exterior of the button cap of FIG. 51A.

Turning to FIGS. 51A and B, therein is shown a top view (FIG. 51A) and an enlarged perspective view (FIG. 51B) of the exterior of a button cap with recesses/cut-outs [5101]. Each cut-out may have a vertical surface [5102] connected to a horizontal and/or curved surface [5103]. A hole [5104] is located adjacent to a side of the cut-out. The bottom of the cut-out may have a curved surface [5105] or may transition directly to a horizontal surface [5106].

Figure 52:
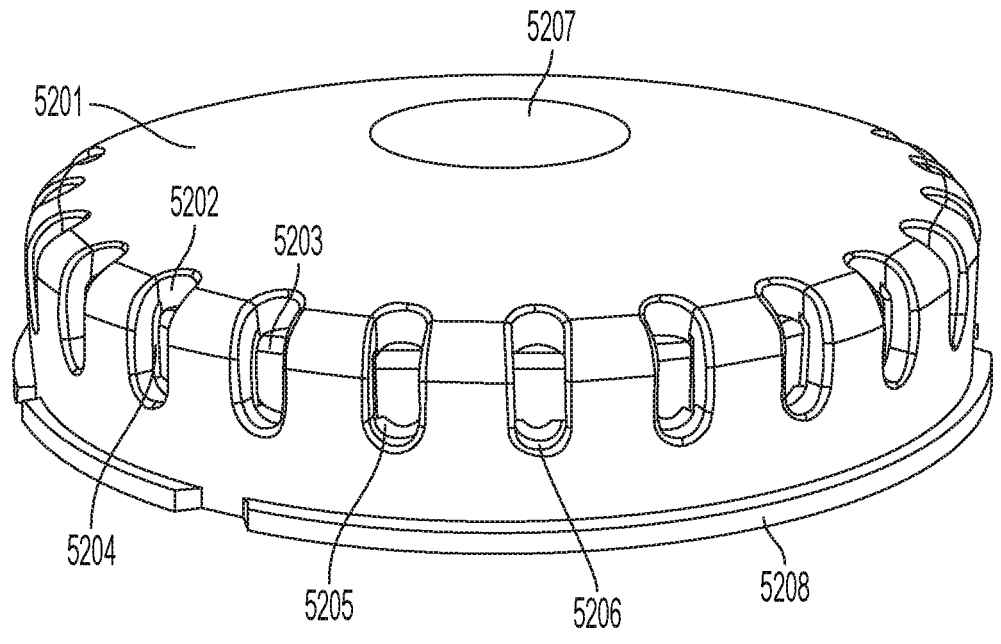
FIG. 52 is a perspective view of a button cap.

Turning to FIG. 52, we have a perspective view of a button cap [5201]. Each recess/cut-out may have a vertical surface [5202] connected to a horizontal and/or curved surface [5203]. A hole [5204] is located adjacent to a side of the cut-out. The bottom of the cut-out may have a curved surface [5205] or may transition directly to a horizontal surface [5206]. A circle [5207] may be present on top of the cap. The circle [5207] may be ornamental, need not be a circle but may be another shape, and may have markings, words, or images. The bottom of the button cap may have a lip [5208].

Figure 53:
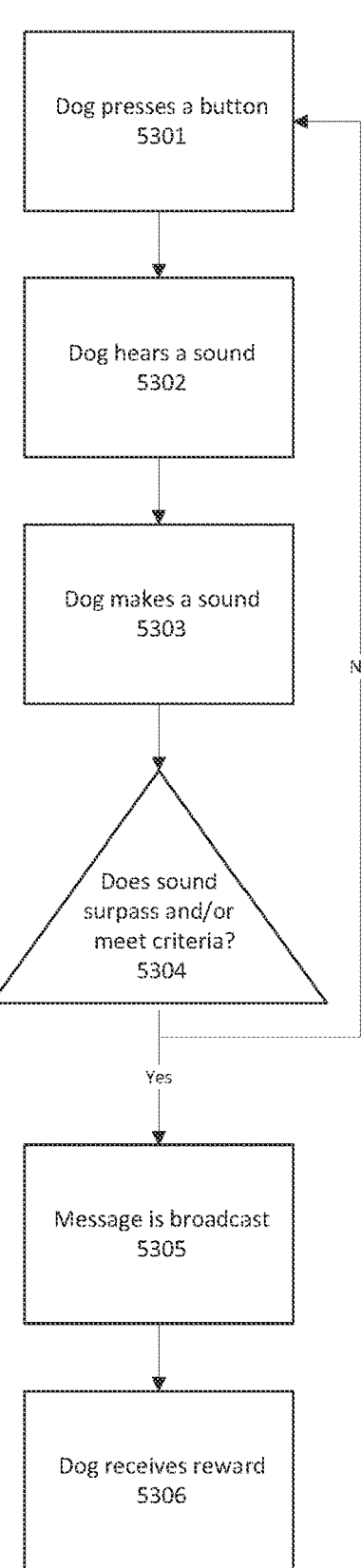
FIG. 53 is a flow chart diagram of a method for training an animal according to an embodiment.

Turning to FIG. 53, therein is shown an exemplary flow chart of a method for training an animal (e.g., a dog). The dog may press a button [5301]. The press triggers a sound that the dog hears [5302]. The dog makes a sound (or motion) in response (a confirmative action or rejection action) [5303]. At step [5304], if the sound meets and/or exceeds certain criteria, at step [5305], the message is broadcast, and the dog is optionally rewarded [5306]. If, at step [5304], the criteria are not met/exceeded, the sequence may restart at step [5301].

In one aspect, a sensor or set of sensors may be utilized to determine when an environmental element or action is actuated or taken, preferably where the element or action corresponds to a button. For example, going outside is a desirable request to be correlated with a button press. By placing a sensor on the door that determines it has been opened, the system could make the "go out" button emit a sound and/or light up and/or otherwise be noticeably actuated in some manner when the door opens. In one aspect, the sensor may be manually actuated or manually disengaged in conjunction with opening the door. Another analogy would be a button for "water bowl". When the dog drinks from the water bowl, the button may be actuated and say "water". When the bowl is empty, the dog would press the button to alert the humans to the need for more water.

By actuating the button when an event takes place, such as a door open or a water bowl being used, the dog will come to associate the button with the element or action. This allows the dog to be passively trained, in whole or part, as to what thing each (or at least one) button does.

In one aspect, we may utilize computer vision to identify what the dog is looking at and, in one aspect, play a sound associated with the thing (such as the name of the thing). In another aspect, we may use an EEG to determine whether the animal is surprised.

In another aspect, the mode of pressing the button may alternate the response of the button. For example, if the front left paw presses button A, it will say "go to backyard". With the right paw, it will say "go for a walk". Pressure, cadence and other characteristics of the button presses may be utilized for this purpose.

It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

What is claimed is:

1. A layout detection system, comprising:
a plurality of hextiles, each of the plurality of hextiles comprising:
an infrared transmitter that transmits a unique code;
an infrared receiver; and
a radio transmitter; and
a receiver that determines the layout of tiles based on the unique codes; and
where each radio transmitter transmits data to at least one component of its respective hextile based upon the layout.

2. The layout detection system of claim 1, where the radio transmitter is a near field computing transmitter.

3. The layout detection system of claim 1, where the radio transmitter is a Bluetooth Low Energy transmitter.

4. The layout detection system of claim 1, where the radio transmitter is a Wi-Fi transmitter.

5. The layout detection system of claim 1, where the radio transmitter is a cellular network.

6. The layout detection system of claim 1, where the component of the hextile is a button.

7. The layout detection system of claim 1, where the component of the hextile is a receiver mounted on the hextile.

8. The layout detection system of claim 1, where the infrared transmitter and infrared receiver identify one or more animals in proximity to the system.

* * * * *